(12) United States Patent
Kawasaki et al.

(10) Patent No.: US 10,567,995 B2
(45) Date of Patent: Feb. 18, 2020

(54) TERMINAL APPARATUS, MME, COMMUNICATION METHOD OF TERMINAL APPARATUS, AND COMMUNICATION METHOD OF MME

(71) Applicant: SHARP KABUSHIKI KAISHA, Sakai, Osaka (JP)

(72) Inventors: Yudai Kawasaki, Sakai (JP); Masafumi Aramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/070,766

(22) PCT Filed: Jan. 18, 2017

(86) PCT No.: PCT/JP2017/001569
§ 371 (c)(1),
(2) Date: Jul. 17, 2018

(87) PCT Pub. No.: WO2017/126559
PCT Pub. Date: Jul. 27, 2017

(65) Prior Publication Data
US 2019/0028926 A1      Jan. 24, 2019

(30) Foreign Application Priority Data

Jan. 19, 2016   (JP) .................................. 2016-007689

(51) Int. Cl.
*H04W 28/06* (2009.01)
*H04W 76/00* (2018.01)
(Continued)

(52) U.S. Cl.
CPC ............. *H04W 28/06* (2013.01); *H04W 8/08* (2013.01); *H04W 36/0022* (2013.01);
(Continued)

(58) Field of Classification Search
CPC ....... H04W 8/22; H04W 76/00; H04W 76/10; H04W 76/20
See application file for complete search history.

(56) References Cited

U.S. PATENT DOCUMENTS

2012/0149386 A1   6/2012 Kumar et al.
2013/0100895 A1   4/2013 Aghili et al.
(Continued)

FOREIGN PATENT DOCUMENTS

| JP | 2011-44804 A | 3/2011 |
|----|---|---|
| JP | 2013-529402 A | 7/2013 |
| JP | 2015-510371 A | 4/2015 |

OTHER PUBLICATIONS

3GPP TR 23.720 V1.2.0(2015-11), "3rd Generation Partnership Project; Technical Specification Group Services and System Aspects; Architecture enhancements for Cellular Internet of Things (Release 13)", pp. 1-96.

(Continued)

*Primary Examiner* — Scott M Sciacca
(74) *Attorney, Agent, or Firm* — Birch, Stewart, Kolasch & Birch, LLP

(57) ABSTRACT

To provide a communication procedure for data transmission and/or reception suitable to a CIoT terminal. In a communication control method of a terminal apparatus according to the present invention, a first data transmission and/or reception method is a method for transmitting and/or receiving user data by use of a Data Radio Bearer (DRB), a second data transmission and/or reception method is a method for transmitting and/or receiving user data a Signalling Radio Bearer (SRB), and the communication control method includes a step of changing the user data transmission and/or reception method from the first data transmission and/or reception method into the second data transmission and/or reception method, and a step of transmitting and/or receiving the user data to/from a core network by the second data transmission and/or reception method.

4 Claims, 26 Drawing Sheets

(51) Int. Cl.
*H04W 8/22* (2009.01)
*H04W 76/10* (2018.01)
*H04W 76/20* (2018.01)
*H04W 76/12* (2018.01)
*H04W 76/19* (2018.01)
*H04W 76/11* (2018.01)
*H04W 76/27* (2018.01)
*H04W 8/08* (2009.01)
*H04W 36/00* (2009.01)

(52) U.S. Cl.
CPC ............ *H04W 76/10* (2018.02); *H04W 76/11* (2018.02); *H04W 76/12* (2018.02); *H04W 76/19* (2018.02); *H04W 76/20* (2018.02); *H04W 76/27* (2018.02)

(56) References Cited

U.S. PATENT DOCUMENTS

| | | |
|---|---|---|
| 2013/0227138 A1 | 8/2013 | Cai et al. |
| 2018/0310359 A1* | 10/2018 | Takahashi ............. H04W 88/02 |
| 2018/0376531 A1* | 12/2018 | Martinez Tarradell ...................... H04W 76/27 |
| 2019/0021134 A1* | 1/2019 | Zhang ................... H04W 76/27 |
| 2019/0028337 A1* | 1/2019 | Ryu ......................... H04W 8/02 |
| 2019/0037377 A1* | 1/2019 | Ke ........................... H04W 4/70 |

OTHER PUBLICATIONS

International Search Report for PCT/JP2017/001569 (PCT/ISA/210) dated Mar. 21, 2017.

* cited by examiner (b)

| |
|---|
| IMSI |
| IMSI-unauthenticated-indicator |
| MSISDN |
| MM State |
| GUTI |
| ME Identity |
| Tracking Area List |
| TAI of last TAU |
| ECGI |
| E-UTRAN Cell Identity Age |
| CSG ID |
| CSG membership |
| Access mode |
| Authentication Vector |
| UE Radio Access Capability |
| MS Classmark 2 |
| MS Classmark 3 |
| Supported Codecs |
| UE Network Capability |
| MS Network Capability |
| UE Specific DRX Parameters |
| Selected NAS Algorithm |
| eKSI |
| K_ASME |
| NAS Keys and COUNT |
| Selected CN operator id |

| Recovery |
| --- |
| Access Restriction |
| ODB for PS parameters |
| APN-OI Replacement |
| MME IP address for S11 |
| MME TEID for S11 |
| S-GW IP address for S11/S4 |
| S-GW TEID for S11/S4 |
| SGSN IP address for S3 |
| SGSN TEID for S3 |
| eNodeB Address in Use for S1-MME |
| eNB UE S1AP ID |
| UE S1AP ID |
| Subscribed UE-AMBR |
| UE-AMBR |
| EPS Subscribed Charging Characteristics |
| Subscribed RFSP Index |
| RFSP Index in Use |
| Trace reference |
| Trace type |
| Trigger id |
| OMC identity |
| URRP-MME |
| CSG Subscription Data |
| LIPA Allowed |

FIG. 8

(b)
| MPS CS priority |
| --- |
| MPS EPS priority |
| Voice Support Match Indicator |
| Homogenous Support of IMS Voice over PS Sessions |

| |
|---|
| APN in Use |
| APN Restriction |
| APN Subscribed |
| PDN Type |
| IP Address(es) |
| EPS PDN Charging Characteristic |
| APN-OI Replacement |
| SIPTO permissions |
| Local Home Network ID |
| LIPA permissions |
| WLAN offloadability |
| VPLMN Address Allowed |
| PDN GW Address in Use (CONTROL INFORMATION) |
| PDN GW TEID for S5/S8 (CONTROL INFORMATION) |
| MS Info Change Reporting Action |
| CSG Information Reporting Action |
| Presence Reporting Area Action |
| EPS subscribed QoS profile |
| Subscribed APN-AMBR |
| APN-AMBR |
| PDN GW GRE Key for uplink traffic (USER DATA) |
| Default bearer |
| low access priority |

| EPS Bearer ID |
| --- |
| TI |
| S-GW IP address for S1-u |
| S-GW TEID for S1u |
| PDN GW TEID for S5/S8 (user plane) |
| PDN GW IP address for S5/S8 (user plane) |
| EPS bearer QoS |
| TFT |

FIG. 11

(e)
| EPS AS SECURITY CONTEXT |
| --- |
| EPS NAS SECURITY CONTEXT |

(f)
| cryptographic key |
| --- |
| Next Hop parameter (NH) |
| Next Hop Chaining Counter parameter (NCC) |
| identifiers of the selected AS level cryptographic algorithms |

(g)
| K_ASME |
| --- |
| UE security capabilitie |
| NAS COUNT |

(h)
| Emergency Access Point Name (em APN) |
| --- |
| Emergency QoS profile |
| Emergency APN-AMBR |
| Emergency PDN GW identity |
| Non-3GPP HO Emergency PDN GW identity |

| IMSI |
| --- |
| IMSI-unauthenticated-indicator |
| ME Identity |
| MSISDN |
| Selected CN operator id |
| MME TEID for S11 |
| MME IP address for S11 |
| S-GW TEID for S11/S4 |
| S-GW IP address for S11/S4 |
| SGSN IP address for S4 |
| SGSN TEID for S4 |
| Trace reference |
| Trace type |
| Trigger ID |
| OMC identity |
| Last known Cell ID |
| Last known Cell ID age |

| |
|---|
| APN in Use |
| EPS PDN Charging Characteristics |
| P-GW Address in Use (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| S-GW IP address for S5/S8 (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| Default Bearer |

(d)

| |
|---|
| EPS Bearer Id |
| TFT |
| P-GW Address in Use (user plane) |
| S-GW IP address for S5/S8 (user plane) |
| S-GW TEID for S5/S8 (user plane) |
| S-GW IP address for S1-u, S12 and S4 (user plane) |
| S-GW TEID for S1-u, S12 and S4 (user plane) |
| eNodeB IP address for S1-u |
| eNodeB TEID for S1-u |
| RNC IP address for S12 |
| RNC TEID for S12 |
| SGSN IP address for S4 (user plane) |
| SGSN TEID for S4 (user plane) |
| EPS Bearer QoS |
| Charging Id |

| IMSI |
|---|
| IMSI-unauthenticated-indicator |
| ME Identity |
| MSISDN |
| Selected CN operator id |
| RAT type |
| Trace reference |
| Trace type |
| Trigger id |
| OMC identity |

(c)

| APN in use |
|---|
| APN-AMBR |

(d)

| |
|---|
| IP Address |
| PDN type |
| S-GW Address in Use (CONTROL INFORMATION) |
| S-GW TEID for S5/S8 (CONTROL INFORMATION) |
| S-GW Address in Use (USER DATA) |
| S-GW GRE Key for downlink traffic (USER DATA) |
| P-GW IP address for S5/S8 (CONTROL INFORMATION) |
| P-GW TEID for S5/S8 (CONTROL INFORMATION) |
| P-GW Address in Use (USER DATA) |
| P-GW GRE Key for uplink traffic (USER DATA) |
| MS Info Change Reporting support indication |
| MS Info Change Reporting Action |
| CSG Information Reporting Action |
| Presence Reporting Area Action |
| BCM |
| Default Bearer |
| Default BearerEPS PDN Charging Characteristics |

(e)

| |
|---|
| EPS Bearer Id |
| TFT |
| S-GW Address in Use (USER DATA) |
| S-GW TEID for S5/S8 (USER DATA) |
| P-GW IP address for S5/S8 (USER DATA) |
| P-GW TEID for S5/S8 (USER DATA) |
| EPS Bearer QoS |
| Charging Id |

| IMSI |
|---|
| EMM State |
| GUTI |
| ME Identity |
| Tracking Area List |
| last visited TAI |
| Selected NAS Algorithm |
| Selected AS Algorithm |
| eKSI |
| K_ASME |
| NAS Keys and COUNT |
| Temporary Identity used in Next update (TIN) |
| UE Specific DRX Parameters |
| Allowed CSG list |
| Operator CSG list |

(c)

| APN in Use |
|---|
| APN-AMBR |
| Assigned PDN Type |
| IP Address(es) |
| Default Bearer |
| WLAN offloadability |

(d)

| EPS Bearer ID |
|---|
| TI |
| EPS bearer QoS |
| TFT |

FIG. 21

TERMINAL APPARATUS, MME, COMMUNICATION METHOD OF TERMINAL APPARATUS, AND COMMUNICATION METHOD OF MME

TECHNICAL FIELD

The present invention relates to a terminal apparatus and the like.

This application claims priority based on JP 2016-7689 filed on Jan. 19, 2016 in Japan, the contents of which are incorporated herein in its entirety by reference.

BACKGROUND ART

The 3rd Generation Partnership Project (3GPP), which undertakes activities for standardizing recent mobile communication systems, discusses System Architecture Enhancement (SAE), which is a system architecture of Long Term Evolution (LTE). 3GPP is in the process of creating specifications for the Evolved Packet System (EPS), as a communication system which realizes an all-IP architecture. Note that a core network constituting the EPS is called the Evolved Packet Core (EPC).

Furthermore, 3GPP recently discusses a Machine to Machine (M2M) communication technology. Note that the M2M communication may be machine-machine type communication. 3GPP discusses Cellular Internet of Things (CIoT), in particular, as a technology for supporting Internet of Things (IoT) in a cellular network of 3GPP.

IoT includes a mobile phone terminal such as a smartphone and refers to various IT equipment such as a personal computer and a sensor device, and CIoT extracts technical problems in connecting various terminal apparatuses like these to a cellular network to create specifications for solutions to the problems.

For example, it is demanded, in CIoT, to optimize a communication procedure for a terminal which needs to increase an efficiency of power consumption such that a battery can be maintained for several years, to cope with communication in an indoor or underground state, and to provide connectivities to a large amount of inexpensively mass-produced terminals. Furthermore, in CIoT, it is demanded to support low data rate communication of a simple end node as a requirement.

In this description, a terminal permitted to connect to these 3GPP core networks is called a CIoT terminal.

CITATION LIST

Non Patent Literature

NPL 1: 3rd Generation Partnership Project; Technical Specification Group Services and System Aspects; Architecture enhancements for Cellular Internet of Things; (Release 13)

SUMMARY OF INVENTION

Technical Problem

In CIoT, discussed is that a function unit having multiple functions is included in the core network in order to increase the efficiency of a control signal. Specifically, providing a CIoT Serving Gateway Node (C-SGN) responsible for functions of known MME, SGW, and PGW in the core network is discussed.

3GPP discusses that a CIoT terminal is connected to the core network through an access network of CIoT.

Note that the core network to which the CIoT terminal is connected may be a known core network accommodating a mobile phone terminal such as a smartphone, may be a core network for accommodating a logically divided CIoT terminal, or may be a core network physically different from the known core network.

However, a method for connecting to these core networks and a procedure for data transmission and/or reception to/from these core networks have not been made clear.

The present invention has been made in view of the above described situations, and has an object to provide a communication procedure for data transmission and/or reception suitable to a CIoT terminal.

Solution to Problem

In order to achieve the above object, a terminal apparatus according to the present invention includes a transmission and/or reception unit configured to perform communication by use of a first CIoT EPS Optimisation after completion of an attach procedure, in a case of changing a communication method, transmit a first control message to a core network, and receive a second control message as a response to the first control message from the core network, and perform communication by use of a second CIoT EPS Optimisation after receiving the second control message, and a control unit, wherein the transmission and/or reception unit, in the attach procedure, transmits an Attach Request message to the core network, receives an Attach Accept message from the core network, and transmits an Attach Complete message to the core network, the Attach Request message includes terminal apparatus capability information indicating support of the first CIoT EPS Optimisation and information indicating a request to use the first CIoT EPS Optimisation, and the Attach Accept message includes network capability information indicating support of the first CIoT EPS Optimisation, the control unit receives the network capability information indicating the support of the first CIoT EPS Optimisation to interpret that use of the communication by use of the first CIoT EPS Optimisation is accepted, the first control message includes information indicating a request to use the second CIoT EPS Optimisation, the second control message includes information indicating the second CIoT EPS Optimisation, and the control unit receives the information indicating the second CIoT EPS Optimisation to interpret that use of the communication by use of the second CIoT EPS Optimisation is accepted.

A Mobility Management Entity (MME) according to the present invention includes a transmission and/or reception unit configured to perform communication by use of a first CIoT EPS Optimisation after completion of an attach procedure, in a case of receiving a first control message from a terminal apparatus, transmit a second control message to the terminal apparatus as a response to the first control message, and a control unit, wherein the transmission and/or reception unit, in the attach procedure, receives an Attach Request message from the terminal apparatus, transmits an Attach Accept message to the terminal apparatus, and receives an Attach Complete message from the terminal apparatus, the Attach Request message includes terminal apparatus capability information indicating support of the first CIoT EPS Optimisation and information indicating a request to use the first CIoT EPS Optimisation, and the Attach Accept message includes network capability information indicating support of the first CIoT EPS Optimisation, the network capability information indicating the support of the first CIoT EPS Optimisation is used for the terminal apparatus to interpret that use of the communication by use of the first CIoT EPS Optimisation is accepted, the first control message includes information indicating a request to use a second CIoT EPS Optimisation, the second control message includes information indicating the second CIoT EPS Optimisation, the information indicating the second CIoT EPS Optimisation is used for the terminal apparatus to interpret that use of communication by use of the second CIoT EPS Optimisation is accepted, and the communication by use of the second CIoT EPS Optimisation is performed after transmitting the second control message.

A communication method of a terminal apparatus according to the present invention includes the steps of performing communication by use of a first CIoT EPS Optimisation after completion of an attach procedure, in a case of changing a communication method, transmitting a first control message to a core network, and receiving a second control message as a response to the first control message from the core network, and performing communication by use of a second CIoT EPS Optimisation after receiving the second control message, wherein in the attach procedure, an Attach Request message is transmitted to the core network, an Attach Accept message is received from the core network, and an Attach Complete message is transmitted to the core network, the Attach Request message includes terminal apparatus capability information indicating support of the first CIoT EPS Optimisation and information indicating a request to use the first CIoT EPS Optimisation, and the Attach Accept message includes network capability information indicating support of the first CIoT EPS Optimisation, by receiving the network capability information indicating the support of the first CIoT EPS Optimisation, interpreted is that use of the communication by use of the first CIoT EPS Optimisation is accepted, the first control message includes information indicating a request to use the second CIoT EPS Optimisation, the second control message includes information indicating the second CIoT EPS Optimisation, and by receiving the information indicating the second CIoT EPS Optimisation, interpreted is that use of the communication by use of the second CIoT EPS Optimisation is accepted.

A communication method of a Mobility Management Entity (MME) according the present invention includes the steps of performing communication by use of a first CIoT EPS Optimisation after completion of an attach procedure, and in a case of receiving a first control message from a terminal apparatus, transmitting a second control message to the terminal apparatus as a response to the first control message, wherein in the attach procedure, an Attach Request message is received from the terminal apparatus, an Attach Accept message is transmitted to the terminal apparatus, and an Attach Complete message is received from the terminal apparatus, the Attach Request message includes terminal apparatus capability information indicating support of the first CIoT EPS Optimisation and information indicating a request to use the first CIoT EPS Optimisation, and the Attach Accept message includes network capability information indicating support of the first CIoT EPS Optimisation, the network capability information indicating the support of the first CIoT EPS Optimisation is used for the terminal apparatus to interpret that use of the communication by use of the first CIoT EPS Optimisation is accepted, the first control message includes information indicating a request to use a second CIoT EPS Optimisation, the second control message includes information indicating the second CIoT EPS Optimisation, the information indicating the second CIoT EPS Optimisation is used for the terminal apparatus to interpret that use of communication by use of the second CIoT EPS Optimisation is accepted, and the communication by use of the second CIoT EPS Optimisation is performed after transmitting the second control message.

Advantageous Effects of Invention

According to the present invention, a CIoT terminal can attach to and/or detach from a core network capable of providing multiple transmission methods including a user data transmission method optimized for the CIoT terminal to perform communication.

BRIEF DESCRIPTION OF DRAWINGS

FIGS. 2A and 2B are diagrams illustrating an example of a configuration of an IP mobile communication network, and the like.

FIGS. 3A and 3B are diagrams illustrating an example of a configuration of an IP mobile communication network, and the like.

FIG. 7 is a diagram illustrating a storage unit of the MME.

FIG. 8 is a diagram illustrating the storage unit of the MME.

FIG. 9 is a diagram illustrating the storage unit of the MME.

FIG. 10 is a diagram illustrating the storage unit of the MME.

FIG. 11 is a diagram illustrating the storage unit of the MME.

FIG. 12 is a diagram illustrating the storage unit of the MME.

FIG. 14 is a diagram illustrating a storage unit of the SGW.

FIG. 15 is a diagram illustrating the storage unit of the SGW.

FIG. 18 is a diagram illustrating the storage unit of the PGW.

FIG. 21 is a diagram illustrating a storage unit of the UE.

DESCRIPTION OF EMBODIMENTS

Hereinafter, a preferred embodiment for carrying out the present invention will be described with reference to the drawings. Note that as an example, the present embodiment describes an embodiment of a mobile communication system to which the present invention is applied.

1. Embodiment 1.1. System Overview

Figure 1:
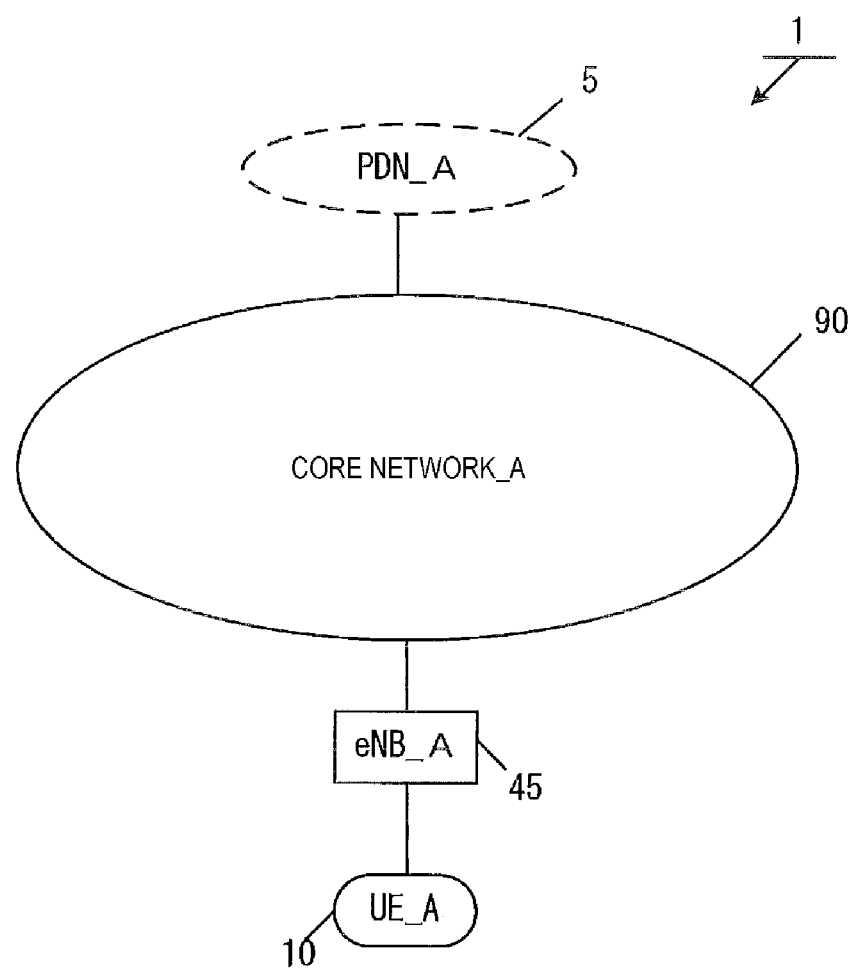
FIG. 1 is a diagram illustrating an overview of a mobile communication system.

FIG. 1 is a diagram illustrating an overview of a mobile communication system according to the present embodiment. As illustrated in FIG. 1, a mobile communication system 1 includes a mobile terminal apparatus UE_A 10, an eNB_A 45, a core network_A 90, and a PDN_A 5.

Here, the UE_A 10 may be any wirelessly connectable terminal apparatus, and may be a User equipment (UE), a Mobile equipment (ME), or a Mobile Station (MS).

Additionally, the UE_A 10 may be a CIoT terminal. The CIoT terminal is an IoT terminal connectable to the core network A 90, and the IoT terminal includes a mobile phone terminal such a smartphone and may be various IT equipment such as a personal computer and a sensor device.

In other words, in a case that the UE_A 10 is the CIoT terminal, the UE_A 10 may request a connection optimized for the CIoT terminal, based on a policy of the UE_A 10 or a request from the network, or may request the known connection. Alternatively, the UE_A 10 may be configured as a terminal apparatus which connects to the core network_A 90 only through a communication procedure optimized for the CIoT terminal beforehand when shipping.

Here, the core network_A 90 refers to an IP mobile communication network run by a Mobile Operator.

For example, the core network_A 90 may be a core network for the mobile operator that runs and manages the mobile communication system 1, or may be a core network for a virtual mobile operator such as a Mobile Virtual Network Operator (MVNO). Alternatively, the core network_A 90 may be a core network for accommodating the CIoT terminal.

Additionally, the eNB_A 45 is a base station constituting a radio access network used by the UE_A 10 to connect to the core network_A 90. In other words, the UE_A 10 connects to the core network_A 90 using the eNB_A 45.

Additionally, the core network_A 90 is connected to the PDN_A 5. The PDN_A 5 is a packet data service network which provides a communication service to the UE_A 10, and may be configured for each service. A communication terminal is connected to the PDN, the UE_A 10 can transmit and/or receive user data to/from the communication terminal located in the PDN_A 5.

The user data may be data transmitted and/or received between the UE_A 10 and devices included in the PDN_A 5. The UE_A 10 transmits the user data through the core network_A 90 to the PDN_A 5. In other words, the UE_A 10 transmits and/or receives the user data to/from the core network_A 90 in order to transmit and/or receive the user data to/from the PDN_A 5. More specifically, the UE_A 10 transmits and/or receives the user data to/from a gateway device such as a PGW_A 30 and a C-SGN_A 95 in the core network_A 90 in order to transmit and/or receive the user data to/from the PDN_A 5.

Next, an example of a configuration of the core network_A 90 will be described. In the present embodiment, two configuration examples of the core network_A 90 will be described.

Figure 2A:
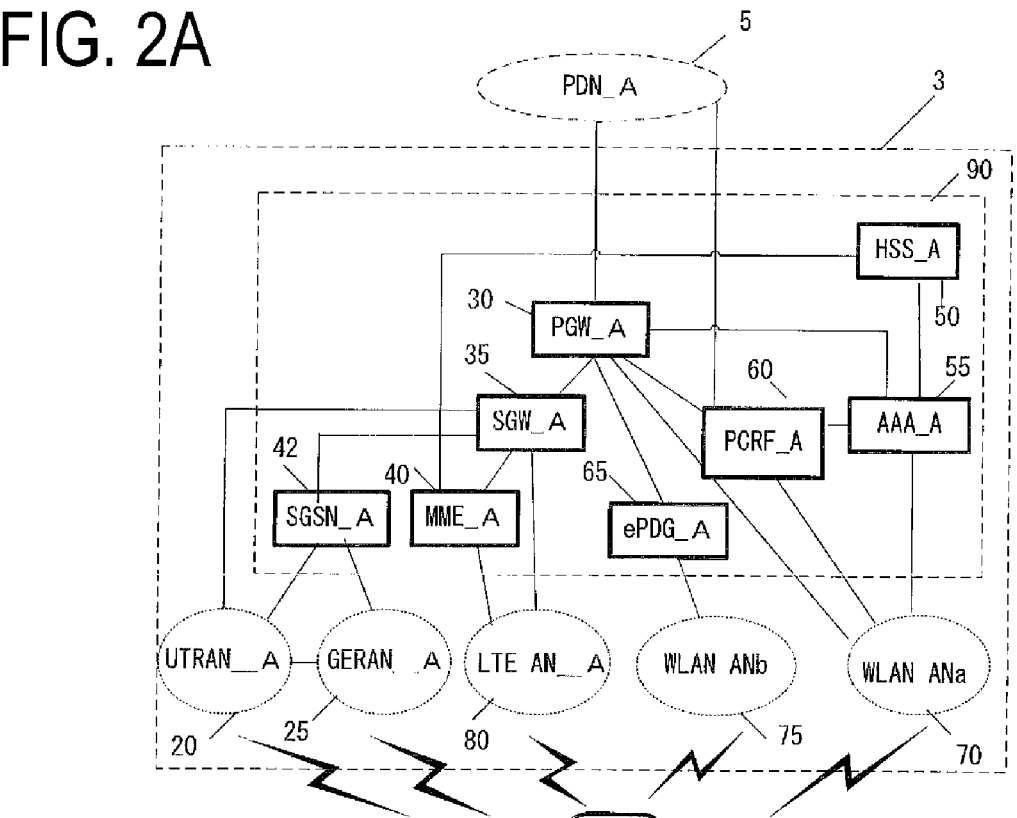
Figure 2B:
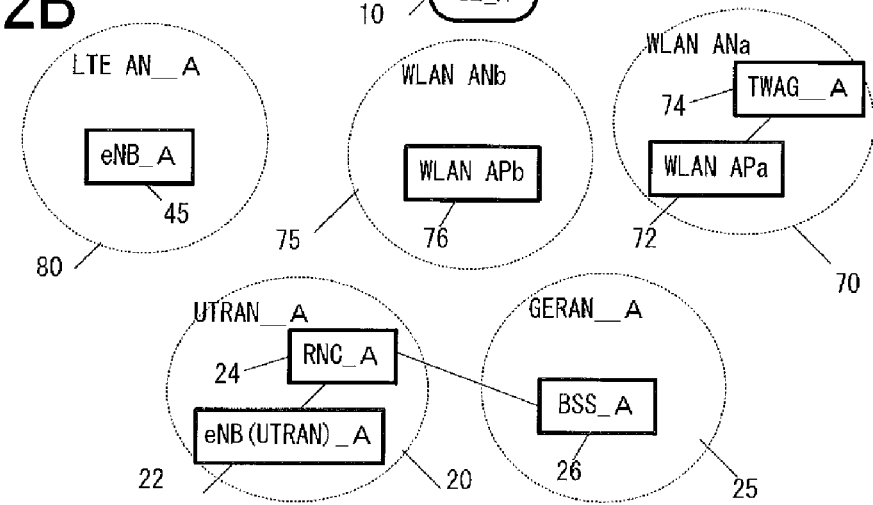

FIGS. 2A and 2B illustrate an example of the configuration of the core network_90. The core network_A 90 in FIG. 2A includes a Home Subscriber Server (HSS)_A 50, an Authentication, Authorization, Accounting (AAA)_A 55, a Policy and Charging Rules Function (PCRF)_A 60, a Packet Data Network Gateway (PGW)_A 30, an enhanced Packet Data Gateway (ePDG)_A 65, a Serving Gateway (SGW)_A 35, a Mobility Management Entity (MME)_A 40, and a Serving GPRS Support Node (SGSN)_A 42.

Furthermore, the core network_A 90 is capable of connecting to multiple radio access networks (an LTE AN_A 80, a WLAN ANb 75, a WLAN ANa 70, a UTRAN_A 20, and a GERAN_A 25).

Such a radio access network may be configured to connect to multiple different access networks, or may be configured to connect to either one of the access networks. Moreover, the UE_A 10 is capable of wirelessly connecting to the radio access network.

Moreover, a WLAN Access Network b (WLAN ANb 75) that connects to the core network via the ePDG_A 65 and a WLAN Access Network a (WLAN ANa 75) that connects to the PGW_A, the PCRF_A 60, and the AAA_A 55 can be configured as access networks connectable in a WLAN access system.

Note that each apparatus has a configuration similar to those of the devices of the related art in a mobile communication system using EPS, and thus, detailed descriptions thereof will be omitted. Each apparatus will be described briefly hereinafter.

The PGW_A 30 is connected to the PDN_A 5, the SGW_A 35, the ePDG_A 65, the WLAN ANa 70, the PCRF_A 60, and the AAA_A 55 and serves as a relay device configured to transfer user data by functioning as a gateway device between the PDN_A 5 and the core network_A 90.

The SGW_A 35 is connected to the PGW 30, the MME_A 40, the LTE AN 80, the SGSN_A 42, and the UTRAN_A 20, and serves as a relay device configured to transfer user data by functioning as a gateway device between the core network_A 90 and the 3GPP access network (the UTRAN_A 20, the GERAN_A 25, the LTE AN_A 80).

The MME_A 40 is connected to the SGW_A 35, the LTE AN 80, and the HSS_A 50, and serves as an access control device configured to perform location information management and access control for the UE_A 10 via the LTE AN 80. Furthermore, the core network_A 90 may include multiple location management devices. For example, a location management device different from the MME_A 40 may be configured. As with the MME_A 40, the location management device different from the MME_A 40 may be connected to the SGW_A 35, the LTE AN 80, and the HSS_A 50.

Furthermore, in a case that multiple MMEs are included in the core network_A 90, the MMEs may be connected to each other. With this configuration, the context of the UE_A 10 may be transmitted and/or received between the MMEs.

The HSS_A 50 is connected to the MME_A 40 and the AAA_A 55 and serves as a managing node configured to manage subscriber information. The subscriber information of the HSS_A 50 is referred to during MME_A 40 access control, for example. Moreover, the HSS_A 50 may be connected to the location management device different from the MME_A 40.

The AAA_A 55 is connected to the PGW 30, the HSS_A 50, the PCRF_A 60, and the WLAN ANa 70, and is configured to perform access control for the UE_A 10 connected via the WLAN ANa 70.

The PCRF_A 60 is connected to the PGW_A 30, the WLAN ANa 75, the AAA_A 55, and the PDN_A 5, and is configured to perform QoS management on data delivery. For example, the PCRF_A 60 manages QoS of a communication path between the UE_A 10 and the PDN_A 5.

The ePDG_A 65 is connected to the PGW 30 and the WLAN ANb 75 and is configured to deliver user data by functioning as a gateway device between the core network_A 90 and the WLAN ANb 75.

The SGSN_A 42 is connected to the UTRAN_A 20, the GERAN_A 25, and the SGW_A 35 and is a control device for location management between a 3G/2G access network (UTRAN/GERAN) and the LTE access network (E-UTRAN). In addition, the SGSN_A 42 has functions of: selecting the PGW and the SGW; managing a time zone of the UE; and selecting the MME at the time of handover to the E-UTRAN.

Additionally, as illustrated in FIG. 2B, each radio access network includes apparatuses to which the UE_A 10 is actually connected (such as a base station apparatus and an access point apparatus), and the like. The apparatuses used in these connections can be thought of as apparatuses adapted to the radio access networks.

In the present embodiment, the LTE AN 80 includes the eNB_A 45. The eNB_A 45 is a radio base station to which the UE_A 10 connects in an LTE access system, and the LTE AN_A 80 may include one or multiple radio base stations.

The WLAN ANa 70 is configured to include a WLAN APa 72 and a TWAG_A 74. The WLAN APa 72 is a radio base station to which the UE_A 10 connects in the WLAN access system trusted by the operator running the core network_A 90, and the WLAN ANa 70 may include one or multiple radio base stations. The TWAG_A 74 serves as a gateway device between the core network_A 90 and the WLAN ANa 70. The WLAN APa 72 and the TWAG_A 74 may be configured as a single device.

Even in a case that the operator running the core network_A 90 and the operator running the WLAN ANa 70 are different, such a configuration can be implemented through contracts and agreements between the operators.

Furthermore, the WLAN ANb 75 is configured to include a WLAN APb 76. The WLAN APb 76 is a radio base station to which the UE_A 10 connects in the WLAN access system in a case that no trusting relationship is established with the operator running the core network_A 90, and the WLAN ANb 75 may include one or multiple radio base stations.

In this manner, the WLAN ANb 75 is connected to the core network_A 90 via the ePDG_A 65, which is a device included in the core network_A 90, serving as a gateway. The ePDG_A 65 has a security function for ensuring security.

The UTRAN_A 20 is configured to include a Radio Network Controller (RNC)_A 24 and an eNB (UTRAN)_A 22. The eNB (UTRAN)_A 22 is a radio base station to which the UE_A 10 connects through a UMTS Terrestrial Radio Access (UTRA), and the UTRAN_A 20 may include one or multiple radio base stations. Furthermore, the RNC_A 24 is a control unit configured to connect the core network_A 90 and the eNB (UTRAN)_A 22, and the UTRAN_A 20 may include one or multiple RNCs. Moreover, the RNC_A 24 may be connected to one or multiple eNBs (UTRANs)_A 22. In addition, the RNC_A 24 may be connected to a radio base station (Base Station Subsystem (BSS)_A 26) included in the GERAN_A 25.

The GERAN_A 25 is configured to include a BSS_A 26. The BSS_A 26 is a radio base station to which the UE_A 10 connects through GSM (trade name)/EDGE Radio Access (GERA), and the GERAN_A 25 may be constituted of one or multiple radio base station BSSs. Furthermore, the multiple BSSs may be connected to each other. Moreover, the BSS_A 26 may be connected to the RNC_A 24.

Figure 3A:
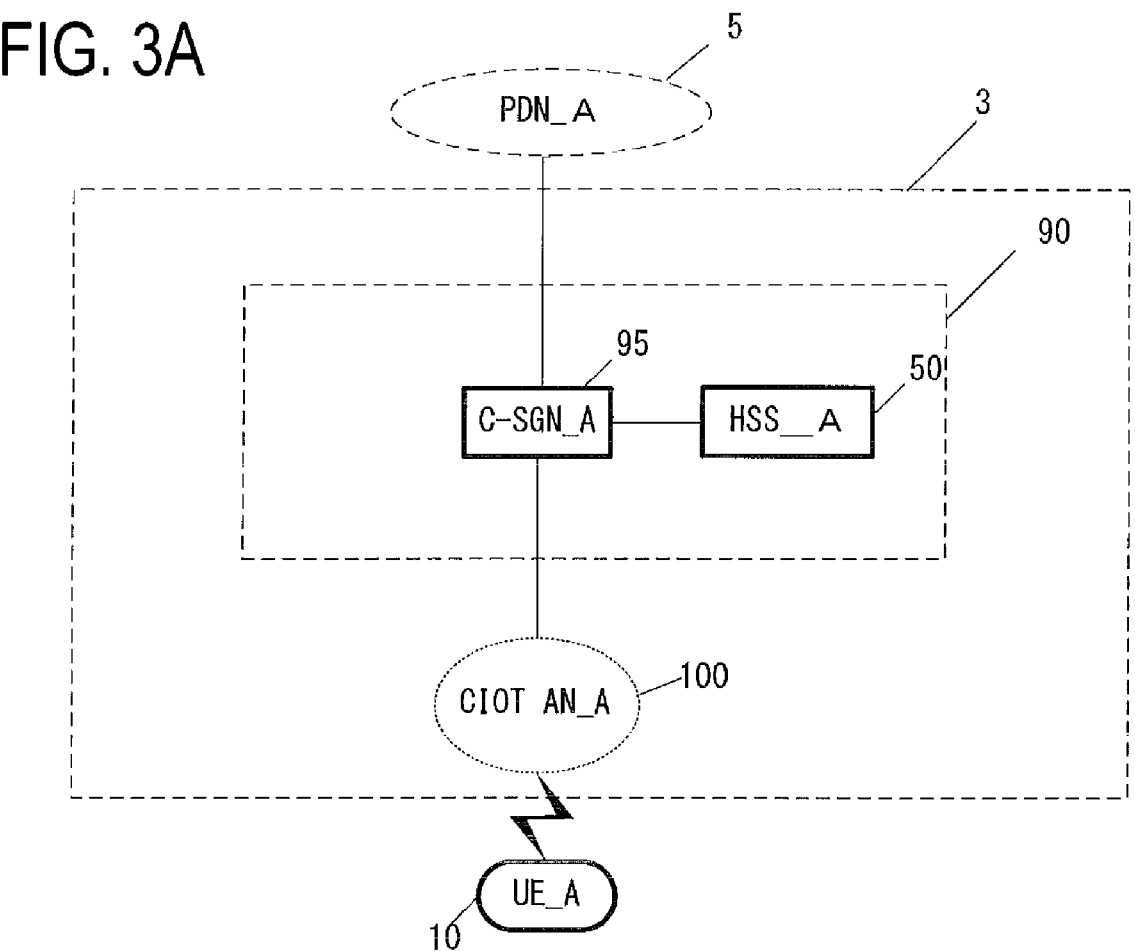
Figure 3B:
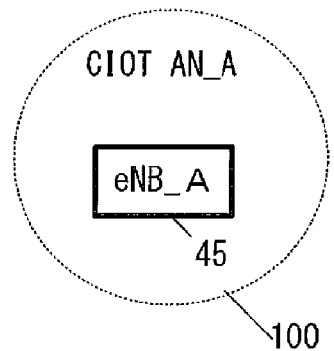

Next, a second example of a configuration of the core network_A 90 will be described. For example, in a case that the UE_A 10 is a CIoT terminal, the core network_A 90 may be configured as illustrated in FIGS. 3A and 3B. The core network_A 90 in FIGS. 3A and 3B includes a CIoT Serving Gateway Node (C-SGN)_A 95 and the HSS_A 50. Note that in the same manner as FIGS. 2A and 2B, in order for the core network_A 90 to provide connectivity to an access network other than LTE, the core network_A 90 may include the AAA_A 55 and/or the PCRF_A 60 and/or the ePDG_A 65 and/or the SGSN_A 42.

The C-SGN_A 95 may be a node that has some or all of functions of the MME_A 40, the SGW_A 35, and the PGW_A 30 in FIGS. 2A and 2B. The C-SGN_A 95 may be a node for managing connectivity establishment or disconnection, mobility and the like of the CIoT terminal.

In other words, the C-SGN_A 95 may have a gateway device function between the PDN_A and the core network_A 90, a gateway device function between the core network_A 90 and a CIOT AN_A 100, and a location management function of the UE_A 10.

As illustrated in the figures, the UE_A 10 connects to the core network_A 90 through the radio access network CIOT AN_A 100.

FIG. 3B illustrates the configuration of the CIOT AN_A 100. As illustrated in the drawing, the CIOT AN_A 100 may be configured including the eNB_A 45. The eNB_A 45 included in the CIOT AN_A 100 may be the same base station as the eNB_A 45 included in the LTE AN_A 80. Alternatively, the eNB_A 45 included in the CIOT AN_A 100 may be a base station for accommodating a CIoT terminal, which is different from the eNB_A 45 included in the LTE AN_A 80.

A first core network and/or a second core network may be configured to include a system optimized for the IoT.

Note that herein, the UE_A 10 being connected to radio access networks refers to the UE_A 10 being connected to a base station apparatus, an access point, or the like included in each of the radio access networks, and data, signals, and the like being transmitted and/or received also pass through those base station apparatuses, access points, or the like.

1.2. Apparatus Configuration

The configuration of each apparatus will be described below.

1.2.1. eNB Configuration

Figure 4:
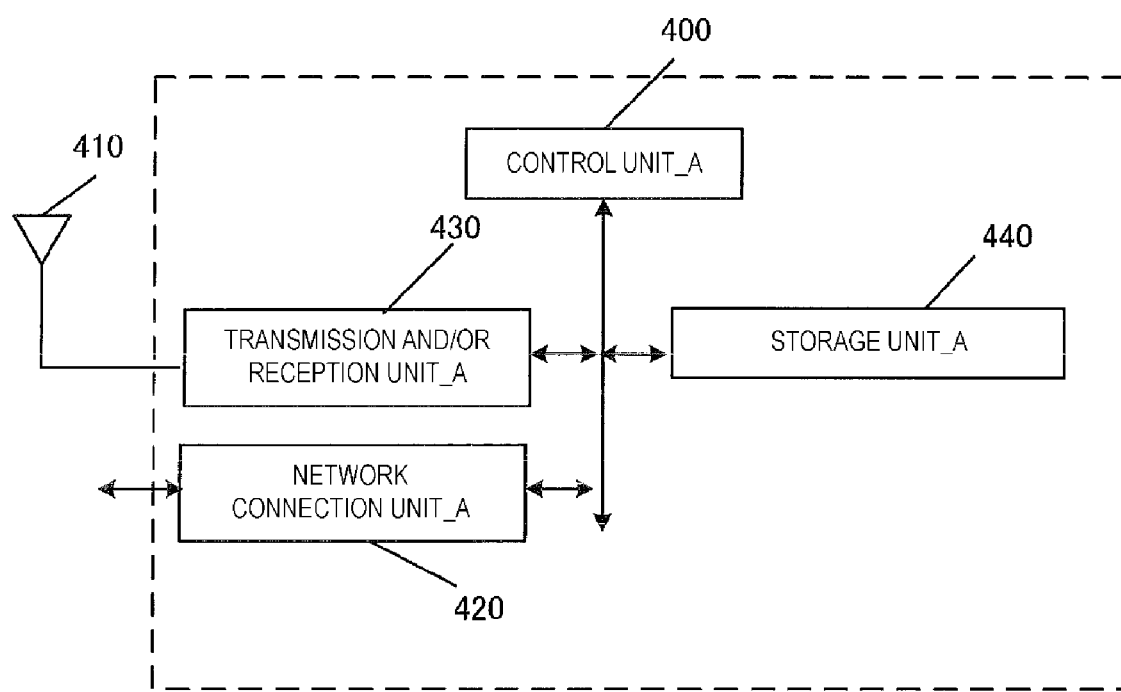
FIG. 4 is a diagram illustrating an apparatus configuration of an eNB.

The configuration of the eNB_A 45 will be described below. FIG. 4 illustrates an apparatus configuration of the eNB_A 45. As illustrated in FIG. 4, the eNB_A 45 includes a network connection unit_A 420, a transmission and/or reception unit_A 430, a control unit_A 400, and a storage unit_A 440. The network connection unit_A 420, the transmission and/or reception unit_A 430, and the storage unit_A 440 are connected to the control unit_A 400 via a bus.

The control unit_A 400 is a function unit for controlling the eNB_A 45. The control unit_A 400 implements various processes by reading out and executing various programs stored in the storage unit_A 440.

The network connection unit_A 420 is a function unit through which the eNB_A 45 connects to the MME_A 40 and/or the SGW_A 35 or the C-SGN_A 95. The network connection unit_A 420 is a transmission and/or reception function unit through which the eNB_A 45 transmits and/or receives user data and/or control data to/from the MME_A 40 and/or the SGW_A 35 or the C-SGN_A 95.

The transmission and/or reception unit_A 430 is a function unit through which the eNB_A 45 connects to the UE_A 10. Furthermore, the transmission and/or reception unit_A 430 is a transmission and/or reception function unit for transmitting/receiving user data and/or control data to/from the UE_A 10. Furthermore, an external antenna_A 410 is connected to the transmission and/or reception unit_A 430.

The storage unit_A 440 is a function unit for storing programs, data, and the like necessary for each operation of the eNB_A 45. A storage unit 640 is constituted of, for example, a semiconductor memory, a Hard Disk Drive (HDD), or the like.

The storage unit_A 440 may store at least identification information and/or control information and/or a flag and/or a parameter included in a control message which is transmitted and/or received in a communication procedure described later.

1.2.2. MME Configuration

Figure 6:
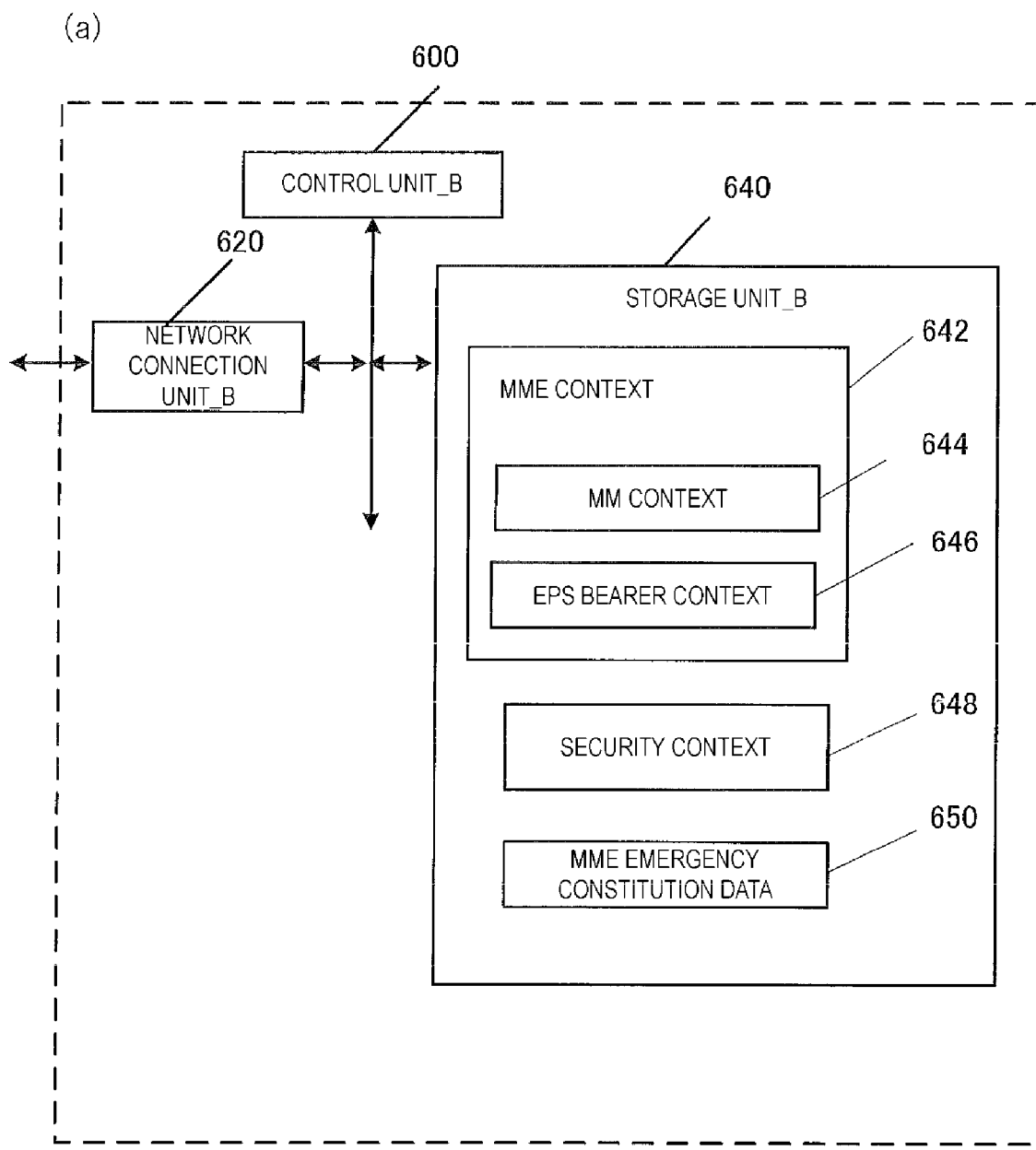
FIG. 6 is a diagram illustrating an apparatus configuration of an MME.

The configuration of the MME_A 40 will be described below. FIG. 6(*a*) illustrates an apparatus configuration of the MME_A 40. As illustrated in the drawing, the MME_A 40 includes a network connection unit_B 620, a control unit_B 600, and a storage unit_B 640. The network connection unit_B 620 and the storage unit_B 640 are connected to the control unit_B 600 via a bus.

The control unit_B 600 is a function unit for controlling the MME_A 40. The control unit_B 600 implements various processes by reading out and executing various programs stored in the storage unit_B 640.

The network connection unit_B 620 is a function unit through which the MME_A 40 connects to the eNB_A 45 and/or the HSS_A 50 and/or the SGW_A 35. Moreover, the network connection unit_B 620 is a transmission and/or reception function unit through which the MME_A 40 transmits and/or receives user data and/or control data to/from the eNB_A 45 and/or the HSS_A 50 and/or the SGW_A 35.

The storage unit_B 640 is a function unit for storing programs, data, and the like necessary for each operation of the MME_A 40. The storage unit_B 640 is constituted of, for example, a semiconductor memory, a Hard Disk Drive (HDD), or the like.

The storage unit_B 640 may store at least identification information and/or control information and/or a flag and/or a parameter included in a control message which is transmitted and/or received in a communication procedure described later.

As illustrated in the drawing, the storage unit_B 640 stores an MME context 642, a security context 648, and MME emergency configuration data 650. Note that the MME context includes an MM context 644 and an EPS bearer context 646. Alternatively, the MME context may include an EMM context and an ESM context. The MM context 644 may be the EMM context, and the EPS bearer context 646 may be the ESM context.

FIG. 7(*b*), FIG. 8(*b*), and FIG. 9(*b*) illustrate information elements of the MME context stored for each UE. As illustrated in the drawings, the MME context stored for each UE includes an IMSI, an IMSI-unauthenticated-indicator, an MSISDN, an MM State, a GUTI, an ME Identity, a Tracking Area List, a TAI of last TAU, an E-UTRAN Cell Global Identity (ECGI), an E-UTRAN Cell Identity Age, a CSG ID, a CSG membership, an Access mode, an Authentication Vector, a UE Radio Access Capability, an MS Classmark 2, an MS Classmark 3, Supported Codecs, a UE Network Capability, an MS Network Capability, UE Specific DRX Parameters, a Selected NAS Algorithm, an eKSI, a K_ASME, NAS Keys and COUNT, a Selected CN operator ID, a Recovery, an Access Restriction, an ODB for PS parameters, an APN-OI Replacement, an MME IP address for S11, an MME TEID for S11, an S-GW IP address for S11/S4, an S GW TEID for S11/S4, an SGSN IP address for S3, an SGSN TEID for S3, an eNodeB Address in Use for S1-MME, an eNB UE S1AP ID, an MME UE S1AP ID, a Subscribed UE-AMBR, a UE-AMBR, EPS Subscribed Charging Characteristics, a Subscribed RFSP Index, an RFSP Index in Use, a Trace reference, a Trace type, a Trigger ID, an OMC identity, a URRP-MME, CSG Subscription Data, a LIPA Allowed, a Subscribed Periodic RAU/TAU Timer, an MPS CS priority, an MPS EPS priority, a Voice Support Match Indicator, and a Homogenous Support of IMS Voice over PS Sessions.

The IMSI is permanent identification information of a user. The IMSI is identical to the IMSI stored in the HSS_A 50.

The IMSI-unauthenticated-indicator is instruction information indicating that this IMSI is not authenticated.

The MSISDN represents a phone number of UE. The MSISDN is indicated by a storage unit of the HSS_A 50.

The MM State indicates a Mobility management state of the MME. This management information indicates an ECM-IDLE state in which a connection between the eNB and the core network is released, an ECM-CONNECTED state in which the connection between the eNB and the core network is not released, or an EMM-DEREGISTERED state in which the MME does not store the location information of the UE.

The Globally Unique Temporary Identity (GUTI) is temporary identification information about the UE. The GUTI includes the identification information about the MME (Globally Unique MME Identifier (GUMMEI)) and the identification information about the UE in a specific MME (M-TMSI).

The ME Identity is an ID of the UE, and may be the IMEI/IMISV, for example.

The Tracking Area List is a list of tracking area identification information which is assigned to the UE.

The TAI of last TAU is the tracking area identification information indicated by a recent tracking area update procedure.

The ECGI is cell identification information of the recent UE known by the MME_A 40.

The E-UTRAN Cell Identity Age indicates the elapsed time since the MME acquires the ECGI.

The CSG ID is identification information of a Closed Subscriber Group (CSG), in which the UE recently operates, known by the MME.

The CSG membership is member information of the CSG of the recent UE known by the MME. The CSG membership indicates whether the UE is the CSG member.

The Access mode is an access mode of a cell identified by the ECGI, may be identification information indicating that the ECGI is a hybrid which allows to access both the UEs which is the CSG and is not the CSG.

The Authentication Vector indicates a temporary Authentication and Key Agreement (AKA) of a specific UE followed by the MME. The Authentication Vector includes a random value RAND used for authentication, an expectation response XRES, a key K_ASME, and a language (token) AUTN authenticated by the network.

The UE Radio Access Capability is identification information indicating a radio access capability of the UE.

The MS Classmark 2 is a classification symbol (Classmark) of a core network of a CS domain of 3G/2G (UTRAN/GERAN). The MS Classmark 2 is used in a case that the UE supports a Single Radio Voice Call Continuit (SRVCC) for the GERAN or the UTRAN.

The MS Classmark 3 is a classification symbol (Classmark) of a radio network of the CS domain of the GERAN. The MS Classmark 3 is used in a case that the UE supports the Single Radio Voice Call Continuit (SRVCC) for the GERAN.

The Supported Codecs are a code list supported by the CS domain. This list is used in a case that the UE supports the SRVCC for the GERAN or the UTRAN.

The UE Network Capability includes an algorithm of security supported by the UE and a key derivative function.

The MS Network Capability is information including at least one kind of information necessary for the SGSN to the UE having the GERAN and/or UTRAN function.

The UE Specific DRX Parameters are parameters used for determining a Discontinuous Reception (DRX) cycle length of the UE. Here, the DRX is a function for changing the UE to a low-power-consumption mode in a case that there is no communication in a certain period of time, in order to reduce power consumption of a battery of the UE as much as possible.

The Selected NAS Algorithm is a selected security algorithm of a Non-Access Stream (NAS).

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on a Cipher Key (CK) and an Integrity Key (IK).

The NAS Keys and COUNT includes a key K_NASint, a key K_NASenc, and a NAS COUNT parameter. The key K_NASint is a key for encryption between the UE and the MME, the key K_NASenc is a key for security protection between the UE and the MME. Additionally, the NAS COUNT is a count which starts a count in a case that a new key by which security between the UE and the MME is established is configured.

The Selected CN operator ID is identification information, which is used for sharing the network among operators, of a selected core network operator.

The Recovery is identification information indicating whether the HSS performs database recovery.

The Access Restriction is registration information for access restriction.

The ODB for PS parameters indicates a state of an operator determined barring (ODB). Here, the ODB is an access rule determined by the network operator (operator).

The APN-OI Replacement is a domain name substituting for APN when PGW FQDN is constructed in order to execute a DNS resolution. This substitute domain name is applied to all APNs.

The MME IP address for S11 is an IP address of the MME used for an interface with the SGW.

The MME TEID for S11 is a Tunnel Endpoint Identifier (TEID) used for the interface with the SGW.

The S-GW IP address for S11/S4 is an IP address of the SGW used for an interface between the MME and the SGW or between the SGSN and the MME.

The S GW TEID for S11/S4 is a TEID of the SGW used for the interface between the MME and the SGW or between the SGSN and the MME.

The SGSN IP address for S3 is an IP address of the SGSN used for the interface between the MME and the SGSN.

The SGSN TEID for S3 is a TEID of the SGSN used for the interface between the MME and the SGSN.

The eNodeB Address in Use for S1-MME is an IP address of the eNB recently used for an interface between the MME and the eNB.

The eNB UE S1AP ID is identification information of the UE in the eNB.

The MME UE S1AP ID is identification information of the UE in the MME.

The Subscribed UE-AMBR indicates the maximum value of a Maximum Bit Rate (MBR) of uplink communication and downlink communication for sharing all Non-Guaranteed Bit Rate (GBR) bearers (non-guaranteed bearers) in accordance with user registration information.

The UE-AMBR indicates the maximum value of the MBR of the uplink communication and the downlink communication which are recently used for sharing all the Non-GBR bearers (non-guaranteed bearers).

The EPS Subscribed Charging Characteristics indicate a charging performance of the UE. For example, the EPS Subscribed Charging Characteristics may indicate registration information such as normal, prepaid, a flat rate, hot billing, or the like.

The Subscribed RFSP Index is an index for a specific RRM configuration in the E-UTRAN acquired from the HSS.

The RFSP Index in Use is an index for the specific RRM configuration in the E-UTRAN which is recently used.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying an OMC which receives the record of the trace.

The URRP-MME is identification information indicating that the HSS requests UE activity notification from the MME.

The CSG Subscription Data are a relevant list of a PLMN (VPLMN) CSG ID of a roaming destination and an equivalent PLMN of the roaming destination. The CSG Subscription Data may be associated with an expiration date indicating an expiration date of the CSG ID and an absent expiration date indicating that there is no expiration date for each CSG ID. The CSG ID may be used for a specific PDN connection through LIPA.

The LIPA Allowed indicates whether the UE is allowed to use LIPA in this PLMN. The Subscribed Periodic RAU/TAU Timer is a timer of a periodic RAU and/or TAU.

The MPS CS priority indicates that the UE is registered in eMLPP or a 1×RTT priority service in the CS domain.

The MPS EPS priority is identification information indicating that the UE is registered in MPS in the EPS domain.

The Voice Support Match Indicator indicates whether a radio capability of the UE is compatible with the network configuration. For example, the Voice Support Match Indicator indicates whether the SRVCC support by the UE matches the support for voice call by the network.

The Homogenous Support of IMS Voice over PS Sessions for MME is instruction information indicating, for each UE, whether an IMS voice call on a PS session is supported. The Homogenous Support of IMS Voice over PS Sessions for MME includes "Supported" in which an IP Multimedia Subsystem (IMS) voice call on a Packet Switched (PS: line switching) session in all the Tracking Areas (TAs) managed by the MME is supported, and "Not Supported" indicating a case where there is no TA in which the IMS voice call on the PS session is supported. Additionally, the MME does not notify the HSS of this instruction information, in a case that the IMS voice call on the PS session is not uniformly supported (the TA in which the support is performed and the TA in which the support is not performed are both present in the MME), and in a case that it is not clear whether to be supported.

FIG. 10(c) illustrates information elements included in the MME context for each PDN connection stored for each PDN connection. As illustrated in the drawing, the MME context for each PDN connection includes an APN in Use, an APN Restriction, an APN Subscribed, a PDN Type, an IP Address, EPS PDN Charging Characteristics, an APN-OI Replacement, SIPTO permissions, a Local Home Network ID, LIPA permissions, a WLAN offloadability, a VPLMN Address Allowed, a PDN GW Address in Use (control information), a PDN GW TEID for S5/S8 (control information), an MS Info Change Reporting Action, a CSG Information Reporting Action, a Presence Reporting Area Action, an EPS subscribed QoS profile, a Subscribed APN-AMBR, an APN-AMBR, a PDN GW GRE Key for uplink traffic (user data), a Default bearer, and a low access priority.

The APN in Use indicates an APN which is recently used. This APN includes identification information about the APN network and identification information about a default operator.

The APN Restriction indicates a restriction on a combination of an APN type to an APN associated with this bearer context. In other words, the APN Restriction is information for restricting the number of APNs which can be established and the APN type.

The APN Subscribed refers to a registration APN received from the HSS.

The PDN Type indicates the type of the IP address. The PDN Type indicates IPv4, IPv6, or IPv4v6, for example.

The IP Address indicates an IPv4 address or an IPv6 Prefix. Note that the IP address may store both the IPv4 and IPv6 prefixes.

The EPS PDN Charging Characteristics indicate a charging performance. The EPS PDN Charging Characteristics may indicate, for example, normal, prepaid, a flat rate, or hot billing.

The APN-OI Replacement is a proxy domain name of APN having the same role as that of the APN-OI Replacement, registered for each UE. Note that the APN-OI Replacement has a higher priority than that of the APN-OI Replacement for each UE.

The SIPTO permissions indicate permission information to a Selected IP Traffic Offload (SIPTO) of traffic using this APN. Specifically, the SIPTO permissions identify a prohibition of the use of SIPTO, permission of the use of SIPTO in the network excluding the local network, permission of the use of SIPTO in the network including the local network, or permission of the use of SIPTO only in the local network.

The Local Home Network ID indicates identification information of a home network to which the base station belongs, in a case that SIPTO (SIPTO@LN) using the local network can be used.

The LIPA permissions are identification information indicating whether this PDN can access through LIPA. Specifically, the LIPA permissions may be a LIPA-prohibited which does not permit LIPA, a LIPA-only which permits only LIPA, or a LIPA-conditional which permits LIPA depending on a condition.

The WLAN offload ability is identification information indicating whether traffic connected through this APN can perform offload to the wireless LAN by utilizing a cooperative function between the wireless LAN and 3GPP, or maintains the 3GPP connection. The WLAN offload ability may vary for each RAT type. Specifically, different WLAN offload abilities may be present for LTE (E-UTRA) and 3G (UTRA).

The VPLMN Address Allowed indicates whether a connection in which the UE uses this APN is allowed to use only an HPLMN domain (IP address) PGW in a PLMN (VPLMN) of the roaming destination or allowed to use additionally the PGW in the VPLMN domain. The PDN GW Address in Use (control information) indicates a recent IP address of the PGW. This address is used when a control signal is transmitted.

The PDN GW TEID for S5/S8 (control information) is a TEID used for transmission and/or reception of the control information in an interface (S5/S8) between the SGW and the PGW.

The MS Info Change Reporting Action is an information element indicating that it is necessary to notify the PGW of user location information being changed.

The CSG Information Reporting Action is an information element indicating that it is necessary to notify the PGW of CSG information being changed.

The Presence Reporting Area Action indicates necessity of notification of the change as to whether the UE is present in a Presence Reporting Area. This information element separates into identification information of the presence reporting area and an element included in the presence reporting area.

The EPS subscribed QoS profile indicates a QoS parameter to a Default Bearer at a bearer level.

The Subscribed APN-AMBR indicates the maximum value of the Maximum Bit Rate (MBR) of the uplink communication and the downlink communication for sharing all the Non-GBR bearers (non-guaranteed bearers) established for this APN in accordance with the user registration information.

The APN-AMBR indicates the maximum value of the Maximum Bit Rate (MBR) of the uplink communication and the downlink communication for sharing all the Non-GBR bearers (non-guaranteed bearers) established for this APN, which has been determined by the PGW.

The PDN GW GRE Key for uplink traffic (user data) is a Generic Routing Encapsulation (GRE) key for the uplink communication of the user data in an interface between the SGW and the PGW.

The Default Bearer is EPS bearer identification information, which is information acquired and/or generated in establishing a PDN connection, for identifying the Default Bearer associated with the PDN connection.

The EPS bearer in the present embodiment may be a communication path established between the UE_A 10 and the C-SGN_A 95. Furthermore, the EPS bearer may include a Radio Bearer (RB) established between the UE_A 10 and the eNB_A 45, and an S1 bearer established between the eNB_A 45 and the C-SGN_A 95. Here, the RB and the EPS bearer may be associated with each other on a one-to-one basis. Therefore, identification information of the RB may be associated with the identification information of the EPS bearer on a one-to-one basis, or may be the same identification information as of the EPS bearer.

The EPS bearer may be a logical communication path established between the UE_A 10 and the PGW_A 30. In this case also, the EPS bearer may be configured to include the Radio Bearer (RB) established between the UE_A 10 and the eNB_A 45. Furthermore, the RB and the EPS bearer may be associated with each other on a one-to-one basis. Therefore, identification information of the RB may be associated with the identification information of the EPS bearer on a one-to-one basis, or may be the same identification information as of the EPS bearer.

Therefore, the Default Bearer may be identification information identifying a Signalling Radio Bearer (SRB) and/or a Control Signalling Radio Bearer (CRB), or identification information identifying a Data Radio Bearer (DRB).

Here, the SRB in the present embodiment may be originally an RB established for transmitting and/or receiving the control information such as the control message. Here, the CRB in the present embodiment may be originally an RB established for transmitting and/or receiving the control information such as the control message. In the present embodiment, the RB for originally transmitting and/or receiving the control message is used to transmit and/or receive the user data. Therefore, the present embodiment uses the SRB or the CRB to transmit and/or receive the control message and the user data.

The DRB in the present embodiment may be an RB established for transmitting and/or receiving the user data.

The low access priority indicates that the UE requests a low access priority, when the PDN connection is opened.

FIG. 11(*d*) illustrates the MME context stored for each bearer. As illustrated in the drawing, the MME context stored for each bearer includes an EPS Bearer ID, a TI, an S-GW IP address for S1-u, an S-GW TEID for S1u, a PDN GW TEID for S5/S8, a PDN GW IP address for S5/S8, an EPS bearer QoS, and a TFT.

The EPS Bearer ID is the only identification information for identifying the EPS bearer for a UE connection via the E-UTRAN.

Note that the EPS Bearer ID may be EPS bearer identification information identifying a dedicated bearer. Therefore, the EPS bearer ID may be identification information identifying the EPS bearer different from the Default Bearer.

As already described above, the EPS bearer may be a communication path established between the UE_A 10 and the C-SGN_A 95. Furthermore, the EPS bearer may include a Radio Bearer (RB) established between the UE_A 10 and the eNB_A 45, and an S1 bearer established between the eNB_A 45 and the C-SGN_A 95. Here, the RB and the EPS bearer may be associated with each other on a one-to-one basis. Therefore, identification information of the RB may be associated with the identification information of the EPS bearer on a one-to-one basis, or may be the same identification information as of the EPS bearer.

The EPS bearer may be a logical communication path established between the UE_A 10 and the PGW_A 30. In this case also, the EPS bearer may be configured to include the Radio Bearer (RB) established between the UE_A 10 and the eNB_A 45. Furthermore, the RB and the EPS bearer may be associated with each other on a one-to-one basis. Therefore, identification information of the RB may be associated with the identification information of the EPS bearer on a one-to-one basis, or may be the same identification information as of the EPS bearer.

Therefore, the EPS bearer ID identifying the dedicated bearer may be identification information identifying a Signalling Radio Bearer (SRB) and/or a Control Signalling Radio Bearer (CRB), or identification information identifying a Data Radio Bearer (DRB).

Here, as already described above, the SRB in the present embodiment may be originally an RB established for transmitting and/or receiving the control information such as the control message. Here, the CRB in the present embodiment may be originally an RB established for transmitting and/or receiving the control information such as the control message. In the present embodiment, the RB for originally transmitting and/or receiving the control message is used to transmit and/or receive the user data. Therefore, the present embodiment uses the SRB or the CRB to transmit and/or receive the control message and the user data.

The DRB in the present embodiment may be an RB established for transmitting and/or receiving the user data.

The TI is an abbreviation of a "Transaction Identifier", and is identification information identifying a bidirectional message flow (Transaction).

The S-GW IP address for S1-u is an IP address of the SGW used for an interface between the eNB and the SGW.

In a case that the user data is transmitted and/or received with being included in the message for control information, the S-GW IP address for S1-u may be an IP address of the SGW used for the interface between the MME and/or the SGSN and the SGW, or may be the S-GW IP address for S11/S4.

The S-GW TEID for S1u is a TEID of the SGW used for the interface between the eNB and the SGW.

In a case that the MME and/or the user data is transmitted and/or received with being included in the message for control information, the S-GW TEID for S1u may be a TEID address of the SGW used for the interface between the SGSN and the SGW, or may be the S-GW TEID for S11/S4.

The PDN GW TEID for S5/S8 is a TEID of the PGW for user data transmission in the interface between the SGW and the PGW.

The PDN GW IP address for S5/S8 is an IP address of the PGW for user data transmission in the interface between the SGW and the POW.

The EPS bearer QoS includes a QoS Class Identifier (QCI) and an Allocation and Retention Priority (ARP). QCI indicates a class to which the QoS belongs. QoS can be classified in accordance with presence or absence of band control, an allowable delay time, a packet loss rate, or the like. The QCI includes information indicating the priority. ARP is information representing a priority relating to maintaining the bearer.

The TFT is an abbreviation of a "Traffic Flow Template", and indicates all packet filters associated with the EPS bearer.

Here, the information elements included in the MME context illustrated in FIG. 7(*b*) to FIG. 11(*d*) are included in either the MM context 644 or the EPS bearer context 646. For example, the MME context for each bearer illustrated in FIG. 11(*d*) may be stored in the EPS bearer context, and the other information elements may be stored in the MM context. Alternatively, the MME context for each PDN connection illustrated in FIG. 10(*c*) and the MME context for each bearer illustrated in FIG. 11(*d*) may be stored in the EPS bearer context, and the other information elements may be stored in the MM context.

As illustrated in FIG. 6(a), the storage unit_B 640 of the MME may store the security context 648. FIG. 12(e) illustrates information elements included in the security context 648.

As illustrated in the drawing, the security context includes an EPS AS security context and an EPS NAS security context. The EPS AS security context is a context relating to security of an access stratum (Access Stream (AS)), the EPS NAS security context is a context relating to security of a non-access stratum (Non-Access Stream (NAS)).

FIG. 12(f) illustrates information elements included in the EPS AS security context. As illustrated in the figure, the EPS AS security context includes a cryptographic key, a Next Hop parameter (NH), a Next Hop Chaining Counter parameter (NCC), and identifiers of the selected AS level cryptographic algorithms.

The cryptographic key is an encryption key in an access stratum.

The NH is an information element determined from the K_ASME. The NH is an information element for enabling a forward security.

The NCC is an information element associated with the NH. The NCC represents the number of occurrences of handovers in a vertical direction changing the network.

The identifiers of the selected AS level cryptographic algorithms are identification information of a selected encryption algorithm.

FIG. 12(g) illustrates information elements included in the EPS NAS security context. As illustrated in the drawing, the EPS NAS security context may include the K_ASME, a UE Security capabilitie, and the NAS COUNT.

The K_ASME is a key for E-UTRAN key hierarchy generated based on the keys CK and IK.

The UE Security capabilitie is a set of identification information corresponding to a cipher and an algorithm used by the UE. This information includes information for the access stratum and information for the non-access stratum. Furthermore, in a case that the UE supports access to the UTRAN/GERAN, this information includes information for the UTRAN/GERAN.

The NAS COUN is a counter indicating the time during which the K_ASME is operating.

The security context 648 may be included in the MME context 642. Additionally, as illustrated in FIG. 6(a), the security context 648 and the MME context 642 may be separately present.

FIG. 12(h) illustrates information elements stored in the MME emergency configuration data 650. The MME emergency configuration data is information which is used instead of registration information of the UE acquired from the HSS. As illustrated in the drawing, the MME emergency configuration data 650 includes an Emergency Access Point Name (em APN), an Emergency QoS profile, an Emergency APN-AMBR, an Emergency PDN GW identity, and a Non-3GPP HO Emergency PDN GW identity.

The em APN indicates an access point name used for the PDN connection for emergency.

The Emergency QoS profile indicates QoS of the Default Bearer of em APN at a bearer level.

The Emergency APN-AMBR indicates the maximum value of the MBR of the uplink communication and the downlink communication for sharing the Non-GBR bearers (non-guaranteed bearers) established for em APN. This value is determined by the PGW.

The Emergency PDN GW identity is identification information of the PGW statically configured on the em APN. This identification information may be an FQDN or an IP address.

The Non-3GPP HO Emergency PDN GW identity is identification information of the PGW statically configured on the em APN, in a case that the PLMN supports a handover to an access network other than 3GPP. This identification information may be an FQDN or an IP address.

Furthermore, the MME_A 40 may manage a connection state with respect to the UE while synchronizing with the UE.

1.2.3. SGW Configuration

Hereinafter, the configuration of the SGW_A 35 will be described. FIG. 13(a) illustrates an apparatus configuration of the SGW_A 35. As illustrated in the drawing, the SGW_A 35 includes a network connection unit_C 1320, a control unit_C 1300, and a storage unit_C 1340. The network connection unit_C 1320 and the storage unit_C 1340 are connected to the control unit_C 1300 via a bus.

The control unit_C 1300 is a function unit for controlling the SGW_A 35. The control unit_C 1300 implements various processes by reading out and executing various programs stored in the storage unit_C 1340.

The network connection unit_C 1320 is a function unit through which the SGW_A 35 connects to the eNB_A 45 and/or the MME_A 40 and/or the PGW_A 30 and/or SGSN_A 42. The network connection unit_C 1320 is a transmission and/or reception function unit through which the SGW_A 35 transmits and/or receives user data and/or control data to/from the eNB_A 45 and/or the MME_A 40 and/or the PGW_A 30 and/or SGSN_A 42.

The storage unit_C 1340 is a function unit for storing programs, data, and the like necessary for each operation of the SGW_A 35. The storage unit_C 1340 is constituted of, for example, a semiconductor memory, a Hard Disk Drive (HDD), or the like.

The storage unit_C 1340 may store at least identification information and/or control information and/or a flag and/or a parameter included in the control message transmitted and/or received in a communication procedure described.

As illustrated in the drawing, the storage unit_C 1340 stores an EPS bearer context 1342. Note that the EPS bearer context includes an EPS bearer context stored for each UE, an EPS bearer context stored for each PDN, and an EPS bearer context stored for each bearer.

FIG. 14(b) illustrates information elements of the EPS bearer context stored for each UE. As illustrated in FIG. 14(b), the EPS bearer context stored for each UE includes an IMSI, an MS1-unauthenticated-indicator, an ME Identity, an MSISDN, a Selected CN operator id, an MME TEID for S11, an MME IP address for S11, an S-GW TEID for S11/S4, an S-GW IP address for S11/S4, an SGSN IP address for S4, an SGSN TEID for S4, a Trace reference, a Trace type, a Trigger ID, an OMC identity, a Last known Cell Id, and a Last known Cell Id age.

The IMSI is permanent identification information of a user. The IMSI is identical to the IMSI in the HSS_A 50.

The IMSI-unauthenticated-indicator is instruction information indicating that this IMSI is not authenticated.

The ME Identity is identification information of the UE, and may be the IMEI/IMISV, for example.

The MSISDN represents a basic phone number of the UE. The MSISDN is indicated by a storage unit of the HSS_A 50.

The Selected CN operator id is identification information, which is used for sharing the network among operators, of a selected core network operator.

The MME TEID for S11 is a TEID of the MME used for the interface between the MME and the SGW.

The MME IP address for S11 is an IP address of the MME used for the interface between the MME and the SGW.

The S-GW TEID for S11/S4 is a TEID of the SGW used for the interface between the MME and the SGW, or the interface between the SGSN and the SGW.

The S-GW IP address for S11/S4 is an IP address of the SGW used for the interface between the MME and the SGW, or the interface between the SGSN and the SGW.

The SGSN IP address for S4 is an IP address of the SGSN used for the interface between the SGSN and the SGW.

The SGSN TEID for S4 is a TEID of the SGSN used for the interface between the SGSN and the SGW.

The Trace reference is identification information for identifying a specific trace record or a record set.

The Trace Type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying an OMC which receives the record of the trace.

The Last known Cell ID is recent location information of the UE notified by the network.

The Last known Cell ID age is information indicating the period from the time when the Last known Cell ID is stored to the present.

Furthermore, the EPS bearer context includes an EPS bearer context for each PDN connection stored for each PDN connection. FIG. 15(c) illustrates the EPS bearer context for each PDN connection. As illustrated in the drawing, the EPS bearer context for each PDN connection includes an APN in Use, EPS PDN Charging Characteristics, a P-GW Address in Use (control information), a P-GW TEID for S5/S8 (control information), a P-GW Address in Use (user data), a P-GW GRE Key for uplink (user data), an S-GW IP address for S5/S8 (control information), an S-GW TEID for S5/S8 (control information), an S GW Address in Use (user data), a S-GW GRE Key for downlink traffic (user data), and a Default Bearer.

The APN in Use indicates an APN which is recently used. This APN includes identification information about the APN network and identification information about a default operator. Additionally, this information is information acquired from the MME or the SGSN.

The EPS PDN Charging Characteristics indicate a charging performance. The EPS PDN Charging Characteristics may indicate, for example, normal, prepaid, a flat rate, or hot billing.

The P-GW Address in Use (control information) is an IP address of the PGW used when the SGW recently transmits the control information.

The P-GW TEID for S5/S8 (control information) is a TEID of the PGW used for transmission of the control information in the interface between the SGW and the PGW.

The P-GW Address in Use (user data) is an IP address of the PGW used when the SGW recently transmits the user data.

The P-GW GRE Key for uplink (user data) is the GRE key for the uplink communication of the user data in the interface between the SGW and the PGW.

The S-GW IP address for S5/S8 (control information) is an IP address of the SGW used for the interface of the control information between the SGW and the PGW.

The S-GW TEID for S5/S8 (control information) is a TEID of the SGW used for the interface of the control information between the GW and the PGW.

The S-GW Address in Use (user data) is an IP address of the SGW which is recently used when the SGW transmits the user data.

The S-GW GRE Key for downlink traffic (user data) is the GRE key of the uplink communication used for the interface of the user data between the SGW and the PGW.

The Default Bearer is identification information, which is information acquired and/or generated in establishing a PDN connection, for identifying the Default Bearer associated with the PDN connection.

Furthermore, the EPS bearer context of the SGW includes the EPS bearer context for each bearer. FIG. 15(d) illustrates the EPS bearer context for each bearer. As illustrated in the drawing, the EPS bearer context for each bearer includes an EPS Bearer Id, a TFT, a P-GW Address in Use (user data), a P-GW TEID for S5/S8 (user data), an S-GW IP address for S5/S8 (user data), an S-GW TEID for S5/S8 (user data), an S-GW IP address for S1-u, S12 and S4 (user data), an S-GW TEID for S1-u, S12 and S4 (user data), an eNodeB IP address for S1-u, an eNodeB TEID for S1-u, an RNC IP address for S12, an RNC TEID for S12, an SGSN IP address for S4 (user data), an SGSN TEID for S4 (user data), an EPS Bearer QoS, and a Charging Id.

The EPS Bearer Id is the only identification information identifying the EPS bearer for the UE connection via the E-UTRAN. That is, the EPS Bearer Id is identification information for identifying the bearer. In other words, the EPS Bearer Id is identification information of the EPS bearer. Moreover, the EPS Bearer Id may be identification information identifying the SRB and/or the CRB, or identification information identifying the DRB.

The TFT indicates all the packet filters associated with the EPS bearer. In other words, the TFT is information identifying some pieces of the transmitted and/or received user data, and thus, the SGW_A 35 uses the EPS bearer associated with the TFT to transmit and/or receive the user data identified by the TFT. Further in other words, the SGW_A 35 uses the EPS bearer which includes the RB associated with the TFT to transmit and/or receive the user data identified by the TFT.

The SGW_A 35 may use the Default Bearer to transmit and/or receive the user data which cannot be identified by the TFT.

The SGW_A 35 may store in advance the TFT associated with the Default Bearer.

The P-GW Address in Use (user data) is an IP address of the PGW which is recently used for transmission of the user data in the interface between the SGW and the PGW.

The P-GW TEID for S5/S8 (user data) is a TEID of the PGW for the interface of the user data between the SGW and the PGW.

The S-GW IP address for S5/S8 (user data) is an IP address of the SGW for the user data received from the PGW.

The S-GW TEID for S5/S8 (user data) is a TEID of the SGW for the interface of the user data between the SGW and the PGW.

The S-GW IP address for S1-u, S12 and S4 (user data) is an IP address of the SGW used for the interface between the SGW and the 3GPP access network (the LTE access network or GERAN/UTRAN).

In the case that the user data is transmitted and/or received with being included in the message for control information, the S-GW IP address for S1-u, S12 and S4 (user data) may be an IP address of the SGW used for the interface between the SGW and the MME and/or the SGSN, or may be the S-GW IP address for S11/S4.

The S-GW TEID for S1-u, S12 and S4 (user data) is a TEID of the SGW used for the interface between the SGW and the 3GPP access network (the LTE access network or GERAN/UTRAN).

In the case that the user data is transmitted and/or received with being included in the message for control information, the S-GW TEID for S1-u, S12 and S4 (user data) may be a TEID of the SGW used for the interface between the SGW and the MME and/or the SGSN, or may be the S-GW TEID for S11/S4.

The eNodeB IP address for S1-u is an IP address of the eNB used for transmission between the SGW and the eNB.

In the case that the user data is transmitted and/or received with being included in the message for control information, the eNodeB IP address for S1-u may be an IP address of the MME used for the interface between the MME and the SGW, or may be the MME IP address for S11.

The eNodeB TEID for S1-u is a TEID of the eNB used for the transmission between the SGW and the eNB.

In the case that the user data is transmitted and/or received with being included in the message for control information, the eNodeB TEID for S1-u may be a TEID of the MME used for the interface between the MME and the SGW, or may be the MME TEID for S11.

The RNC IP address for S12 is an IP address of the RNC used for an interface between the SGW and the UTRAN.

The RNC TEID for S12 is a TEID of the RNC used for the interface between the SGW and the UTRAN.

The SGSN IP address for S4 (user data) is an IP address of the SGSN used for transmission of the user data between the SGW and the SGSN.

The SGSN TEID for S4 (user data) is a TEID of the SGSN used for the transmission of the user data between the SGW and the SGSN.

The EPS Bearer QoS represents the QoS of this bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is identification information for recording charging generated in the SGW and the PGW.

1.2.4. PGW Configuration

Figures 16, 17:
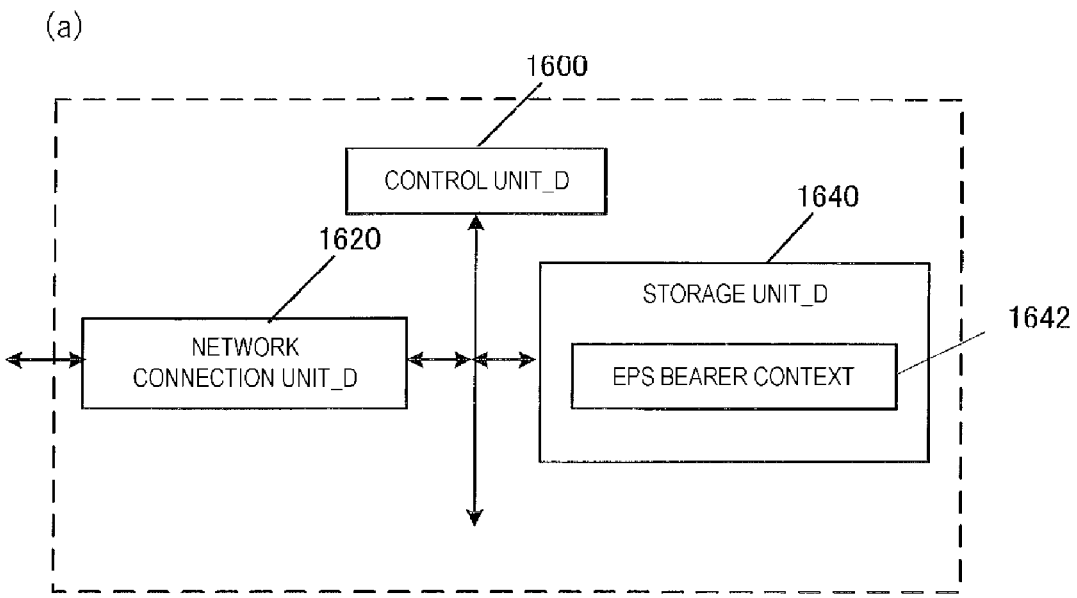
FIG. 16 is a diagram illustrating an apparatus configuration of a PGW.
FIG. 17 is a diagram illustrating a storage unit of the PGW.

Hereinafter, the configuration of the PGW_A 30 will be described. FIG. 16(a) illustrates an apparatus configuration of the PGW_A 30. As illustrated in the drawing, the PGW_A 30 includes a network connection unit_D 1620, a control unit_D 1600, and a storage unit_D 1640. The network connection unit_D 1620 and the storage unit_D 1640 are connected to the control unit_D 1600 via a bus.

The control unit_D 1600 is a function unit for controlling the PGW_A 30. The control unit_D 1600 implements various processes by reading out and executing various programs stored in the storage unit_D 1640.

The network connection unit_D 1620 is a function unit through which the PGW_A 30 is connected to the SGW_A 35 and/or the PCRF_A 60 and/or the ePDG_A 65 and/or the AAA_A 55 and/or the TWAG_A 74 and/or the PDN_A 5. The network connection unit_D 1620 is a transmission and/or reception function unit through which the PGW_A 30 transmits and/or receives user data and/or control data to/from the SGW_A 35 and/or the PCRF_A 60 and/or the ePDG_A 65 and/or the AAA_A 55 and/or the TWAG_A 74 and/or the PDN_A 5.

The storage unit_D 1640 is a function unit for storing programs, data, and the like necessary for each operation of the PGW_A 30. The storage unit_D 1640 is constituted of, for example, a semiconductor memory, a Hard Disk Drive (HDD), or the like.

The storage unit_D 1640 may store at least identification information and/or control information and/or a flag and/or a parameter included in a control message which is transmitted and/or received in a communication procedure described later.

As illustrated in the drawing, the storage unit_D 1640 stores an EPS bearer context 1642. Note that the EPS bearer context includes an EPS bearer context stored for each UE, an EPS bearer context stored for each APN, an EPS bearer context stored for each PDN connection, and an EPS bearer context stored for each bearer which may be separately stored in the EPS bearer context.

FIG. 17(b) illustrates information elements included in the EPS bearer context stored for each UE. As illustrated in the drawing, the EPS bearer context stored for each UE includes an IMSI, an IMSI-unauthenticated-indicator, an ME Identity, an MSISDN, a Selected CN operator id, a RAT type, a Trace reference, a Trace type, a Trigger id, and an OMC identity.

The IMSI is identification information to be assigned to a user using the UE.

The IMSI-unauthenticated-indicator is instruction information indicating that this IMSI is not authenticated.

The ME Identity is an ID of the UE, and may be the IMEI/IMISV, for example.

The MSISDN represents a basic phone number of the UE. The MSISDN is indicated by a storage unit of the HSS_A 50.

The Selected CN operator ID is identification information, which is used for sharing the network among operators, of a selected core network operator.

The RAT type indicates a recent Radio Access Technology (RAT) of the UE. The RAT type may be, for example, the E-UTRA (LTE), the UTRA, or the like.

The Trace reference is identification information for identifying a specific trace record or a record set.

The Trace type indicates a type of the trace. For example, the Trace type may indicate a type traced by the HSS and/or a type traced by the MME, the SGW, or the PGW.

The Trigger ID is identification information for identifying a constituent element for which the trace starts.

The OMC Identity is identification information for identifying an OMC which receives the record of the trace.

Next, FIG. 17(c) illustrates the EPS bearer context stored for each APN. As illustrated in the drawing, the EPS bearer context stored for each APN of the PGW storage unit includes an APN in use and an APN-AMBR.

The APN in Use indicates an APN which is recently used. This APN includes identification information about the APN network and identification information about a default operator. This information is acquired from the SGW.

The APN-AMBR indicates the maximum value of the Maximum Bit Rate (MBR) of the uplink communication and the downlink communication for sharing all the Non-GBR bearers (non-guaranteed bearers) established for this APN.

Furthermore, FIG. 18(*d*) illustrates the EPS bearer context for each PDN connection stored for each PDN connection. As illustrated in the drawing, the EPS bearer context for each PDN connection includes an IP Address, a PDN type, an S-GW Address in Use (control information), an S-GW TEID for S5/S8 (control information), an S-GW Address in Use (user data), an S-GW GRE Key for downlink traffic (user data), a P-GW IP address for S5/S8 (control information), a P-GW TEID for S5/S8 (control information), a P-GW Address in Use (user data), a P-GW GRE Key for uplink traffic (user data), an MS Info Change Reporting support indication, an MS Info Change Reporting Action, a CSG Information Reporting Action, a Presence Reporting Area Action, a BCM, a Default Bearer, and EPS PDN Charging Characteristics.

The IP Address indicates an IP address assigned to the UE for this PDN connection. The IP address may be an IPv4 and/or IPv6 prefix.

The PDN type indicates the type of the IP address. The PDN type indicates IPv4, IPv6, or IPv4v6, for example.

The S-GW Address in Use (control information) is an IP address of the SGW which is recently used for transmission of the control information.

The S-GW TEID for S5/S8 (control information) is a TEID of the SGW used for transmission and/or reception of the control information between the SGW and the PGW.

The S-GW Address in Use (user data) is an IP address of the SGW which is recently used for transmission of the user data in the interface between the SGW and the PGW.

The S-GW GRE Key for downlink traffic (user data) is the GRE key which is assigned to be used in the downlink communication of the user data from the PGW to the SGW in the interface between the SGW and the PGW.

The P-GW IP address for S5/S8 (control information) is an IP address of the PGW used for communication of the control information.

The P-GW TEID for S5/S8 (control information) is a TEID of the PGW for communication of the control information which uses the interface between the SGW and the PGW.

The P-GW Address in Use (user data) is an IP address of the PGW which is recently used for transmission of the user data which uses the interface between the SGW and the PGW.

The P-GW GRE Key for uplink traffic (user data) is the GRE key which is assigned for the uplink communication of the user data between the SGW and the PGW, that is, transmission of the user data from the SGW to the PGW.

The MS Info Change Reporting support indication indicates that the MME and/or the SGSN supports a notification process of user location information and/or user CSG information.

The MS Info Change Reporting Action is information indicating whether the MME and/or the SGSN is requested to transmit a change in the user location information.

The CSG Information Reporting Action is information indicating whether the MME and/or the SGSN is requested to transmit a change in the user CSG information. This information is separately indicated (a) for a CSG cell, (b) for a hybrid cell in which a user is a CSG member, (c) for a hybrid cell in which the user is not the CSG member, or for a combination thereof.

The Presence Reporting Area Action indicates necessity of notification of the change as to whether the UE is present in a Presence Reporting Area. This information element separates into identification information of the presence reporting area and an element included in the presence reporting area.

The Bearer Control Mode (BCM) indicates a control state of a bearer negotiated with respect to the GERAN/UTRAN.

The Default Bearer is EPS bearer identification information, which is information acquired and/or generated in establishing a PDN connection, for identifying the Default Bearer associated with the PDN connection.

The EPS PDN Charging Characteristics are charging performances. The charging performances may indicate, for example, normal, prepaid, a flat rate, hot billing.

Furthermore, FIG. 18(*e*) illustrates the EPS bearer context stored for each EPS bearer. As illustrated in the drawing, the EPS bearer context includes an EPS Bearer Id, a TFT, an S-GW Address in Use (user data), an S-GW TEID for S5/S8 (user data), a P-GW IP address for S5/S8 (user data), a P-GW TEID for S5/S8 (user data), an EPS Bearer QoS, and a Charging Id.

The EPS Bearer Id is identification information identifying the access of the UE via the E-UTRAN. In other words, the EPS Bearer Id is identification information of the EPS bearer. Moreover, the EPS Bearer Id may be identification information identifying the SRB and/or the CRB, or identification information identifying the DRB.

The TFT is an abbreviation of a "Traffic Flow Template", and indicates all packet filters associated with the EPS bearer. In other words, the TFT is information identifying some pieces of the transmitted and/or received user data, and thus, the PGW_A 30 uses the EPS bearer associated with the TFT to transmit and/or receive the user data identified by the TFT. Further in other words, the PGW_A 30 uses the EPS bearer which includes the RB associated with the TFT to transmit and/or receive the user data identified by the TFT.

The PGW_A 30 may use the Default Bearer to transmit and/or receive the user data which cannot be identified by the TFT.

The PGW_A 30 may store in advance the TFT associated with the Default Bearer.

The S-GW Address in Use (user data) is an IP address of the SGW which is recently used for transmission of the user data.

The S-GW TEID for S5/S8 (user data) is a TEID of the SGW for communication of the user data which uses the interface between the SGW and the PGW.

The P-GW IP address for S5/S8 (user data) is an IP address of the PGW for the user data received from the PGW.

The P-GW TEID for S5/S8 (user data) is a TEID of the PGW for communication of the user data between the SGW and the PGW.

The EPS Bearer QoS indicates the QoS of the bearer, and may include an ARP, a GBR, an MBR, and a QCI. Here, the ARP is information representing the priority relating to maintaining the bearer. Additionally, the Guaranteed Bit Rate (GBR) represents a band guaranteed bit rate, and the Maximum Bit Rate (MBR) represents the maximum bit rate. The QCI can be classified in accordance with presence or absence of band control, an allowable delay time, a packet loss rate, or the like. The QCI includes information indicating the priority.

The Charging Id is charging identification information for identifying the record relating to charging generated in the SGW and the PGW.

1.2.5. C-SGN Configuration

Figure 19:
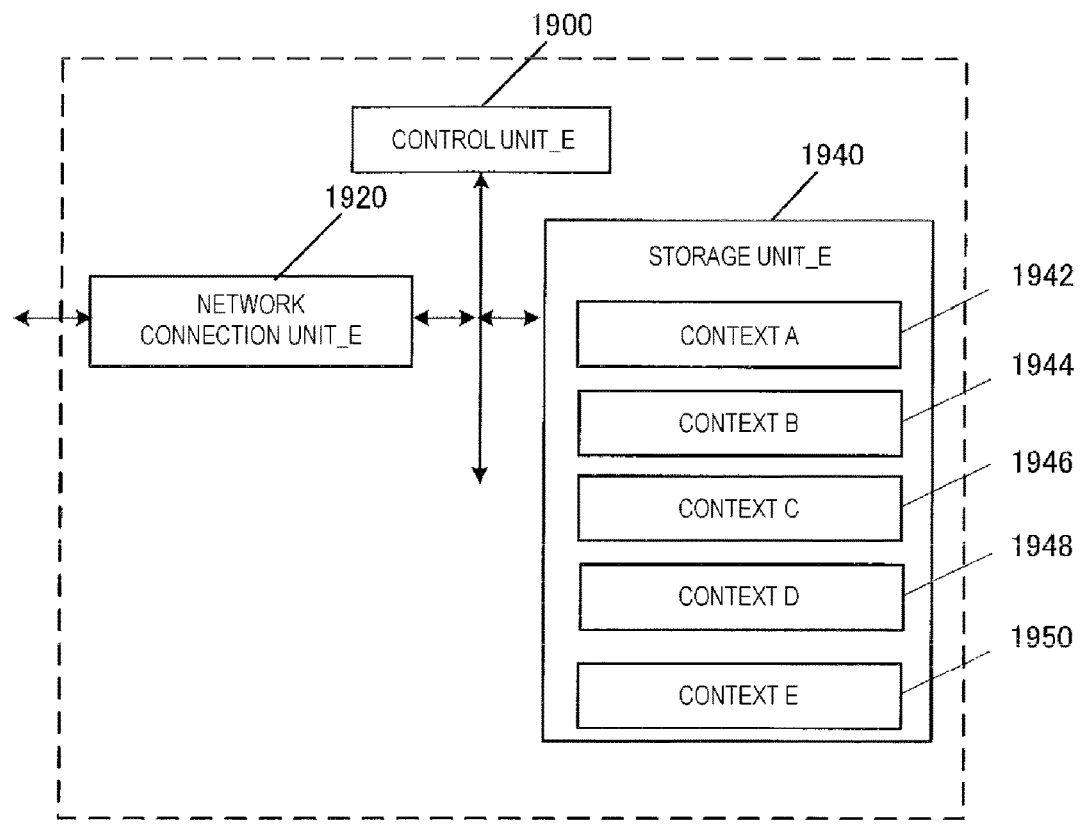
FIG. 19 is a diagram illustrating an apparatus configuration of a C-SGN.

Hereinafter, an apparatus configuration of the C-SGN_A 95 will be described. FIG. 19 illustrates the apparatus configuration of the C-SGN_A 95. As illustrated in the figure, the C-SGN_A 95 includes a network connection unit_E 1920, a control unit_E 1900, and a storage unit_E 1940. The network connection unit_E 1920 and the storage unit_E 1940 are connected to the control unit_E 1900 via a bus.

The control unit_E 1900 is a function unit for controlling the C-SGN_A 95. The control unit_E 1900 implements various processes by reading out and executing various programs stored in the storage unit_E 1940.

The network connection unit_E 1920 is a function unit through which the C-SGN_A 95 connects to the eNB_A 45 and/or the HSS_A 50 and/or the PDN_A 5. The network connection unit_E 1920 is a transmission and/or reception function unit through which the C-SGN_A 95 transmits and/or receives user data and/or control data to/from the eNB_A 45 and/or the HSS_A 50 and/or the PDN_A 5.

The storage unit_E 1940 is a function unit for storing programs, data, and the like necessary for each operation of the C-SGN_A 95. The storage unit_E 1940 is constituted of, for example, a semiconductor memory, a Hard Disk Drive (HDD), or the like.

The storage unit_E 1940 may store at least identification information and/or control information and/or a flag and/or a parameter included in a control message which is transmitted and/or received in a communication procedure described later.

The storage unit_E 1940 stores a context A 1942, a context B 1944, a context C 1946, and a context D 1948 as illustrated in the drawing.

The context A 1942 may be the MME context 642 illustrated in FIG. 6(*a*). Additionally, the context B 1944 may be the security context 648 illustrated in FIG. 6(*a*). Additionally, the context C 1946 may be the MME emergency configuration data 650 illustrated in FIG. 6(*a*).

Figure 13:
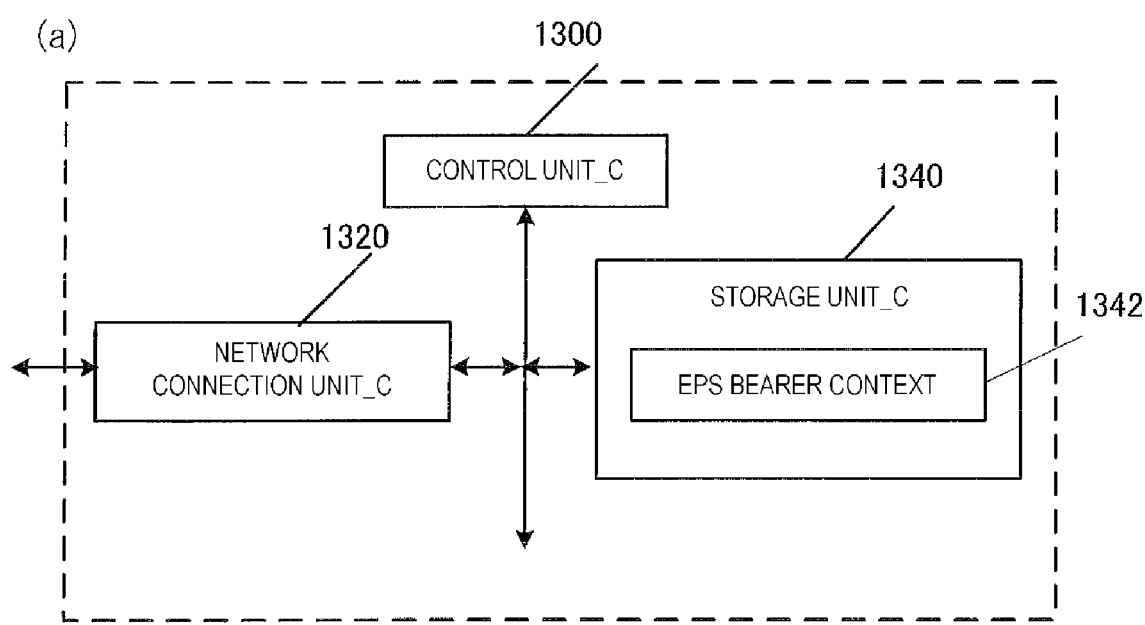
FIG. 13 is a diagram illustrating an apparatus configuration of an SGW.

Additionally, the context D 1948 may be the EPS bearer context 1342 illustrated in FIG. 13(*a*). Additionally, the context E 1950 may be the EPS bearer context 1642 illustrated in FIG. 16(*a*).

Note that in a case that the context A 1942 to the context E 1950 include the same information element, such information element may not necessarily be redundantly stored in the storage unit_E 1940, and may be stored in any context at least.

Specifically, for example, the IMSI may be included in each of the context A 1942, the context D 1948, and the context E 1950, or may be stored in any context.

The storage unit_E 1940 may include the TFT.

Here, the TFT is an abbreviation of a "Traffic Flow Template", and indicates all packet filters associated with the EPS bearer. In other words, the TFT is information identifying some pieces of the transmitted and/or received user data, and thus, the C-SGN_A 95 uses the EPS bearer associated with the TFT to transmit and/or receive the user data identified by the TFT. Further in other words, the C-SGN_A 95 uses the EPS bearer which includes the RB associated with the TFT to transmit and/or receive the user data identified by the TFT.

The C-SGN_A 95 may use the Default Bearer to transmit and/or receive the user data which cannot be identified by the TFT.

The C-SGN_A 95 may store in advance the TFT associated with the Default Bearer.

1.2.6. UE Configuration

Figure 20:
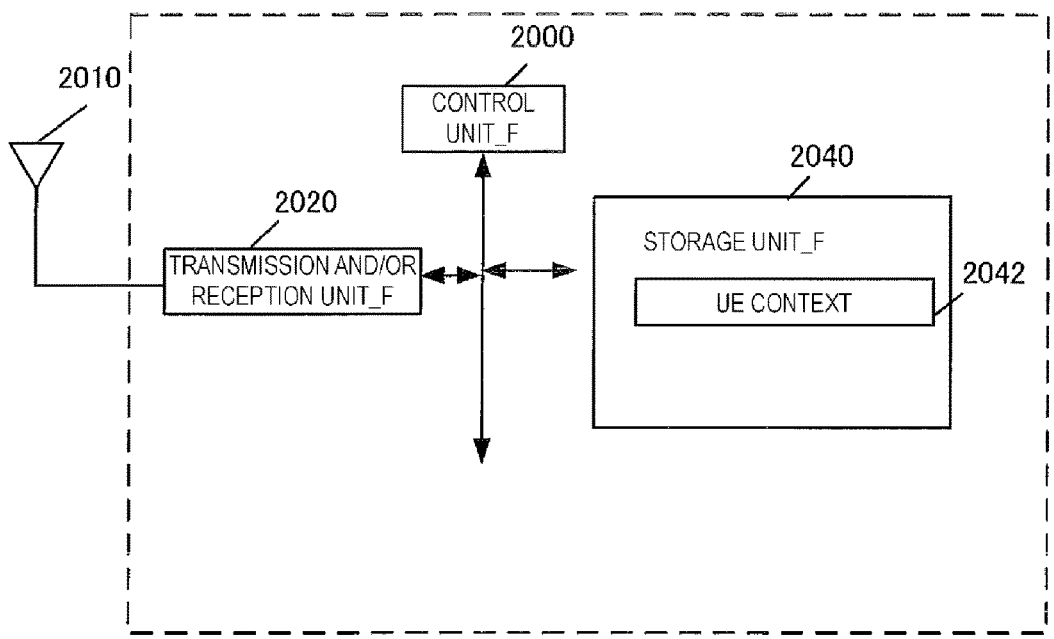
FIG. 20 is a diagram illustrating an apparatus configuration of a UE.

FIG. 20(*a*) illustrates an apparatus configuration of the UE_A 10. As illustrated in the drawing, the UE_A 10 includes a transmission and/or reception unit_F 2020, a control unit_F 2000, and a storage unit_F 2040. The transmission and/or reception unit_F 2020 and the storage unit_F 2040 are connected to the control unit_F 2000 via a bus.

The control unit_F 2000 is a function unit for controlling the UE_A 10. The control unit_F 2000 implements various processes by reading out and executing various programs stored in the storage unit_F 2040.

The transmission and/or reception unit_F 2020 is a function unit through which the UE_A 10 connects to an IP access network via an LTE base station. Furthermore, an external antenna_F 2010 is connected to the transmission and/or reception unit_F 2020.

In other words, the transmission and/or reception unit_F 2020 is a function unit through which the UE_A 10 connects to the eNB_A 45. Furthermore, the transmission and/or reception unit_F 2020 is a transmission and/or reception function unit through which the UE_A 10 transmits and/or receives user data and/or control data to/from the eNB_A 45.

The storage unit_F 2040 is a function unit for storing programs, data, and the like necessary for each operation of the UE_A 10. The storage unit_F 2040 is constituted of, for example, a semiconductor memory, a Hard Disk Drive (HDD), or the like.

The storage unit_F 2040 may store at least identification information and/or control information and/or a flag and/or a parameter included in a control message which is transmitted and/or received in a communication procedure described later.

As illustrated in the drawing, the storage unit_F 2040 stores a UE context 2042. Hereinafter, information elements stored in the storage unit_F 2040 will be described.

FIG. 20(*a*) illustrates information elements included in the UE context stored for each UE. As illustrated in the drawing, the UE context stored for each UE includes an IMSI, an EMM State, a GUTI, an ME Identity, a Tracking Area List, a last visited TAI, a Selected NAS Algorithm, a Selected AS Algorithm, an eKSI, K_ASME, NAS Keys and COUNT, a TIN, UE Specific DRX Parameters, an Allowed CSG list, and an Operator CSG list.

The IMSI is permanent identification information of a subscriber.

The EMM State indicates a mobility management state of the UE. For example, the EMM State may be EMM-REGISTERED in which the UE is registered with the network (registered state) or EMM-DEREGISTERED in which the UE is not registered with the network (deregistered state).

The GUTI is an abbreviation of "Globally Unique Temporary Identity," and is temporary identification information on the UE. The GUTI includes the identification information about the MME (Globally Unique MME Identifier (GUMMED) and the identification information about the UE in a specific MME (M-TMSI).

The ME Identity is an ID of an ME, and may be the IMEI/IMISV, for example.

The Tracking Area List is a list of the tracking area identification information which is assigned to the UE.

The last visited TAI is the tracking area identification information included in the Tracking Area List, and is identification information of the latest tracking area that the UE visits.

The Selected NAS Algorithm is a selected security algorithm of the NAS.

The Selected AS Algorithm is a selected security algorithm of the AS.

The eKSI is a key set indicating the K_ASME. The eKSI may indicate whether a security key acquired by a security authentication of the UTRAN or the E-UTRAN is used.

The K_ASME is a key for E-UTRAN key hierarchy generated based on the keys CK and IK.

The NAS Keys and COUNT includes a key K_NASint, a key K_NASenc, and a NAS COUNT. The K_NASint is a key for encryption between the UE and the MME, the K_NASenc is a key for safety protection between the UE and the MME. Additionally, the NAS COUNT is a count which starts a count in a case that a new key by which security between the UE and the MME is established is configured.

The Temporary Identity used in Next update (TIN) is temporary identification information used in the UE in an attach procedure or a location information update procedure (RAU/TAU).

The UE Specific DRX Parameters are a Discontinuous Reception (DRX) cycle length of the selected UE.

The Allowed CSG list is a list of the PLMN associated with a CSG ID of a member to which the allowed UE belongs, under the control of both the user and the operator.

The Operator CSG list is a list of the PLMN associated with the CSG ID of a member to which the allowed UE belongs, under the control of only the operator.

Next, FIG. 21(c) illustrates the UE context for each PDN connection stored for each PDN connection. As illustrated in the drawing, the UE context for each PDN connection includes an APN in Use, an APN-AMBR, an Assigned PDN Type, an IP Address, a Default Bearer, and a WLAN offloadability.

The APN in Use is an APN which is recently used. This APN may include identification information about the network and identification information about a default operator.

The APN-AMBR indicates the maximum value of the MBR of the uplink communication and the downlink communication for sharing the Non-GBR bearers (non-guaranteed bearers). The APN-AMBR is established for each APN.

The Assigned PDN Type is a type of the PDN assigned from the network. The Assigned PDN Type may be IPv4, IPv6, or IPv4v6, for example.

The IP Address is an IP address assigned to the UE, and may be an IPv4 address or an IPv6 prefix.

The Default Bearer is EPS bearer identification information, which is information acquired from the core network_A 90 in establishing a PDN connection, for identifying the Default Bearer associated with the PDN connection.

The WLAN offloadability is WLAN offload permission information indicating whether to allow for offload to the WLAN by using an interworking function between the WLAN and the 3GPP, or to maintain the 3GPP access.

FIG. 21(d) illustrates the UE context for each bearer stored in the storage unit of the UE. As illustrated in the drawing, the UE context for each bearer includes an EPS Bearer ID, a TI, an EPS bearer QoS, and a TFT.

The EPS Bearer ID is identification information of the EPS bearer. The EPS Bearer ID may be identification information identifying the SRB and/or the CRB, or identification information identifying the DRB.

The TI is an abbreviation of a "Transaction Identifier", and is identification information identifying a bidirectional message flow (Transaction).

The TFT is an abbreviation of a "Traffic Flow Template", and indicates alt packet filters associated with the EPS bearer. In other words, the TFT is information identifying some pieces of the transmitted and/or received user data, and thus, the UE_A 10 uses the EPS bearer associated with the TFT to transmit and/or receive the user data identified by the TFT. Further in other words, the UE_A 10 uses the RB associated with the TFT to transmit and/or receive the user data identified by the TFT.

The UE_A 10 may use the Default Bearer to transmit and/or receive the user data which cannot be identified by the TFT.

The UE_A 10 may store in advance the TFT associated with the Default Bearer.

1.3. Description of Communication Procedure

Next, a communication procedure according to the present embodiment will be described with reference to FIG. 22.

Figure 22:
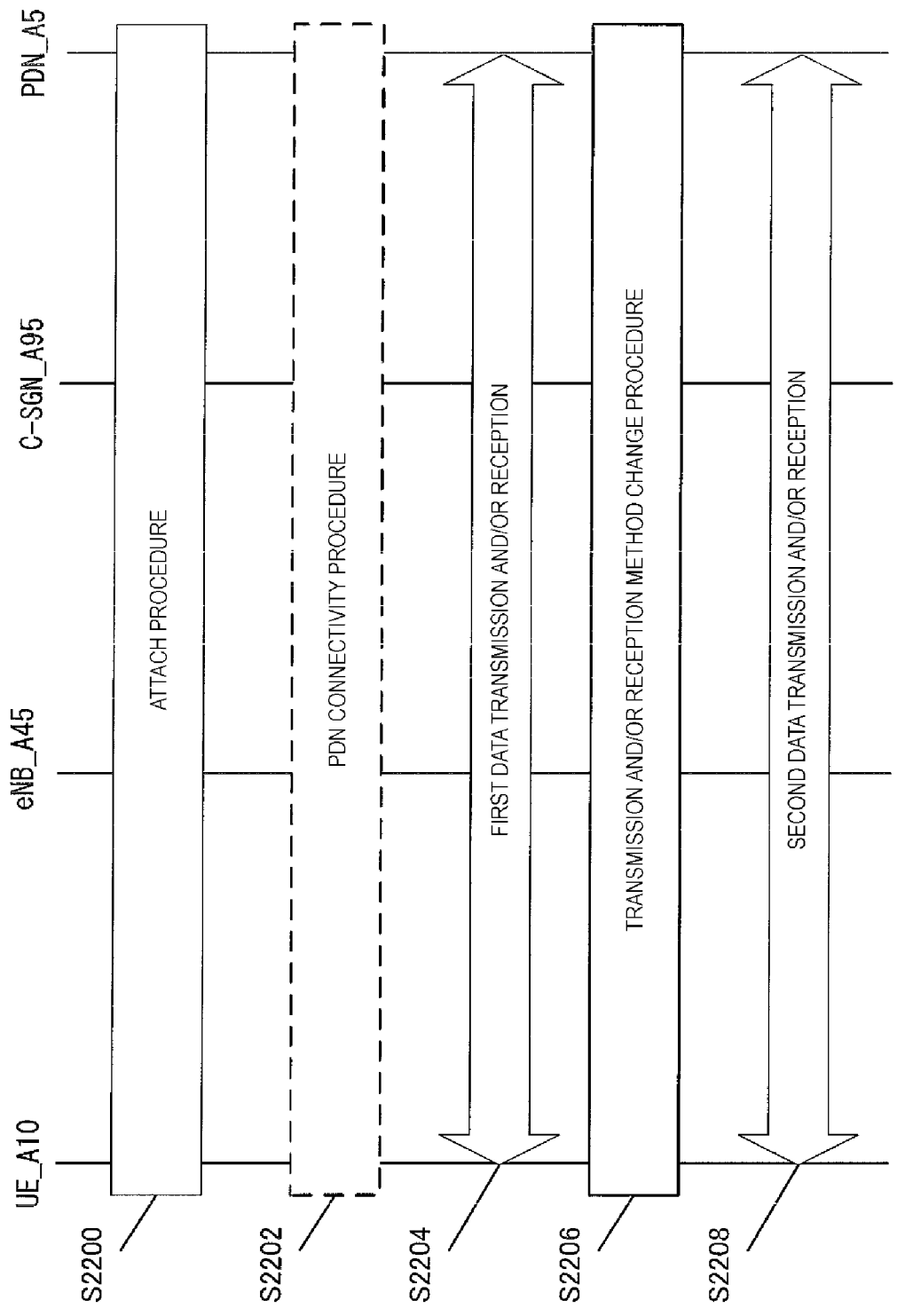
FIG. 22 is a diagram illustrating an outline of a communication procedure.

The communication procedure according to the present embodiment first performs an attach procedure (S2200) as illustrated in FIG. 22. The UE_A 10 and/or the eNB_A 45 and/or the C-SGN_A 95 may determine a data transmission and/or reception method in the attach procedure (S2200). A specific data transmission and/or reception method may be transmission and/or reception based on any procedure of a first transmission and/or reception procedure, a second transmission and/or reception procedure, or a third transmission and/or reception procedure.

Next, a PDN connectivity procedure (S2202) may be performed depending on a condition described later.

Next, the UE_A 10 and/or the eNB_A 45 and/or the C-SGN_A 95 may perform a first data transmission and/or reception (S2204) based on the transmission and/or reception method determined in the attach procedure.

Next, a transmission and/or reception method change procedure (S2206) may be performed. The UE_A 10 and/or the eNB_A 45 and/or the C-SGN_A 95 may modify the data transmission and/or reception method in the transmission and/or reception method change procedure.

Next, the UE_A 10 and/or the eNB_A 45 and/or the C-SGN_A 95 may perform a second data transmission and/or reception (S2208) based on the transmission and/or reception method determined in the transmission and/or reception method change procedure.

In the following, a description is give of the conditions under which the procedures are performed and details of the processes.

Here, the first transmission and/or reception procedure is a procedure in which the UE_A 10 and/or the eNB_A 45 and/or the C-SGN_A 95 transmit and/or receive the user data via connectionless communication without establishing the DRB.

In other words, the first transmission and/or reception procedure may be a procedure to transmit the user data by use of the SRB and/or the CRB for transmitting and/or receiving the control message.

Here, the second transmission and/or reception procedure is a procedure in which the UE_A 10 and/or the eNB_A 45 and/or the C-SGN_A 95 in an idle mode in the present embodiment transmit and/or receive the user data.

To be more specific, the second transmission and/or reception procedure is a procedure in which the UE_A 10 and/or the eNB_A 45 and/or the C-SGN_A 95 enter an active mode from the idle mode in the present embodiment, and thereafter, transmit and/or receive the user data by use of the established DRB.

Furthermore, the second transmission and/or reception procedure may be a procedure including a procedure in which the UE_A 10 and/or the eNB_A 45 and/or the C-SGN_A 95 enter the idle mode in the present embodiment from the active mode after the completion of the transmission and/or reception of the user data.

The idle mode in the present embodiment is a mode for releasing an RB resource, but may be a mode indicating that the UE_A 10 and/or the eNB_A 45 and/or the C-SGN_A 95 continue to keep the context for the DRB and/or Default Bearer.

Here, the third transmission and/or reception procedure is a procedure in which the UE_A 10 and/or the eNB_A 45 and/or the C-SGN_A 95 in an idle mode of the related art transmit and/or receive the user data.

To be more specific, the third transmission and/or reception procedure is a procedure in which the UE_A 10 and/or the eNB_A 45 and/or the C-SGN_A 95 enter the active mode from the idle mode of the related art, and thereafter, transmit and/or receive the user data by use of the established DRB.

Furthermore, the third transmission and/or reception procedure may be a procedure including a procedure in which the UE_A 10 and/or the eNB_A 45 and/or the C-SGN_A 95 enter the idle mode of the related art from the active mode after the completion of the transmission and/or reception of the user data.

In other words, the third transmission and/or reception procedure may be a user data transmission and/or reception procedure of the related art.

The idle mode of the related art may be a mode for releasing an RB resource and indicating that the UE_A 10 and/or the eNB_A 45 and/or the C-SGN_A 95 discard the context for the DRB and/or Default Bearer. In the present embodiment, such an idle mode is expressed as the idle mode of the related art in order to distinguish from the idle mode in the present embodiment describe above.

A detailed description of each transmission and/or reception procedure is described later.

Here, before describing the detailed steps of the procedures, in order to avoid redundant descriptions, terms specific to the present embodiment and primary identification information used in the procedures will be described beforehand.

The connectionless communication in the present embodiment may be communication performing at least a process in which the UE_A 10 transmits the Non-Access Stream (NAS) message including the data packet to the eNB_A 45, by including the NAS message in the Radio Resource Control (RRC) message. And/or, the connectionless communication may be communication for transmitting and/or receiving the data packet between the UE_A 10 and the eNB_A 45 without establishing the RRC connection. And/or, the connectionless communication may be communication that the UE_A 10 in the idle state transmits and/or receives the data packet. Further in other words, the connectionless communication may be communication for transmitting and/or receiving the user data by use of the SRB or the CRB.

The active mode in the present embodiment may be a mode indicating a state that the UE_A 10 and/or the eNB_A 45 and/or the C-SGN_A 95 can transmit and/or receive the user data with establishing the DRB and/or the Default Bearer and/or the PDN connection.

The DRB in the present embodiment may be a communication path established for transmission and/or reception of the user data, such as a radio bearer.

The PDN connection in the present embodiment may be a connection established between the UE_A 10 and the C-SGN_A 95 for transmission and/or reception of the user data.

The idle mode in the present embodiment and/or the idle mode of the related art may be a mode indicating a state that the UE_A 10 and/or the eNB_A 45 and/or the C-SGN_A 95 cannot transmit and/or receive the user data with releasing the DRB and/or the Default Bearer resource.

An attach complete state in the present embodiment is a state of connecting to the network with authentication being provided. This state refers to a state that the user data can be transmitted and/or received between the UE_A 10 and the PDN_A 5.

To be more specific, the attach complete state may be a state that the UE_A 10 and/or the PDN_A 5 and/or the eNB_A 45 and/or the C-SGN_A 95 can transmit and/or receive the user data.

The attach complete state may include a first mode, a second mode, a third mode, a fourth mode, and a fifth mode described below. The respective modes are distinguishable according to whether the PDN connection is established, and/or a difference in the data transmission and/or reception method, and/or a difference in the stored information when entering the idle mode, and the like, and detailed descriptions of the modes are given below.

Here, the first mode may be a mode in which the UE_A 10 and/or the eNB_A 45 and/or the C-SGN_A 95 establish the PDN connection.

And/or, the first mode may be a mode in which the UE_A. 10 and/or the eNB_A 45 and/or the C-SGN_A 95 establish the Default Bearer.

And/or, the first mode may be a mode in which the UE_A 10 and/or the eNB_A 45 and/or the C-SGN_A 95 do not establish the dedicated bearer.

And/or, the first mode may be a mode in which the UE_A 10 and/or the eNB_A 45 and/or the C-SGN_A 95 can transmit and/or receive the user data.

And/or, the first mode may be a mode in which the UE_A 10 and/or the eNB_A 45 and/or the C-SGN_A 95 connectionlessly transmit and/or receive the user data.

And/or, the first mode may be a mode in which the UE_A 10 and/or the eNB_A 45 transmit and/or receive the user data without establishing the RRC connection.

And/or, the first mode may be a mode in which the UE_A 10 and/or the C-SGN_A 95 transmit and/or receive the user data with being included in the NAS message.

And/or, the first mode may be a mode in which the UE_A 10 and/or the eNB_A 45 transmit and/or receive the user data with being included in the RRC message.

And/or, the first mode may be a mode in which the UE_A 10 and/or the eNB_A 45 transmit and/or receive a NAS Packet Data Unit (PDU) with being included in the RRC message. The NAS PDU may be a control message obtained by including the user data in the NAS message.

And/or, the first mode may be a mode in which the UE_A 10 and/or the eNB_A 45 transmit and/or receive the user data by use of the SRB.

And/or, the first mode may be a mode in which the UE_A 10 and/or the eNB_A 45 transmit and/or receive the user data by use of the CRB.

The SRB and the CRB may be a communication path used for transmission and/or reception of the control message, such as a radio bearer.

And/or, the first mode may be a mode in which the UE_A 10 and/or the eNB_A 45 and/or the C-SGN_A 95 transmit and/or receive the user data by use of the bearer used for transmission and/or reception of the control information.

In the case of the first mode, the UE_A 10 and/or the eNB_A 45 and/or the C-SGN_A 95 may transmit and/or receive the user data by use of the first transmission and/or reception procedure.

And/or, in the case of the first mode, the UE_A 10 and/or the eNB_A 45 and/or the C-SGN_A 95 may adopt a method for transmitting and/or receiving the user data by use of the first transmission and/or reception procedure as an initial transmission and/or reception method.

And/or, in the case of the first mode, the UE_A 10 and/or the eNB_A 45 and/or the C-SGN_A 95 may adopt the EPS bearer including the SRB and/or the CRB as the Default Bearer.

The Default Bearer may be a first bearer, or a bearer for transmitting and/or receiving the user data in the initial transmission and/or reception method.

Here, the second mode may be a mode in which the UE_A 10 and/or the eNB_A 45 and/or the C-SGN_A 95 do not establish the PDN connection.

And/or, the second mode may be a mode in which the UE_A 10 and/or the eNB_A 45 and/or the C-SGN_A 95 do not establish the Default Bearer.

And/or, the second mode may be a mode in which the UE_A 10 and/or the eNB_A 45 and/or the C-SGN_A 95 do not establish the dedicated bearer.

And/or, the second mode may be a mode in which the UE_A 10 and/or the eNB_A 45 and/or the C-SGN_A 95 cannot transmit and/or receive the user data.

And/or, the second mode may be a mode in which the UE_A 10 and/or the eNB_A 45 and/or the C-SGN_A 95 determine to connectionlessly transmit and/or receive the user data.

And/or, the second mode may be a mode in which the UE_A 10 and/or the eNB_A 45 determine to transmit and/or receive the user data without establishing the RRC connection.

And/or, the second mode may be a mode in which the UE_A 10 and/or the C-SGN_A 95 determine to transmit and/or receive the user data with being included in the NAS message.

And/or, the second mode may be a mode in which the UE_A 10 and/or the eNB_A 45 determine to transmit and/or receive the user data with being included in the RRC message.

And/or, the second mode may be a mode in which the UE_A 10 and/or the eNB_A 45 determine to transmit and/or receive a NAS Packet Data Unit (PDU) with being included in the RRC message. The NAS PDU may be a control message obtained by including the user data in the NAS message.

And/or, the second mode may be a mode in which the UE_A 10 and/or the eNB_A 45 determine to transmit and/or receive the user data by use of the SRB.

And/or, the second mode may be a mode in which the UE_A 10 and/or the eNB_A 45 determine to transmit and/or receive the user data by use of the CRB.

The SRB and the CRB may be a communication path used for transmission and/or reception of the control message, such as a radio bearer.

And/or, the second mode may be a mode in which the UE_A 10 and/or the eNB_A 45 and/or the C-SGN_A 95 determine to transmit and/or receive the user data by use of the bearer used for transmission and/or reception of the control information.

In the case of the second mode, the UE_A 10 and/or the eNB_A 45 and/or the C-SGN_A 95 may determine to transmit and/or receive the user data by use of the first transmission and/or reception procedure.

And/or, in the case of the second mode, the UE_A 10 and/or the eNB_A 45 and/or the C-SGN_A 95 may determine to adopt a method for transmitting and/or receiving the user data by use of the first transmission and/or reception procedure as the initial transmission and/or reception method.

And/or, in the case of the second mode, the UE_A 10 and/or the eNB_A 45 and/or the C-SGN_A 95 may determine to adopt the EPS bearer including the SRB and/or the CRB as the Default Bearer.

The Default Bearer may be the first bearer, or the bearer for transmitting and/or receiving the user data in the initial transmission and/or reception method.

Here, the third mode may be a mode in which the UE_A 10 and/or the eNB_A 45 and/or the C-SGN_A 95 establish the PDN connection.

And/or, the third mode may be a mode in which the UE_A 10 and/or the eNB_A 45 and/or the C-SGN_A 95 continue to keep the context in a case that the UE_A 10 and/or the eNB_A 45 and/or the C-SGN_A 95 enter the idle mode.

And/or, the third mode may be a mode in which the UE_A 10 and/or the eNB_A 45 and/or the C-SGN_A 95 establish the Default Bearer.

And/or, the third mode may be a mode in which the UE_A 10 and/or the eNB_A 45 and/or the C-SGN_A 95 do not establish the dedicated bearer.

And/or, the third mode may be a mode in which the UE_A 10 and/or the eNB_A 45 and/or the C-SGN_A 95 can transmit and/or receive the user data.

And/or, the third mode may be a mode in which the UE_A 10 and/or the eNB_A 45 and/or the C-SGN_A 95 transmit and/or receive the user data by use of the established connection.

And/or, the third mode may be a mode in which the UE_A 10 and/or the eNB_A 45 transmit and/or receive the user data with establishing the RRC connection.

And/or, the third mode may be a mode in which the UE_A 10 and/or the eNB_A 45 transmit and/or receive the user data by use of the DRB.

And/or, the third mode may be a mode in which the UE_A 10 and/or the eNB_A 45 and/or the C-SGN_A 95 transmit and/or receive the user data with establishing the bearer for transmitting and/or receiving the user data.

And/or, the third mode may be a mode in which the UE_A 10 and/or the eNB_A 45 and/or the C-SGN_A 95 continue to keep the context even in the case that the UE_A 10 and/or the eNB_A 45 and/or the C-SGN_A 95 enter the idle mode.

And/or, the third mode may be a mode in which the UE_A 10 and/or the eNB_A 45 can transmit and/or receive a third message of the RRC including the NAS message.

In the case of the third mode, the UE_A 10 and/or the eNB_A 45 and/or the C-SGN_A 95 may transmit and/or receive the user data by use of the second transmission and/or reception procedure.

And/or, in the case of the third mode, the UE_A 10 and/or the eNB_A 45 and/or the C-SGN_A 95 may adopt a method for transmitting and/or receiving the user data by use of the second transmission and/or reception procedure as the initial transmission and/or reception method.

And/or, in the case of the third mode, the UE_A 10 and/or the eNB_A 45 and/or the C-SGN_A 95 may adopt the EPS bearer including the DRB as the Default Bearer.

The Default Bearer may be the first bearer, or the bearer for transmitting and/or receiving the user data in the initial transmission and/or reception method.

The PDN connection having been established at the time of entering the third mode may enter the idle mode in the present embodiment depending on a condition such as that no user data is transmitted and/or received.

Here, the fourth mode may be a mode in which the UE_A 10 and/or the eNB_A 45 and/or the C-SGN_A 95 do not establish the PDN connection.

And/or, the fourth mode may be a mode in which the UE_A 10 and/or the eNB_A 45 and/or the C-SGN_A 95 do not establish the Default Bearer.

And/or, the fourth mode may be a mode in which the UE_A 10 and/or the eNB_A 45 and/or the C-SGN_A 95 do not establish the dedicated bearer.

And/or, the fourth mode may be a mode in which the UE_A 10 and/or the eNB_A 45 and/or the C-SGN_A 95 cannot transmit and/or receive the user data.

And/or, the fourth mode may be a mode in which the UE_A 10 and/or the eNB_A 45 and/or the C-SGN_A 95 determine to transmit and/or receive the user data with establishing the RRC connection.

And/or, the fourth mode may be a mode in which the UE_A 10 and/or the eNB_A 45 determine to transmit and/or receive the user data with establishing the RRC connection.

And/or, the fourth mode may be a mode in which the UE_A 10 and/or the eNB_A 45 determine to transmit and/or receive the user data by use of the DRB.

And/or, the fourth mode may be a mode in which the UE_A 10 and/or the eNB_A 45 and/or the C-SGN_A 95 determine to transmit and/or receive the user data with establishing the bearer for transmitting and/or receiving the user data.

And/or, the fourth mode may be a mode in which the UE_A 10 and/or the eNB_A 45 and/or the C-SGN_A 95 determine to continue to keep the context even in the case that the UE_A 10 and/or the eNB_A 45 and/or the C-SGN_A 95 enter the idle mode.

And/or, the fourth mode may be a mode in which the UE_A 10 and/or the eNB_A 45 determine to be able to transmit and/or receive the third message of the RRC including the NAS message.

In the case of the fourth mode, the UE_A 10 and/or the eNB_A 45 and/or the C-SGN_A 95 may determine to transmit and/or receive the user data by use of the second transmission and/or reception procedure.

And/or, in the case of the fourth mode, the UE_A 10 and/or the eNB_A 45 and/or the C-SGN_A 95 may determine to adopt a method for transmitting and/or receiving the user data by use of the second transmission and/or reception procedure as the initial transmission and/or reception method.

And/or, in the case of the fourth mode, the UE_A 10 and/or the eNB_A 45 and/or the C-SGN_A 95 may determine to adopt the EPS bearer including the DRB as the Default Bearer.

The Default Bearer may be the first bearer, or the bearer for transmitting and/or receiving the user data in the initial transmission and/or reception method.

Here, the fifth mode may be a mode in which the UE_A 10 and/or the eNB_A 45 and/or the C-SGN_A 95 establish the PDN connection.

And/or, the fifth mode may be a mode in which the UE_A 10 and/or the eNB_A 45 and/or the C-SGN_A 95 establish the Default Bearer.

And/or, the fifth mode may be a mode in which the UE_A 10 and/or the eNB_A 45 and/or the C-SGN_A 95 can transmit and/or receive the user data.

And/or, the fifth mode may be a mode in which the UE_A 10 and/or the eNB_A 45 transmit and/or receive the user data by use of the DRB.

And/or, the fifth mode may be a mode in which the UE_A 10 and/or the eNB_A 45 and/or the C-SGN_A 95 transmit and/or receive the user data with establishing the bearer for transmitting and/or receiving the user data.

And/or, the fifth mode may be a mode in which the UE_A 10 and/or the eNB_A 45 and/or the C-SGN_A 95 transmit and/or receive the user data with establishing the Default Bearer.

And/or, the fifth mode may be a mode in which the UE_A 10 and/or the eNB_A 45 and/or the C-SGN_A 95 transmit and/or receive the user data with establishing two or more bearers.

And/or, the fifth mode may be a mode in which the UE_A 10 and/or the eNB_A 45 and/or the C-SGN_A 95 discard the context when the UE_A 10 and/or the eNB_A 45 and/or the C-SGN_A 95 enter the idle mode.

And/or, the fifth mode may be a mode in which the UE_A 10 and/or the eNB_A 45 cannot transmit and/or receive the third message of the RRC including the NAS message.

In the case of the fifth mode, the UE_A 10 and/or the eNB_A 45 and/or the C-SGN_A 95 may transmit and/or receive the user data by use of the third transmission and/or reception procedure.

And/or, in the case of the fifth mode, the UE_A 10 and/or the eNB_A 45 and/or the C-SGN_A 95 may adopt a method for transmitting and/or receiving the user data by use of the third transmission and/or reception procedure as the initial transmission and/or reception method.

And/or, in the case of the fifth mode, the UE_A 10 and/or the eNB_A 45 and/or the C-SGN_A 95 may adopt the EPS bearer including the DRB as the Default Bearer.

The Default Bearer may be the first bearer, or the bearer for transmitting and/or receiving the user data in the initial transmission and/or reception method.

The PDN connection having been established when the fifth mode is entered may enter the idle mode of the related art depending on a condition such as that no user data is transmitted and/or received.

First identification information in the present embodiment may be a Preferred Network Behavior.

Note that the first identification information may be identification information including meaning of one or more kinds of second to sixth identification information. In other words, one or more kinds of identification information among the second to sixth identification information may be transmitted and/or received with being included in the first identification information.

The second identification information in the present embodiment may be a UE Control Plane CIoT EPS optimisation Capability. In other words, the second identification information may be information indicating that the UE_A 10 has a capability of transmitting and/or receiving the user data by use of the first transmission and/or reception procedure.

The third identification information in the present embodiment may be a UE User Plane CIoT EPS optimisation Capability. In other words, the third identification information may be information indicating that the UE_A 10 has a capability of transmitting and/or receiving the user data by use of the second transmission and/or reception procedure.

The fourth identification information in the present embodiment may be a UE CIoT EPS optimisation Preference. In other words, the fourth identification information may be information indicating a user data transmission and/or reception method which is requested by the UE_A 10.

The fifth identification information in the present embodiment may be a UE S1-u data transfer Capability. In other words, the fifth identification information may be information indicating that the UE_A 10 has a capability of transmitting and/or receiving the user data by use of the third transmission and/or reception procedure.

The sixth identification information in the present embodiment may be information indicating whether to establish the PDN connection.

Seventh identification information in the present embodiment may be a Supported Network Behavior.

Note that the seventh identification information may be identification information including meaning of one or more kinds of eighth to sixteenth identification information. In other words, one or more kinds of identification information among the eighth to sixteenth identification information may be transmitted and/or received with being included in the seventh identification information.

The eighth identification information in the present embodiment may be a Network Control Plane CIoT EPS optimisation Capability. In other words, the eighth identification information may be information indicating that the core network_A 90 has a capability of transmitting and/or receiving the user data by use of the first transmission and/or reception procedure.

The ninth identification information in the present embodiment may be a Network User Plane CIoT EPS optimisation Capability. In other words, the ninth identification information may be information indicating that the core network_A 90 has a capability of transmitting and/or receiving the user data by use of the second transmission and/or reception procedure.

The tenth identification information in the present embodiment may be a Network Control Plane CIoT EPS optimisation Allowance. In other words, the tenth identification information may be information indicating that the core network_A 90 allows transmission and/or reception of the user data by use of the first transmission and/or reception procedure.

The eleventh identification information in the present embodiment may be a Network User Plane CIoT EPS optimisation Allowance. In other words, the eleventh identification information may be information indicating that the core network_A 90 allows transmission and/or reception of the user data by use of the second transmission and/or reception procedure.

The twelfth identification information in the present embodiment may be a Network CIoT EPS optimisation Preference. In other words, the twelfth identification information may be information indicating a user data transmission and/or reception method which is requested by the core network_A 90.

The thirteenth identification information in the present embodiment may be an Authorized CIoT EPS optimisation Preference. In other words, the thirteenth identification information may be information indicating an authorized user data transmission and/or reception method.

The fourteenth identification information in the present embodiment may be a Network S1-u data transfer Capability. In other words, the fourteenth identification information may be information indicating that the core network_A 90 has a capability of transmitting and/or receiving the user data by use of the third transmission and/or reception procedure.

The fifteenth identification information in the present embodiment may be information indicating whether to establish the PDN connection.

The sixteenth identification information in the present embodiment may be an EPS Bearer ID. The sixteenth identification information may be transmitted and/or received with being included in an Attach Accept message and/or an Activate default EPS bearer context request message.

Seventeenth identification information in the present embodiment may be an EPS Bearer ID. The seventeenth identification information may be transmitted and/or received with being included in a Bearer resource modification request message and/or a Modify EPS bearer context request message and/or a Deactivate EPS bearer context request message.

The sixteenth identification information and/or the seventeenth identification information and/or twenty-sixth identification information may be identification information identifying the SRB and/or the CRB, or identification information identifying the DRB.

Eighteenth identification information in the present embodiment may be information indicating a transmission and/or reception method after requested change. The eighteenth identification information may be information indicating a method using the first transmission and/or reception procedure, or information indicating a method using the second transmission and/or reception procedure.

Nineteenth identification information in the present embodiment may be information indicating a type of the RB after requested change. The nineteenth identification information may be information indicating the SRB, or information indicating the DRB.

Twentieth identification information in the present embodiment may be information indicating a mode of the attach complete state after requested change. The twentieth identification information may be information indicating the first mode, or information indicating the third mode.

Twenty-first identification information in the present embodiment may be information indicating that the transmission and/or reception method is requested to be changed.

Twenty-second identification information in the present embodiment may be an Updated UE CIoT EPS optimisation Preference. In other words, the twenty-second identification information may be information indicating an updated user data transmission and/or reception method which is requested by the UE_A 10.

Twenty-third identification information in the present embodiment may be an Updated Network CIoT EPS optimisation Preference. In other words, the twenty-third identification information may be information indicating an updated user data transmission and/or reception method which is requested by the core network_A 90.

Twenty-fourth identification information in the present embodiment may be information indicating that the PDN connection is requested to be re-established.

Twenty-fifth identification information in the present embodiment may be information indicating that the Default Bearer is requested to be re-established.

Twenty-sixth identification information in the present embodiment may be an EPS Bearer ID. The twenty-sixth identification information may be transmitted and/or received with being included in a Modify EPS bearer context request message and/or a Modify EPS bearer context accept message and/or a Deactivate EPS bearer context accept message.

Twenty-seventh identification information in the present embodiment may be information indicating a transmission and/or reception method after authorized change. The twenty-seventh identification information may be information indicating a method using the first transmission and/or reception procedure, or information indicating a method using the second transmission and/or reception procedure.

Twenty-eighth identification information in the present embodiment may be information indicating a type of the RB after authorized change. The twenty-eighth identification information may be information indicating the SRB, or information indicating the DRB.

Twenty-ninth identification information in the present embodiment may be information indicating a mode of the attach complete state after authorized change. The twentieth identification information may be information indicating the first mode, or information indicating the third mode.

Thirtieth identification information in the present embodiment may be information indicating that the transmission and/or reception method is authorized to be changed.

Thirty-first identification information in the present embodiment may be an Updated UE CIoT EPS optimisation Preference. In other words, the thirty-first identification information may be information indicating an updated user data transmission and/or reception method which is requested by the UE_A 10.

Thirty-second identification information in the present embodiment may be an Updated Network CIoT EPS optimisation Preference. In other words, the thirty-second identification information may be information indicating an updated user data transmission and/or reception method which is requested by the core network_A 90.

Thirty-third identification information in the present embodiment may be an Updated Authorized CIoT EPS optimisation Preference. In other words, the thirty-third identification information may be information indicating an updated authorized user data transmission and/or reception method.

In a case that the UE_A 10 and/or the eNB_A 45 and/or the C-SGN_A 95 hold the respective pieces of identification information, the UE_A 10 and/or the eNB_A 45 and/or the C-SGN_A 95 may have capabilities indicated by the respective pieces of identification information.

Additionally, in the present embodiment, in a case that two or more kinds of identification information among the first to thirty-third identification information are transmitted with being included in the same control message, respective pieces of the identification information may be included and transmitted, or one kind of identification information having meanings indicated by respective pieces of the identification information may be included in the control message.

For example, the first identification information may be identification information having meanings indicated by the second to sixth identification information.

Note that each piece of identification information may be an information element configured as the flag or the parameter.

1.3.1. Attach Procedure Example

First, an example of an attach procedure will be described. The attach procedure is a procedure initiated by the UE_A 10. The attach procedure is a procedure for the UE_A 10 to connect to the network. In other words, the attach procedure is a procedure to connect to an access network including the eNB 45, and further, is a procedure to connect to a core network through the access network. The UE_A 10 establishes a communication path for transmitting and/or receiving the user data to and from the PDN_A 5 by means of the attach procedure.

A trigger for starting the attach procedure by the UE_A 10 may be a time when the power is supplied to the terminal, or the like. Additionally, the UE_A 10 may start at an arbitrary timing in a case that the UE_A 10 is in a state not connecting to the core network_A 90 regardless of the above. The UE_A 10 may enter the attach complete state, based on connection to the core network_A 90 and/or completion of the attach procedure.

In the following, a description is given of details of an example of the attach procedure.

Figure 23:
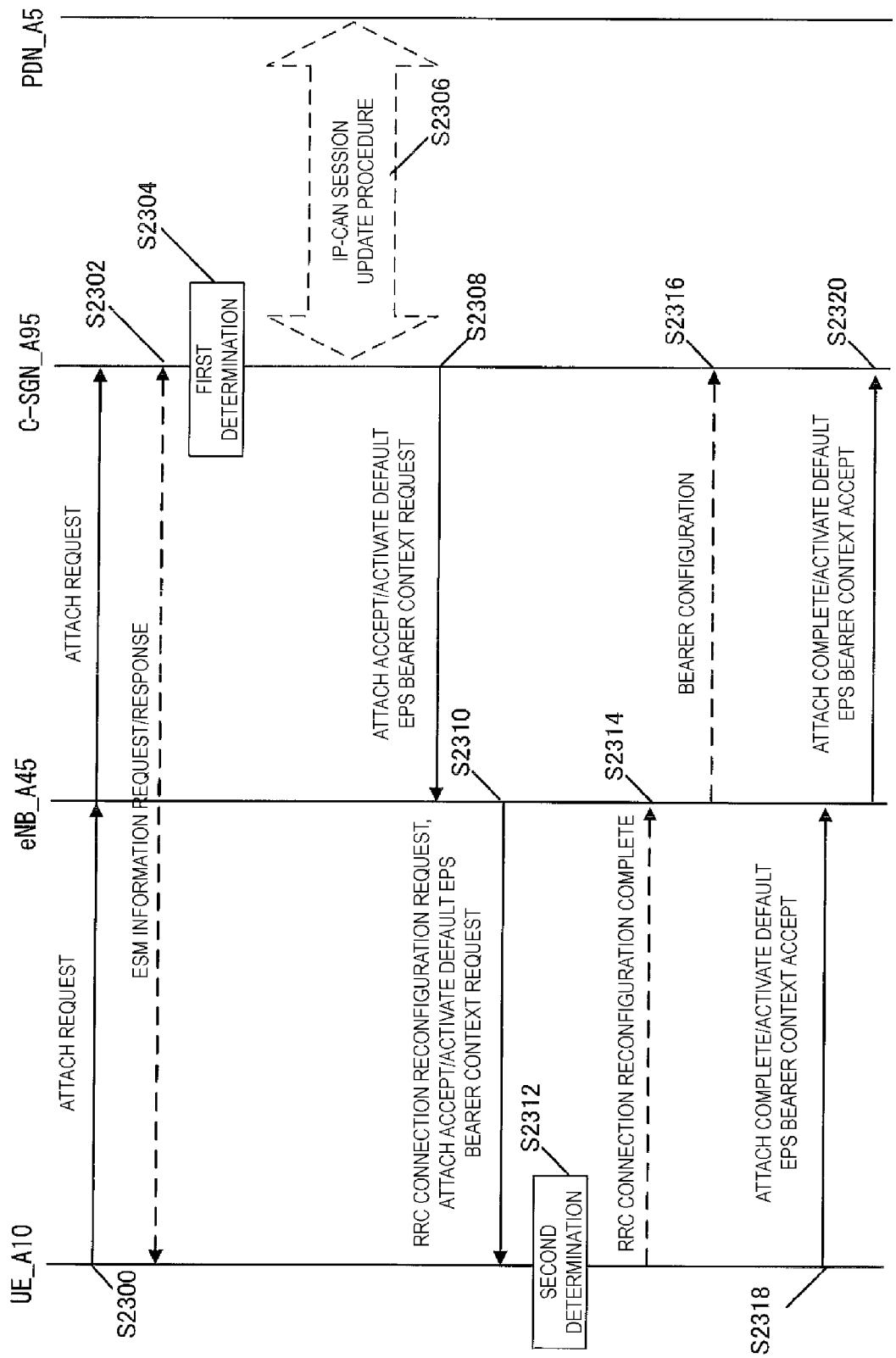
FIG. 23 is a diagram illustrating an attach procedure.

Hereinafter, an example of the steps of the attach procedure will be described using FIG. 23.

First, the UE_A 10 transmits an Attach Request message to the C-SGN_A 95 (S2300). Note that the UE_A 10 may transmit the Attach Request message to the eNB_A 45, and the transmitted Attach Request message may be transferred to the C-SGN_A 95 via the eNB_A 45.

Additionally, the UE_A 10 may select whether to include a PDN connectivity request message in the Attach Request message. To be more specific, the UE_A 10 may select whether to include an ESM message container containing the PDN connectivity request message in the Attach Request message.

Furthermore, the UE_A 10 may indicate that establishment of a PDN connection according to the attach procedure is requested by including the PDN connectivity request message and/or the ESM message container in the Attach Request message.

Conversely, the UE_A 10 may indicate that establishment of a PDN connection according to the attach procedure is not requested by not including the PDN connectivity request message and/or the ESM message container in the Attach Request message.

In the case that the UE_A 10 includes the PDN connectivity request message in the Attach Request message, in the description of the present embodiment, the Attach Request message is described as a message in which the Attach Request message and the PDN connectivity request message are combined. Furthermore, in the description of the present embodiment, in a case that an expression "identification information is included in the Attach Request message" is used, the expression means that the identification information is included in the Attach Request message and/or the PDN connectivity request message.

The UE_A 10 may include at least one or more kinds of identification information among the first to sixth identification information in the Attach Request message. The UE_A 10 may transmit the Attach Request message including one or more kinds of identification information among the first to sixth identification information to request a mode of the attach complete state to enter.

Here, one or more kinds of identification information among the first to sixth identification information may not be transmitted to the C-SGN_A 95 with being included in the Attach Request message, but may be transmitted with being included in a control message different from the Attach Request message in the attach procedure.

For example, after transmitting the Attach Request message, the UE_A 10 may perform a request of EPS Session Management (ESM) information, and a transmission and/or reception procedure of a control message which responds based on the request (S2302).

To be more specific, the C-SGN_A 95 transmits an ESM request message to the UE_A 10. The UE_A 10 receives the ESM request message, and transmits a response message to the C-SGN_A 95. At this time, the UE_A 10 may transmit the response message including one or more kinds of identification information among the first to sixth identification information.

Here, the UE_A 10 may encrypt and transmit the ESM response message. Furthermore, the UE_A 10 may receive information for encrypting the ESM response message from the C-SGN_A 95. The C-SGN_A 95 may transmit information for encrypting the NAS message to the UE_A 10 with the reception of the Attach Request message. Note that the NAS message for which the information for encrypting the NAS message is transmitted may be a Security Mode Command message.

The C-SGN_A 95 receives the Attach Request message. Furthermore, the C-SGN_A 95 acquires one or more kinds of identification information among the first to sixth identification information based on the reception of the Attach Request message or the reception of the ESM response message.

The C-SGN_A 95 may determine to enter the attach complete state for the UE_A 10 and/or determine the attach complete state to enter, based on the information included in the Attach Request message, subscriber information, and the identification information which the C-SGN_A 95 has.

For example, the C-SGN_A 95 may select and determine whether the attach complete state to enter is the first mode, the second mode, the third mode, the fourth mode, or the fifth mode, based on one or more kinds of identification information among the first to sixteenth identification information and/or whether the ESM message container is included and/or whether the PDN connectivity request message is included. Hereinafter, the selection and determination process described above is referred to as a first determination and described (S2304).

For example, in a case that the Attach Request message includes the second identification information, and/or the fourth identification information indicates the method using the first transmission and/or reception procedure, assume that a first condition is true.

In a case that the C-SGN_A 95 holds the eighth identification information and/or the tenth identification information, and/or the twelfth identification information and/or the thirteenth identification information indicate the method using the first transmission and/or reception procedure, assume that a second condition is true.

In a case that the Attach Request message includes the third identification information, and/or the fourth identification information indicates the method using the second transmission and/or reception procedure, assume that a third condition is true.

In a case that the C-SGN_A 95 holds the ninth identification information and/or the eleventh identification information, and/or the twelfth identification information and/or the thirteenth identification information indicate the method using the second transmission and/or reception procedure, assume that a fourth condition is true.

In a case that the Attach Request message includes the fifth identification information, assume that a fifth condition is true.

In a case that the C-SGN_A 95 holds the fourteenth identification information, assume that a sixth condition is true.

In a case that the Attach Request message includes the ESM message container and/or the PDN connectivity request message, and/or the sixth identification information indicates that the PDN connection is established, assume that a seventh condition is true.

In a case that the fifteenth identification information indicates that the PDN connection is established, assume that an eighth condition is true.

In a case that the Attach Request message does not include the ESM message container and/or the PDN connectivity request message, and/or the sixth identification information indicates that the PDN connection is not established, assume that a ninth condition is true.

In a case that the fifteenth identification information indicates that the PDN connection is not established, assume that a tenth condition is true.

The C-SGN_A 95 may enter the first mode in a case that the first condition is true, and/or in a case that the second condition is true, and/or in a case that the seventh condition is true, and/or in a case that the eighth condition is true.

Alternatively, the C-SGN_A 95 may enter the first mode in a case that the first condition is true and the seventh condition is true, and/or in a case that the first condition is true and the eighth condition is true, and/or in a case that the second condition is true and the seventh condition is true, and/or in a case that the second condition is true and the eighth condition is true, and/or in a case that the first condition is true and the second condition is true, and/or in a case that the seventh condition is true and the eighth condition is true.

Alternatively, the C-SGN_A 95 may enter the first mode in a case that the first condition is true, the second condition is true, and the seventh condition is true, and/or in a case that the first condition is true, the second condition is true, and the eighth condition is true, and/or in a case that the first condition is true, the seventh condition is true, and the eighth condition is true, and/or in a case that the second condition is true, the seventh condition is true, and the eighth condition is true.

Alternatively, the C-SGN_A 95 may enter the first mode in a case that the first condition is true, the second condition is true, the seventh condition is true, and the eighth condition is true.

The C-SGN_A 95 may enter the first mode in other cases than those of the above conditions without limitation.

The C-SGN_A 95 may enter the second mode in the case that the first condition is true, and/or in the case that the second condition is true, and/or in a case that the ninth condition is true, and/or in a case that the tenth condition is true.

Alternatively, the C-SGN_A 95 may enter the second mode in a case that the first condition is true and the ninth condition is true, and/or in a case that the first condition is true and the tenth condition is true, and/or in a case that the second condition is true and the ninth condition is true, and/or in a case that the second condition is true and the tenth condition is true, and/or in the case that the first condition is true and the second condition is true, and/or in a case that the ninth condition is true and the tenth condition is true.

Alternatively, the C-SGN_A 95 may enter the second mode in a case that the first condition is true, the second condition is true, and the ninth condition is true, and/or in a case that the first condition is true, the second condition is true, and the tenth condition is true, and/or in a case that the first condition is true, the ninth condition is true, and the tenth condition is true, and/or in a case that the second condition is true, the ninth condition is true, and the tenth condition is true.

Alternatively, the C-SGN_A 95 may enter the second mode in a case that the first condition is true, the second condition is true, the ninth condition is true, and the tenth condition is true.

The C-SGN_A 95 may enter the second mode in other cases than those of the above conditions without limitation.

The C-SGN_A 95 may enter the third mode in a case that the third condition is true, and/or in a case that the fourth condition is true, and/or in the case that the seventh condition is true, and/or in the case that the eighth condition is true.

Alternatively, the C-SGN_A 95 may enter the third mode in a case that the third condition is true and the seventh condition is true, and/or in a case that the third condition is true and the eighth condition is true, and/or in a case that the fourth condition is true and the seventh condition is true, and/or in a case that the fourth condition is true and the eighth condition is true, and/or in a case that the third condition is true and the fourth condition is true, and/or in the case that the seventh condition is true and the eighth condition is true.

Alternatively, the C-SGN_A 95 may enter the third mode in a case that the third condition is true, the fourth condition is true, and the seventh condition is true, and/or in a case that the third condition is true, the fourth condition is true, and the eighth condition is true, and/or in a case that the third condition is true, the seventh condition is true, and the eighth condition is true, and/or in a case that the fourth condition is true, the seventh condition is true, and the eighth condition is true.

Alternatively, the C-SGN_A 95 may enter the third mode in a case that the third condition is true, the fourth condition is true, the seventh condition is true, and the eighth condition is true.

The C-SGN_A 95 may enter the third mode in other cases than those of the above conditions without limitation.

The C-SGN_A 95 may enter the fourth mode in the case that the third condition is true, and/or in the case that the fourth condition is true, and/or in the case that the ninth condition is true, and/or in the case that the tenth condition is true.

Alternatively, the C-SGN_A 95 may enter the fourth mode in a case that the third condition is true and the ninth condition is true, and/or in a case that the third condition is true and the tenth condition is true, and/or in a case that the fourth condition is true and the ninth condition is true, and/or in a case that the fourth condition is true and the tenth condition is true, and/or in the case that the third condition is true and the fourth condition is true, and/or in the case that the ninth condition is true and the tenth condition is true.

Alternatively, the C-SGN_A 95 may enter the fourth mode in a case that the third condition is true, the fourth condition is true, and the ninth condition is true, and/or in a case that the third condition is true, the fourth condition is true, and the tenth condition is true, and/or in a case that the third condition is true, the ninth condition is true, and the tenth condition is true, and/or in a case that the fourth condition is true, the ninth condition is true, and the tenth condition is true.

Alternatively, the C-SGN_A 95 may enter the fourth mode in a case that the third condition is true, the fourth condition is true, the ninth condition is true, and the tenth condition is true.

The C-SGN_A 95 may enter the fourth mode in other cases than those of the above conditions without limitation.

The C-SGN_A 95 may enter the fifth mode in a case that the fifth condition is true, and/or in a case that the sixth condition is true, and/or in the case that the seventh condition is true, and/or in the case that the eighth condition is true.

Alternatively, the C-SGN_A 95 may enter the fifth mode in a case that the fifth condition is true and the seventh condition is true, and/or in a case that the fifth condition is true and the eighth condition is true, and/or in a case that the sixth condition is true and the seventh condition is true, and/or in a case that the sixth condition is true and the eighth condition is true, and/or in a case that the fifth condition is true and the sixth condition is true, and/or in the case that the seventh condition is true and the eighth condition is true.

Alternatively, C-SGN_A 95 may enter the fifth mode in a case that the fifth condition is true, the sixth condition is true, and the seventh condition is true, and/or in a case that the fifth condition is true, the sixth condition is true, and the eighth condition is true, and/or in a case that the fifth condition is true, the seventh condition is true, and the eighth condition is true, and/or in a case that the sixth condition is true, the seventh condition is true, and the eighth condition is true.

Alternatively, the C-SGN_A 95 may enter the fifth mode in a case that the fifth condition is true, the sixth condition is true, the seventh condition is true, and the eighth condition is true.

The C-SGN_A 95 may enter the fifth mode in other cases than those of the above conditions without limitation.

The conditions for entering the modes of the attach complete state are not limited to those described above.

The C-SGN_A 95 may start the procedure for establishing the PDN connection, based on the reception of the Attach Request message, and/or the transmission of the Attach Accept message, and/or the first determination.

To be more specific, in the case of entering the first mode and/or the third mode and/or the fifth mode, based on the first determination, the C-SGN_A 95 may start the procedure for establishing the PDN connection.

In the case of entering the second mode and/or the fourth mode, based on the first determination, the C-SGN_A 95 may not start and may omit the procedure for establishing the PDN connection.

The procedure for establishing the PDN connection may be constituted by an IP-CAN session update procedure, and/or transmission and/or reception of an Activate default EPS bearer context request message, and/or transmission and/or reception of an Activate default EPS bearer context accept message, and/or transmission and/or reception of an RRC connection reconfiguration request message, and/or transmission and/or reception of an RRC connection reconfiguration complete message, and/or transmission and/or reception of a bearer configuration message.

The C-SGN_A 95 starts the IP-CAN session update procedure in the case of entering the first mode and/or the third mode and/or the fifth mode (S2306). The IP-CAN session update procedure may be the same as the known procedure, and therefore detailed descriptions thereof will be omitted.

The C-SGN_A 95 transmits an Attach Accept message to the eNB_A 45 on the first determination and/or on the completion of the IP-CAN session update procedure (S2308).

Additionally, the C-SGN_A 95 may transmit the Activate default EPS bearer context request message with the Attach Accept message, based on the first determination.

In a case that the C-SGN_A 95 includes the Activate default EPS bearer context request message in the Attach Accept message, in the description of the present embodiment, the Attach Accept message is described as a message in which the Attach Accept message and the Activate default EPS bearer context request message are combined. Furthermore, in the description of the present embodiment, in the case that an expression "identification information is included in the Attach Accept message" is used, the expression means that the identification information is included in the Attach Accept message and/or the Activate default EPS bearer context request message.

The C-SGN_A 95 may include at least one or more kinds of identification information among the seventh to sixteenth identification information in the Attach Accept message.

The C-SGN_A 95 may modify and/or newly create one or more kinds of identification information among the seventh to sixteenth identification information, based on the first determination, and include the resulting identification information in the Attach Accept message.

Specifically, the C-SGN_A 95 may include information indicating the determined user data transmission and/or reception method in the thirteenth identification information, based on the first determination.

It may be determined, based on the first determination, whether the Activate default EPS bearer context request message is a message requesting that the DRB is established.

To be more specific, in the case of entering the first mode, based on the first determination, the Activate default EPS bearer context request message may be a message not intending to establish the DRB. In this case, the Activate default EPS bearer context request message may be a Downlink generic NAS Transport message.

In the case of entering the third mode and/or the fifth mode, based on the first determination, the Activate default EPS bearer context accept message may be a message intending to establish the DRB.

Note that the C-SGN_A 95 may put a connection state for the UE_A 10 in the idle mode with the transmission of the Attach Accept message based on the first determination. In other words, the C-SGN_A 95 may put the connection state for the UE_A 10 in the idle mode, based on entering the attach complete state. To be more specific, the C-SGN_A 95 may put the connection state for the UE_A 10 in the idle mode, based on that the attach complete state to enter is the first mode. In other words, in a case that the C-SGN_A 95 transmits the Attach Accept message for entering the attach complete state in the third mode and/or the fifth mode, the C-SGN_A 95 may put the connection state for the UE_A 10 in the active mode with the transmission of the message.

The eNB_A 45 receives the Attach Accept message, and transmits an RRC message including the Attach Accept message to the UE_A 10 (S2310). Note that the RRC message may be an RRC connection reconfiguration request message. The RRC message may be a Direct Transfer message.

The UE_A 10 receives the RRC message including the Attach Accept message. Furthermore, in a case that one or more kinds of identification information among the seventh to sixteenth identification information are included in the Attach Accept message, the UE_A 10 acquires each piece of identification information.

In order to respond to the received RRC message, the UE_A 10 transmits an RRC message to the eNB_A 45 (S2314). The RRC message may be an RRC connection reconfiguration complete message.

The eNB_A 45 receives the RRC connection reconfiguration message, and transmits a bearer configuration message to the C-SGN_A 95, based on the reception (S2316).

The UE_A 10 and/or the eNB_A 45 may omit the procedures at S2314 and S2316, based on the first determination.

Additionally, the UE_A 10 transmits an RRC message including an Attach Complete message to the eNB_A 45 based on the reception of the Attach Accept message (S2318).

Additionally, the UE_A 10 may transmit the Activate default EPS bearer context accept message with the Attach Complete message, based on the first determination. Here, the Activate default EPS bearer context accept message may be a response message to the Activate default EPS bearer context request message.

In the case that the UE_A 10 includes the Activate default EPS bearer context accept message in the Attach Complete message, in the description of the present embodiment, the Attach Complete message is described as a message in which the Attach Complete message and the Activate default EPS bearer context accept message are combined. Furthermore, in the description of the present embodiment, in the case that an expression "identification information is included in the Attach Complete message" is used, the expression means that the identification information is included in the Attach Complete message and/or the Activate default EPS bearer context accept message.

Note that the RRC message to be transmitted with including the Attach Complete message may be a Direct Transfer message.

The UE_A 10 enters the attach complete state, based on the reception of the Attach Accept message and/or the transmission of the Attach Complete message.

The UE_A 10 may recognize and determine the attach complete state to enter, based on the information included in the Attach Accept message and the identification information which the UE_A 10 has.

For example, the UE_A 10 may authorize and determine whether the attach complete state to enter is the first mode, the second mode, the third mode, the fourth mode, or the fifth mode, based on one or more kinds of identification information among the first to sixteenth identification information, and/or whether the ESM message container is included, and/or whether the Activate default EPS bearer context accept message is included. Hereinafter, the authorization and determination process described above is referred to as a second determination and described (S2312).

For example, in a case that the UE_A 10 holds the second identification information, and/or the fourth identification information indicates the method using the first transmission and/or reception procedure, assume that an eleventh condition is true.

Furthermore, in a case that the Attach Accept message includes the eighth identification information and/or the tenth identification information, and/or the twelfth identification information and/or the thirteenth identification information indicate the method using the first transmission and/or reception procedure, and/or the sixteenth identification information is identification information identifying the SRB and/or the CRB, assume that a twelfth condition is true.

Furthermore, in a case that the UE_A 10 holds the third identification information, and/or the fourth identification information indicates the method using the second transmission and/or reception procedure, assume that a thirteenth condition is true.

Furthermore, in a case that the Attach Accept message includes the ninth identification information and/or the eleventh identification information, and/or the twelfth identification information and/or the thirteenth identification information indicate the method using the second transmission and/or reception procedure, and/or the sixteenth identification information is identification information identifying the DRB, assume that a fourteenth condition is true.

Furthermore, in a case that the UE_A 10 holds the fifth identification information, assume that a fifteenth condition is true.

Furthermore, in a case that the Attach Accept message includes the fourteenth identification information, and/or the sixteenth identification information is identification information identifying the DRB, assume that a sixteenth condition is true.

Furthermore, in a case that the Attach Accept message includes the ESM message container and/or the Activate default EPS bearer context request message, and/or the sixth identification information indicates that the PDN connection is established, assume that a seventeenth condition is true.

Furthermore, in a case that the fifteenth identification information indicates that the PDN connection is established, assume that an eighteenth condition is true.

Furthermore, in a case that the Attach Accept message does not include the ESM message container and/or the Activate default EPS bearer context request message, and/or the sixth identification information indicates that the PDN connection is not established, assume that a nineteenth condition is true.

Furthermore, in a case that the fifteenth identification information indicates that the PDN connection is not established, assume that a twentieth condition is true.

The C-SGN_A 95 may enter the first mode in a case that the eleventh condition is true, and/or in a case that the twelfth condition is true, and/or in a case that the seventeenth condition is true, and/or in a case that the eighteenth condition is true.

Alternatively, the C-SGN_A 95 may enter the first mode in a case that the eleventh condition is true and the seventeenth condition is true, and/or in a case that the eleventh condition is true and the eighteenth condition is true, and/or in a case that the twelfth condition is true and the seventeenth condition is true, and/or in a case that the twelfth condition is true and the eighteenth condition is true, and/or in a case that the eleventh condition is true and the twelfth condition is true, and/or in a case that the seventeenth condition is true and the eighteenth condition is true.

Alternatively, the C-SGN_A 95 may enter the first mode in a case that the eleventh condition is true, the twelfth condition is true, and the seventeenth condition is true, and/or in a case that the eleventh condition is true, the twelfth condition is true, and the eighteenth condition is true, and/or in a case that the eleventh condition is true, the seventeenth condition is true, and the eighteenth condition is true, and/or in a case that the twelfth condition is true, the seventeenth condition is true, and the eighteenth condition is true.

Alternatively, the C-SGN_A 95 may enter the first mode in a case that the eleventh condition is true, the twelfth condition is true, the seventeenth condition is true, and the eighteenth condition is true.

The C-SGN_A 95 may enter the first mode in other cases than those of the above conditions without limitation.

The C-SGN_A 95 may enter the second mode in the case that the eleventh condition is true, and/or in the case that the twelfth condition is true, and/or in a case that the nineteenth condition is true, and/or in a case that the twentieth condition is true.

Alternatively, the C-SGN_A 95 may enter the second mode in a case that the eleventh condition is true and the nineteenth condition is true, and/or in a case that the eleventh condition is true and the twentieth condition is true, and/or in a case that the twelfth condition is true and the nineteenth condition is true, and/or in a case that the twelfth condition is true and the twentieth condition is true, and/or in the case that the eleventh condition is true and the twelfth condition is true, and/or in a case that the nineteenth condition is true and the twentieth condition is true.

Alternatively, the C-SGN_A 95 may enter the second mode in a case that the eleventh condition is true, the twelfth condition is true, and the nineteenth condition is true, and/or in a case that the eleventh condition is true, the twelfth condition is true, and the twentieth condition is true, and/or in a case that the eleventh condition is true, the nineteenth condition is true, and the twentieth condition is true, and/or in a case that the twelfth condition is true, the nineteenth condition is true, and the twentieth condition is true.

Alternatively, the C-SGN_A 95 may enter the second mode in a case that the eleventh condition is true, the twelfth condition is true, the nineteenth condition is true, and the twentieth condition is true.

The C-SGN_A 95 may enter the second mode in other cases than those of the above conditions without limitation.

The C-SGN_A 95 may enter the third mode in a case that the thirteenth condition is true, and/or in a case that the fourteenth condition is true, and/or in a case that the seventeenth condition is true, and/or in a case that the eighteenth condition is true.

Alternatively, the C-SGN_A 95 may enter the third mode in a case that the thirteenth condition is true and the seventeenth condition is true, and/or in a case that the thirteenth condition is true and the eighteenth condition is true, and/or in a case that the fourteenth condition is true and the seventeenth condition is true, and/or, in a case that the fourteenth condition is true and the eighteenth condition is true, and/or in a case that the thirteenth condition is true and the fourteenth condition is true, and/or in a case that the seventeenth condition is true and the eighteenth condition is true.

Alternatively, the C-SGN_A 95 may enter the third mode in a case that the thirteenth condition is true, the fourteenth condition is true, and the seventeenth condition is true, and/or in a case that the thirteenth condition is true, the fourteenth condition is true, and the eighteenth condition is true, and/or in a case that the thirteenth condition is true, the seventeenth condition is true, and the eighteenth condition is true, and/or in a case that the fourteenth condition is true, the seventeenth condition is true, and the eighteenth condition is true.

Alternatively, the C-SGN_A 95 may enter the third mode in a case that the thirteenth condition is true, the fourteenth condition is true, the seventeenth condition is true, and the eighteenth condition is true.

The C-SGN_A 95 may enter the third mode in other cases than those of the above conditions without limitation.

The C-SGN_A 95 may enter the fourth mode in the case that the thirteenth condition is true, and/or in the case that the fourteenth condition is true, and/or in the case that the nineteenth condition is true, and/or in the case that the twentieth condition is true.

Alternatively, the C-SGN_A 95 may enter the fourth mode in a case that the thirteenth condition is true and the nineteenth condition is true, and/or in a case that the thirteenth condition is true and the twentieth condition is true, and/or in a case that the fourteenth condition is true and the nineteenth condition is true, and/or in a case that the fourteenth condition is true and the twentieth condition is true, and/or in the case that the thirteenth condition is true and the fourteenth condition is true, and/or in the case that the nineteenth condition is true and the twentieth condition is true.

Alternatively, the C-SGN_A 95 may enter the fourth mode in a case that the thirteenth condition is true, the fourteenth condition is true, and the nineteenth condition is true, and/or in a case that the thirteenth condition is true, the fourteenth condition is true, and the twentieth condition is true, and/or in a case that the thirteenth condition is true, the nineteenth condition is true, and the twentieth condition is true, and/or in a case that the fourteenth condition is true, the nineteenth condition is true, and the twentieth condition is true.

Alternatively, the C-SGN_A 95 may enter the fourth mode in a case that the thirteenth condition is true, the fourteenth condition is true, the nineteenth condition is true, and the twentieth condition is true.

The C-SGN_A 95 may enter the fourth mode in other cases than those of the above conditions without limitation.

The C-SGN_A 95 may enter the fifth mode in a case that the fifteenth condition is true, and/or in case that the sixteenth condition is true, and/or in the case that the seventeenth condition is true, and/or in the case that the eighteenth condition is true.

Alternatively, the C-SGN_A 95 may enter the fifth mode in a case that the fifteenth condition is true and the seventeenth condition is true, and/or in a case that the fifteenth condition is true and the eighteenth condition is true, and/or in a case that the sixteenth condition is true and the seventeenth condition is true, and/or in a case that the sixteenth condition is true and the eighteenth condition is true, and/or in a case that the fifteenth condition is true and the sixteenth condition is true, and/or in the case that the seventeenth condition is true and the eighteenth condition is true.

Alternatively, the C-SGN_A 95 may enter the fifth mode in a case that the fifteenth condition is true, the sixteenth condition is true, and the seventeenth condition is true, and/or in a case that the fifteenth condition is true, the sixteenth condition is true, and the eighteenth condition is true, and/or in a case that the fifteenth condition is true, the seventeenth condition is true, and the eighteenth condition is true, and/or in a case that the sixteenth condition is true, the seventeenth condition is true, and the eighteenth condition is true.

Alternatively, the C-SGN_A 95 may enter the fifth mode in a case that the fifteenth condition is true, the sixteenth condition is true, the seventeenth condition is true, and the eighteenth condition is true.

The C-SGN_A 95 may enter the fifth mode in other cases than those of the above conditions without limitation.

The conditions for entering the modes of the attach complete state are not limited to those described above.

The UE_A 10 and/or the eNB_A 45 and/or the C-SGN_A 95 may establish the PDN connection, based on the transmission and/or reception of the Attach Accept message, and/or the transmission and/or reception of the Attach Complete message, and/or a fourth determination. On establishing the PDN connection, the Default Bearer may be established. The RB constituting the Default Bearer may be a DRB. Alternatively, the RB constituting the Default Bearer may be an SRB.

To be more specific, in a case that the attach complete state is in the first mode and/or the third mode and/or the fifth mode, the UE_A 10 and/or the eNB_A 45 and/or the C-SGN_A 95 may establish the PDN connection and/or the Default Bearer and/or and the SRB.

In a case that the attach complete state is in the second mode and/or the fourth mode, the UE_A 10 and/or the eNB_A 45 and/or the C-SGN_A 95 may not establish the PDN connection and/or the Default Bearer.

In a case the attach complete state is in the third mode and/or the fifth mode, the UE_A 10 and/or the eNB_A 45 and/or the C-SGN_A 95 may establish the DRB.

In the case that the attach complete state is in the first mode, the UE_A 10 and/or the eNB_A 45 and/or the C-SGN_A 95 may not establish the DRB. In other words, in the case that the attach complete state is in the first mode, the UE_A 10 and/or the eNB_A 45 and/or the C-SGN_A 95 may establish the SRB without establishing the DRB.

The eNB_45 receives the RRC message including the Attach Complete message, and transmits the Attach Complete message to the C-SGN_A 95 (S2320).

Additionally, the UE_A 10 may enter the idle mode with the transmission of the Attach Complete message, based on the second determination. To be more specific, the UE_A 10 may enter the idle mode with the transmission of the Attach Complete message in the case that the attach complete state to enter is the third mode and/or the fifth mode.

Alternatively, the UE_A 10 may receive the RRC message from the eNB_A 45 as the response to the Direct Transfer message including the Attach Complete message, and may enter the idle mode with the reception of the response message, based on the second determination.

As a more detailed example, the UE_A 10 may transmit the Attach Complete message and/or Direct Transfer message including identification information indicating that the UE_A 10 enters the idle mode.

Furthermore, the eNB_A 45 which receives the Direct Transfer message may transmit an RRC message to be a response to the UE_A 10, based on the received identification information. As described above, the RRC message to be the response may be a message for allowing the entering the idle mode.

In other words, the UE_A 10 can select whether to enter the idle mode or to maintain the active mode, based on the second determination.

The C-SGN_A 95 receives the Attach Complete message.

The C-SGN_A 95 may make the connection state for the UE_A 10 enter the idle mode, based on the reception of the Attach Complete message.

In other words, the C-SGN_A 95 may manage the state of the UE_A 10 as the idle mode, based on the transmission of the Attach Accept message or the reception of the Attach Complete message.

To be more specific, the C-SGN_A 95 may manage the state of the UE_A 10 as the idle mode, based on the transmission of the Attach Accept message or the reception of the Attach Complete message in a case that the entered attach complete state is in the third mode and/or the fifth mode.

The UE_A 10 and/or the eNB_A 45 may identify the type of the RB established as the Default Bearer, based on the sixteenth identification information.

For example, the UE_A 10 and/or the eNB_A 45 may recognize that the SRB and/or the CRB are established as the Default Bearer in the case that the sixteenth identification information is the identification information identifying the SRB and/or the CRB.

The UE_A 10 and/or the eNB_A 45 may recognize that the DRB is established as the Default Bearer in the case that the sixteenth identification information is the identification information identifying the DRB.

By the above-described steps, the UE_A 10 connects to the network, and completes the attach procedure. On the completion of the attach procedure, the UE_A 10 and/or the C-SGN_A 95 enter the attach complete state.

Note that the UE_A 10 can acquire the UE contexts illustrated in FIGS. 21(*b*) to 21(*d*) from the core network_A 90 by the attach procedure and store the contexts.

To be more specific, in the case that the entered attach complete state is in the first mode and/or the third mode and/or the fifth mode, the UE_A 10 can acquire the UE contexts illustrated in FIGS. 21(*b*) to 21(*d*) from the core network_A 90 by the attach procedure and store the contexts.

Moreover, in a case that the entered attach complete state is in the second mode and/or the fourth mode, the UE_A 10 can acquire other UE contexts than the UE context for each PDN connection and/or UE context for each bearer among the UE context illustrated in FIGS. 21(*b*) to 21(*d*) from the core network_A 90 by the attach procedure and store the contexts.

Furthermore, the C-SGN_A 95 can acquire each of the contexts A to E illustrated in FIG. 19 from the UE_A 10, the eNB_A 45, or the HSS_A 50 by the attach procedure and store the context.

To be more specific, in the case that the entered attach complete state is in the first mode and/or the third mode and/or the fifth mode, the C-SGN_A 95 can acquire each of the contexts A to E illustrated in FIG. 19 from the UE_A 10, the eNB_A 45, or the HSS_A 50 by the attach procedure and store the context.

Moreover, in the case that the entered attach complete state is in the second mode and/or the fourth mode, the C-SGN_A 95 can acquire other contexts than the EPS bearer context for each PDN connection and/or EPS bearer context for each bearer among the respective contexts A to E illustrated in FIG. 19 from the UE_A 10, the eNB_A 45, or the HSS_A 50 by the attach procedure and store the contexts.

1.3.1.1. Attach Procedure Modification Example

Although the attach procedure is described in a case that the core network_A 90 in the attach procedure example described above is a core network configured by including the C-SGN_A 95 described using FIGS. 3A and 3B, the core network_A 90 may be a core network configured by including the PGW_A 30, the SGW_A 35, the MME_A 40, or the like as described using FIGS. 2A and 2B.

In this case, the NAS message such as the Attach Request message, the Attach Complete message transmitted by the UE_A 10 described in this procedure is received by the MME 45, not by the C-SGN_A 95.

Accordingly, the reception and processes of the NAS message by the C-SGN_A 95 in the above description can be replaced with those performed by the MME_A 40.

Furthermore, the transmission and processes of the NAS message such as the Attach Accept message by the C-SGN_A 95 in the above description can be replaced with those performed by the MME_A 40.

1.3.2. Example of PDN Connectivity Procedure

Next, an example of the PDN connectivity procedure will be described. The PDN connectivity procedure is a procedure initiated by the UE_A 10. The PDN connectivity procedure is a procedure for establishing a communication path for the UE_A 10 to transmit and/or receive the user data to and from the PDN_A 5. In other words, the PDN connectivity procedure is a procedure for establishing the PDN connection used to transmit and/or receive the user data.

A trigger for starting the PDN connectivity procedure by the UE_A 10 may be a time when the power is supplied to the terminal, or a time when the attach procedure is completed. The UE_A 10 may start the PDN connectivity procedure, based on entering the attach complete state in the second mode and/or the fourth mode on the completion of the attach procedure. Moreover, regardless of the above, the UE_A 10 may start PDN connectivity procedure at any timing.

After the completion of the PDN connectivity procedure, the UE 10 establishes the PDN connection with the PDN_A 5. Accordingly, the UE_A 10 may change the mode of the attach complete state, based on the completion of the PDN connectivity procedure.

A description is given below of details of the example of the PDN connectivity procedure.

Figure 24:
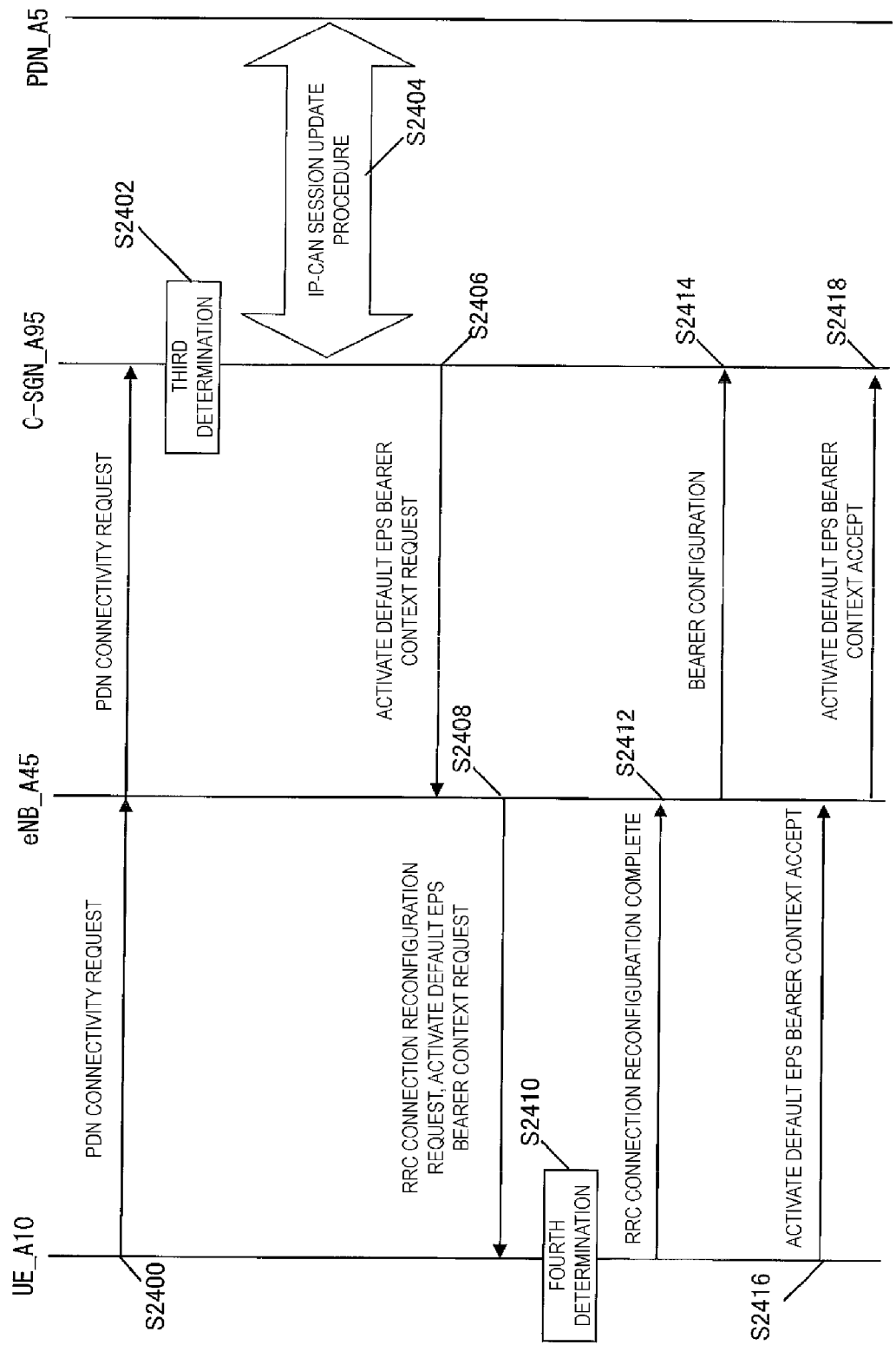
FIG. 24 is a diagram illustrating a PDN connectivity procedure.

The example of the steps of the PDN connectivity procedure will be described below using FIG. 24.

First, the UE_A 10 transmits a PDN connectivity request message to the C-SGN_A 95 (S2400). Note that the UE_A 10 may transmit the PDN connectivity request message to the eNB_A 45, and the transmitted PDN connectivity request message may be transferred to the C-SGN_A 95 via the eNB 45.

The UE_A 10 may include at least one or more kinds of identification information among the first to fifth identification information in the PDN connectivity request message. The UE_A 10 may transmit the PDN connectivity request message including one or more kinds of identification information among the first to fifth identification information to request a type of the PDN connection to establish and/or a mode of the attach complete state to enter.

The C-SGN_A 95 receives the PDN connectivity request message. Furthermore, the C-SGN_A 95 acquires one or more kinds of identification information among the first to fifth identification information, based on the reception of the PDN connectivity request message.

The C-SGN_A 95 may establish the PDN connection for the UE_A 10 and/or determine the attach complete state to enter, based on the information included in the PDN connectivity request message, subscriber information, and the identification information which the C-SGN_A 95 has.

For example, the C-SGN_A 95 may select and determine whether the attach complete state to enter is the first mode, the third mode, or the fifth mode, based on one or more kinds of identification information among the first to sixteenth identification information. Hereinafter, the selection and determination process described above is referred to as a third determination and described (S2402).

For example, in a case that the PDN connectivity request message includes the second identification information, and/or the fourth identification information indicates the method using the first transmission and/or reception procedure, assume that a first condition is true.

In a case that the C-SGN_A 95 holds the eighth identification information and/or the tenth identification information, and/or the twelfth identification information and/or the thirteenth identification information indicate the method using the first transmission and/or reception procedure, assume that a second condition is true.

In a case that the PDN connectivity request message includes the third identification information, and/or the fourth identification information indicates the method using the second transmission and/or reception procedure, assume that a third condition is true.

In a case that the C-SGN_A 95 holds the ninth identification information and/or the eleventh identification information, and/or the twelfth identification information and/or the thirteenth identification information indicate the method using the second transmission and/or reception procedure, assume that a fourth condition is true.

In a case that the PDN connectivity request message includes the fifth identification information, assume that a fifth condition is true.

In a case that the C-SGN_A 95 holds the fourteenth identification information, assume that a sixth condition is true.

The C-SGN_A 95 may enter the first mode in a case that the first condition is true, and/or in a case that the second condition is true, and/or in a case that the first condition is true and the second condition is true.

The C-SGN_A 95 may enter the first mode in other cases than those of the above conditions without limitation.

The C-SGN_A 95 may enter the third mode in a case that the third condition is true, and/or in a case that the fourth condition is true, and/or in a case that the third condition is true and the fourth condition is true.

The C-SGN_A 95 may enter the third mode in other cases than those of the above conditions without limitation.

The C-SGN_A 95 may enter the fifth mode in a case that the fifth condition is true, and/or in a case that the sixth condition is true, and/or in a case that the fifth condition is true and the sixth condition is true.

The C-SGN_A 95 may enter the fifth mode in other cases than those of the above conditions without limitation.

The conditions for entering the modes of the attach complete state are not limited to those described above.

The C-SGN_A 95 may start the procedure for establishing the PDN connection based on the reception of the PDN connectivity request message, and/or transmission of the Activate default EPS bearer context request message, and/or the third determination.

The procedure for establishing the PDN connection may be constituted by an IP-CAN session update procedure, and/or transmission and/or reception of an Activate default EPS bearer context request message, and/or transmission and/or reception of an Activate default EPS bearer context accept message, and/or transmission and/or reception of an RRC connection reconfiguration request message, and/or transmission and/or reception of an RRC connection reconfiguration complete message, and/or transmission and/or reception of a bearer configuration message.

The C-SGN_A 95 starts the IP-CAN session update procedure (S2404). The IP-CAN session update procedure may be the same as the known procedure, and therefore detailed descriptions thereof will be omitted.

The C-SGN_A 95 transmits the Activate default EPS bearer context request message to the eNB_A 45 on the third determination and/or on the completion of the IP-CAN session update procedure (S2406). The Activate default EPS bearer context request message may be a response message to the PDN connectivity request message.

The C-SGN_A 95 may include at least one or more kinds of identification information among the seventh to sixteenth identification information in the Activate default EPS bearer context request message.

The C-SGN_A 95 may modify and/or newly create one or more kinds of identification information among the seventh to sixteenth identification information, based on the third determination, and include the resulting identification information in the Activate default EPS bearer context request message.

Specifically, the C-SGN_A 95 may include information indicating the determined user data transmission and/or reception method in the thirteenth identification information, based on the third determination.

It may be determined, based on the third determination, whether the Activate default EPS bearer context request message is a message requesting that the DRB is established.

To be more specific, in the case of entering the first mode, based on the third determination, the Activate default EPS bearer context request message may be a message not intending to establish the DRB. In this case, the Activate default EPS bearer context request message may be a Downlink generic NAS Transport message.

In the case of entering the third mode and/or the fifth mode, based on the third determination, the Activate default EPS bearer context accept message may be a message intending to establish the DRB.

Note that the C-SGN_A 95 may put the connection state for the UE_A 10 in the idle mode with the transmission of the Activate default EPS bearer context request message based on the third determination. In other words, the C-SGN_A 95 may put the connection state for the UE_A 10 in the idle mode, based on entering the attach complete state. To be more specific, the C-SGN_A 95 may put the connection state for the UE_A 10 in the idle mode, based on that the attach complete state to enter is the first mode. In other words, in a case that the C-SGN_A 95 transmits the Activate default EPS bearer context request message for entering the attach complete state in the third mode and/or the fifth mode, the C-SGN_A 95 may put the connection state for the UE_A 10 in the active mode with the transmission of the message.

The eNB_A 45 receives the Activate default EPS bearer context request message, and transmits an RRC message including the Activate default EPS bearer context request message to the UE_A 10 (S2408). Note that the RRC message may be an RRC connection reconfiguration request message. The RRC message may be a Direct Transfer message.

The UE_A 10 receives the RRC message including the Activate default EPS bearer context request message. Furthermore, in a case that one or more kinds of identification information among the seventh to sixteenth identification information are included in the Activate default EPS bearer context request message, the UE_A 10 acquires each piece of identification information.

In order to respond to the received RRC message, the UE_A 10 transmits an RRC message to the eNB_A 45 (S2412). The RRC message may be an RRC connection reconfiguration complete message.

The eNB_A 45 receives the RRC connection reconfiguration message, and transmits a bearer configuration message to the C-SGN_A 95, based on the reception (S2414).

The UE_A 10 and/or the eNB_A 45 may omit the procedures at S2412 and S2414, based on the third determination.

The UE_A 10 transmits an RRC message including the Activate default EPS bearer context accept message to the eNB_A 45, based on the reception of the Activate default EPS bearer context request message (S2416). Here, the Activate default EPS bearer context accept message may be a response message to the Activate default EPS bearer context request message.

Note that the RRC message to be transmitted with including the Activate default EPS bearer context accept message may be a Direct Transfer message.

The UE_A 10 enters the attach complete state, based on the reception of the Activate default EPS bearer context request message and/or the transmission of the Activate default EPS bearer context accept message.

The UE_A 10 may recognize and determine the attach complete state to enter, based on the information included in the Activate default EPS bearer context request message and the identification information which the UE_A 10 has.

For example, the UE_A 10 may authorize and determine whether the attach complete state to enter is the first mode, the third mode, or the fifth mode, based on one or more kinds of identification information among the first to sixteenth identification information. Hereinafter, the authorization and determination process described above is referred to as a fourth determination and described (S2410).

For example, in a case that the UE_A 10 holds the second identification information, and/or the fourth identification information indicates the method using the first transmission/reception procedure, assume that the eleventh condition is true.

Furthermore, in a case that the Activate default EPS bearer context request message includes the eighth identification information and/or the tenth identification information, and/or the twelfth identification information and/or the thirteenth identification information indicate the method using the first transmission and/or reception procedure, and/or the sixteenth identification information is identification information identifying the SRB and/or the CRB, assume that the twelfth condition is true.

Furthermore, in a case that the UE_A 10 holds the third identification information, and/or the fourth identification information indicates the method using the second transmission and/or reception procedure, assume that the thirteenth condition is true.

Furthermore, in a case that the Activate default EPS bearer context request message includes the ninth identification information and/or the eleventh identification information, and/or the twelfth identification information and/or the thirteenth identification information indicate the method using the second transmission and/or reception procedure, and/or the sixteenth identification information is identification information identifying the DRB, assume that the fourteenth condition is true.

Furthermore, in a case that the UE_A 10 holds the fifth identification information, assume that the fifteenth condition is true.

Furthermore, in a case that the Activate default EPS bearer context request message includes the fourteenth identification information, and/or the sixteenth identification information is identification information identifying the DRB, assume that the sixteenth condition is true.

The UE_A 10 may enter the first mode in a case that the eleventh condition is true, and/or in a case that the twelfth condition is true, and/or in a case that the eleventh condition is true and the twelfth condition is true.

The UE_A 10 may enter the first mode in other cases than those of the above conditions without limitation.

The UE_A 10 may enter the third mode in a case that the thirteenth condition is true, and/or in a case that the fourteenth condition is true, and/or in a case that the thirteenth condition is true and the fourteenth condition is true.

The UE_A 10 may enter the third mode in other cases than those of the above conditions without limitation.

The UE_A 10 may enter the fifth mode in a case that the fifteenth condition is true, and/or in a case that the sixteenth condition is true, and/or in a case that the fifteenth condition is true and the sixteenth condition is true.

The UE_A 10 may enter the fifth mode in other cases than those of the above conditions without limitation.

The conditions for entering the modes of the attach complete state are not limited to those described above.

The UE_A 10 and/or the eNB_A 45 and/or the C-SGN_A 95 may establish the PDN connection, based on the transmission and/or reception of the Activate default EPS bearer context request message, and/or the transmission and/or reception of the Activate default EPS bearer context accept message, and/or the fourth determination. On establishing the PDN connection, the Default Bearer may be established. The RB constituting the Default Bearer may be a DRB. Alternatively, the RB constituting the Default Bearer may be an SRB.

To be more specific, the UE_A 10 and/or the eNB_A 45 and/or the C-SGN_A 95 may establish the PDN connection and/or the Default Bearer and/or the SRB.

In the case the attach complete state is in the third mode and/or the fifth mode, the UE_A 10 and/or the eNB_A 45 and/or the C-SGN_A 95 may establish the DRB.

In the case that the attach complete state is in the first mode, the UE_A 10 and/or the eNB_A 45 and/or the C-SGN_A 95 may not establish the DRB. In other words, in the case that the attach complete state is in the first mode, the UE_A 10 and/or the eNB_A 45 and/or the C-SGN_A 95 may establish the SRB without establishing the DRB.

The eNB_45 receives the RRC message including the Activate default EPS bearer context accept message, and transmits the Activate default EPS bearer context accept message to the C-SGN_A 95 (S2418).

Additionally, the UE_A 10 may enter the idle mode with the transmission of the Activate default EPS bearer context accept message, based on the fourth determination. To be more specific, the UE_A 10 may enter the idle mode with the transmission of the Activate default EPS bearer context accept message in the case that the attach complete state to enter is the third mode and/or the fifth mode.

Alternatively, the UE_A 10 may receive the RRC message from the eNB_A 45 as the response to the Direct Transfer message including the Activate default EPS bearer context accept message, and may enter the idle mode with the reception of the response message, based on the fourth determination.

As a more detailed example, the UE_A 10 may transmit the Activate default EPS bearer context accept message and/or Direct Transfer message including identification information indicating that the UE_A 10 enters the idle mode.

Furthermore, the eNB_A 45 which receives the Direct Transfer message may transmit an RRC message to be a response to the UE_A 10, based on the received identification information. As described above, the RRC message to be the response may be a message for allowing the entering the idle mode.

In other words, the UE_A 10 can select whether to enter the idle mode or to maintain the active mode, based on the fourth determination.

The C-SGN_A 95 receives the Activate default EPS bearer context accept message.

The C-SGN_A 95 may make the connection state for the UE_A 10 enter the idle mode, based on the reception of the Activate default EPS bearer context accept message.

In other words, the C-SGN_A 95 may manage the state of the UE_A 10 as the idle mode, based on the transmission of the Activate default EPS bearer context request message or the reception of the Activate default EPS bearer context accept message.

To be more specific, the C-SGN_A 95 may manage the state of the UE_A 10 as the idle mode, based on the transmission of the Activate default EPS bearer context request message or the reception of the Activate default EPS bearer context accept message in a case that the entered attach complete state is in the third mode and/or the fifth mode.

The UE_A 10 and/or the eNB_A 45 may identify the type of the RB established as the Default Bearer, based on the sixteenth identification information.

For example, the UE_A 10 and/or the eNB_A 45 may recognize that the SRB and/or the CRB are established as the Default Bearer in the case that the sixteenth identification information is the identification information identifying the SRB and/or the CRB.

The UE_A 10 and/or the eNB_A 45 may recognize that the DRB is established as the Default Bearer in the case that the sixteenth identification information is the identification information identifying the DRB.

By the above-described steps, the UE_A 10 connects to the network, and completes the first PDN connectivity procedure. On the completion of the first PDN connectivity procedure, the UE_A 10 and/or the C-SGN_A 95 may change the mode of the attach complete state.

Note that the UE_A 10 can acquire the UE contexts illustrated in FIGS. 21(*b*) to 21(*d*) from the core network_A 90 by the PDN connectivity procedure and store the contexts.

To be more specific, the UE_A 10 can acquire the UE context for each PDN connection and/or UE context for each bearer among the UE contexts illustrated in FIGS. 21(*b*) to 21(*d*) from the core network_A 90 by the PDN connectivity procedure and store the contexts.

Furthermore, the C-SGN_A 95 can acquire each of the contexts A to E illustrated in FIG. 19 from the UE_A 10, the eNB_A 45, or the HSS_A 50 by the PDN connectivity procedure and store the context.

To be more specific, the C-SGN_A 95 can acquire the EPS bearer context for each PDN connection and/or EPS bearer context for each bearer among the contexts A to E illustrated in FIG. 19 from the UE_A 10, the eNB_A 45, or the HSS_A 50 by the PDN connectivity procedure and store the contexts.

1.3.2.1. Modification Example of PDN Connectivity Procedure

Although the PDN connectivity procedure is described in a case that the core network_A 90 in the PDN connectivity procedure example described above is a core network configured by including the C-SGN_A 95 described using FIGS. 3A and 3B, the core network_A 90 may be a core network configured by including the PGW_A 30, the SGW_A 35, the MME_A 40, or the like as described using FIGS. 2A and 2B.

In this case, the NAS message such as the PDN connectivity request message, the Activate default EPS bearer context accept message transmitted by the UE_A 10 described in this procedure is received by the MME 45, not by the C-SGN_A 95.

Accordingly, the reception and processes of the NAS message by the C-SGN_A 95 in the above description can be replaced with those performed by the MME_A 40.

Furthermore, the transmission and processes of the NAS message such as the Activate default EPS bearer context request message by the C-SGN_A 95 in the above description can be replaced with those performed by the MME_A 40.

1.3.3. Example of Transmission and/or Reception Method Change Procedure

First, an example of the transmission and/or reception method change procedure will be described. The transmission and/or reception method change procedure is a procedure initiated by the UE_A 10 and/or the core network_A 90. In other words, the transmission and/or reception method change procedure includes a procedure initiated by the UE_A 10 and a procedure initiated by the C-SGN_A 95.

The transmission and/or reception method change procedure is a procedure for the UE_A 10 and/or the C-SGN_A 95 to change the transmission and/or reception method used for the transmission and/or reception of the user data. In other words, the transmission and/or reception method change procedure is a procedure for changing the attach complete state of the UE_A 10 and/or the C-SGN_A 95.

The UE_A 10 and/or the C-SGN_A 95 may start the transmission and/or reception method change procedure at a time when the attach procedure and/or the PDN connectivity procedure are completed. Additionally, the UE_A 10 and/or the C-SGN_A 95 may start the transmission and/or reception method change procedure at an arbitrary timing in a case that the UE_A 10 is in a state connecting to the core network_A 90 regardless of the above.

A trigger for starting the transmission and/or reception method change procedure may be an operation on the UE, or an operator policy.

To be more specific, a trigger for starting the transmission and/or reception method change procedure to be initiated by the UE_A 10 may be based on the operation on the UE.

A trigger for starting the transmission and/or reception method change procedure initiated by the core network_A 90 may be not based on the reception of the Bearer resource modification request message transmitted by the UE_A 10, but based on the network policy of the operator.

The UE_A 10 and/or the C-SGN_A 95 are allowed to perform the transmission and/or reception of the user data by use of a new transmission and/or reception method after the completion of the transmission and/or reception method change procedure. Accordingly, the UE_A 10 and/or the C-SGN_A 95 may change the mode of the attach complete state, based on the completion of the transmission and/or reception method change procedure.

Hereinafter, a description is give of details of the transmission and/or reception method change procedure initiated by the UE_A 10 as a first transmission and/or reception method change procedure. Furthermore, a description is given of details of the transmission and/or reception method change procedure initiated by the C-SGN_A 95 as a second transmission and/or reception method change procedure and a third transmission and/or reception method change procedure.

1.3.3.1. Example of First Transmission and/or Reception Method Change Procedure

Figure 25:
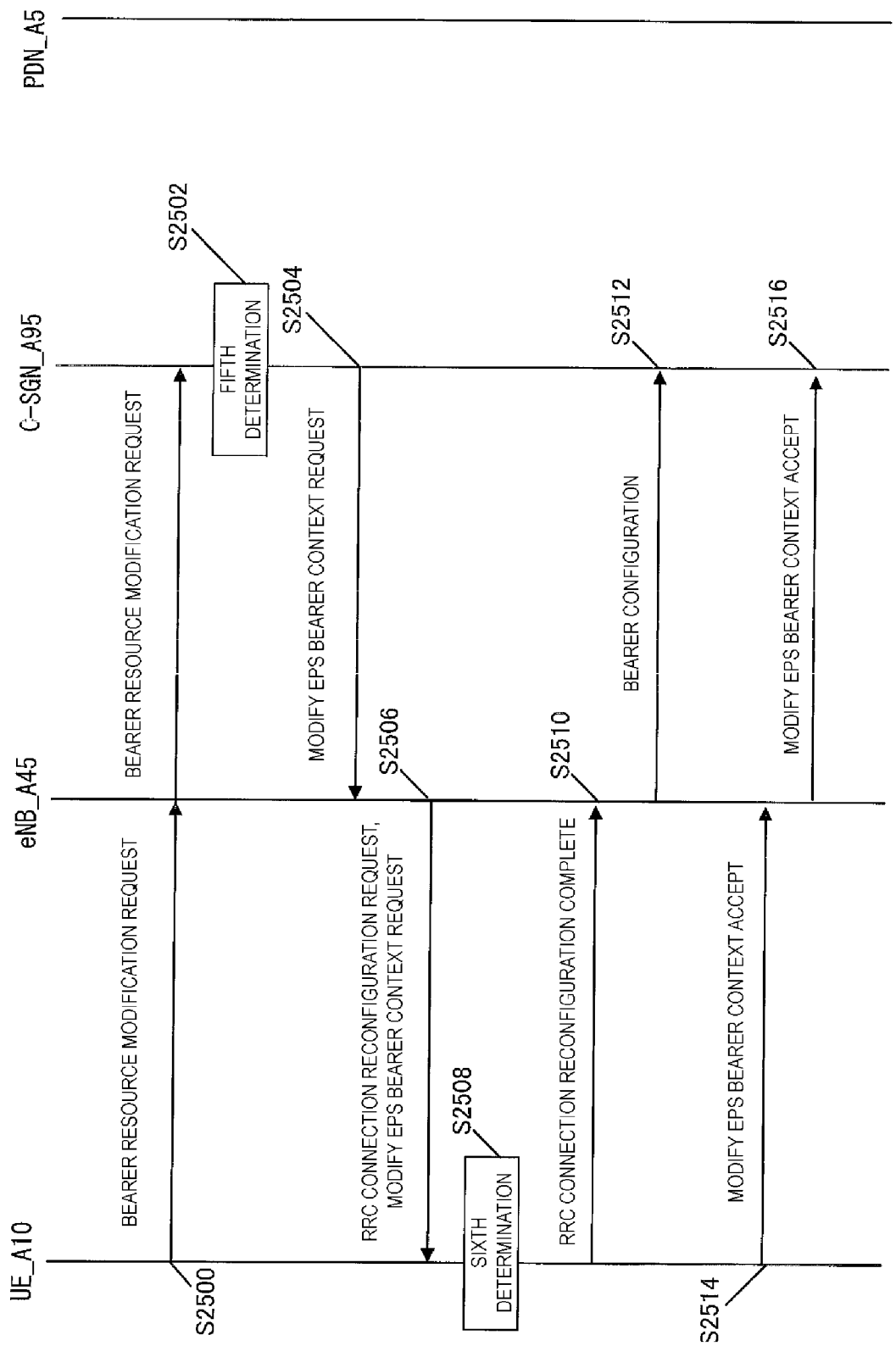
FIG. 25 is a diagram illustrating a first transmission and/or reception method change procedure.

The example of the steps of the first transmission and/or reception method change procedure will be described below using FIG. 25.

First, the UE_A 10 transmits a Bearer resource modification request message to the C-SGN_A 95 (S2500). Note that the UE_A 10 may transmit the Bearer resource modification request message to the eNB_A 45, and the transmitted Bearer resource modification request message may be transferred to the C-SGN_A 95 via the eNB_A 45.

The UE_A 10 may include at least one or more kinds of identification information among the seventeenth to twenty-second identification information in the Bearer resource modification request message. The UE_A 10 may transmit the Bearer resource modification request message including one or more kinds of identification information among the seventeenth to twenty-second identification information to request change of the user data transmission and/or reception method and/or a type of the user data transmission and/or reception method after the change.

The C-SGN_A 95 receives the Bearer resource modification request message. Furthermore, the C-SGN_A 95 acquires one or more kinds of identification information among the seventeenth to twenty-second identification information, based on the reception of the Bearer resource modification request message.

The C-SGN_A 95 may determine the user data transmission and/or reception method after the change for the UE_A 10 and/or the attach complete state to enter, based on the information included in the Bearer resource modification request message, subscriber information, and the identification information which the C-SGN_A 95 has.

For example, the C-SGN_A 95 may select and determine whether the user data transmission and/or reception method after the change is the method using the first transmission and/or reception procedure, or the method using the second transmission and/or reception procedure, based on one or more kinds of identification information among the first to twenty-second identification information. In other words, the C-SGN_A 95 may select and determine whether the attach complete state to enter is the first mode, or the third mode, based on one or more kinds of identification information among the first to twenty-second identification information. Hereinafter, the selection and determination process described above is referred to as a fifth determination and described (S2502).

For example, the C-SGN_A 95 may change the user data transmission and/or reception method into the method using the first transmission and/or reception procedure, or may enter the first mode, in a case that the C-SGN_A 95 holds the second identification information and/or the eighth identification information and/or the tenth identification information, and/or the Bearer resource modification request message includes the twenty-first identification information, and/or the eighteenth identification information and/or the twenty-second identification information indicate the method using the first transmission and/or reception procedure, and/or the nineteenth identification information indicates the SRB, and/or the twentieth identification information indicates the first mode.

Furthermore, the C-SGN_A 95 may change the user data transmission and/or reception method into the method using the second transmission and/or reception procedure, or may enter the third mode, in a case that the C-SGN_A 95 holds the third identification information and/or the ninth identification information and/or the eleventh identification information, and/or the Bearer resource modification request message includes the twenty-first identification information, and/or the eighteenth identification information and/or the twenty-second identification information indicate the method using the second transmission and/or reception procedure, and/or the nineteenth identification information indicates the DRB, and/or the twentieth identification information indicates the third mode.

The conditions for changing the user data transmission and/or reception methods and/or the conditions for entering the modes of the attach complete state are not limited to those described above.

The C-SGN_A 95 may identify the bearer for which the user data transmission and/or reception method is changed using the seventeenth identification information. Identification information of the bearer newly established by the transmission and/or reception method change procedure may be the same as the seventeenth identification information.

The C-SGN_A 95 transmits a Modify EPS bearer context request message to the eNB_A 45, based on the reception of the Bearer resource modification request message, and/or the fifth determination (S2504). Here, the Modify EPS bearer context request message may be a response message to the Bearer resource modification request message.

The C-SGN_A 95 may include at least one or more kinds of identification information among the twenty-sixth to thirty-third identification information in the Modify EPS bearer context request message.

The C-SGN_A 95 may modify and/or newly create one or more kinds of identification information among the twenty-sixth to thirty-third identification information, based on the fifth determination, and include the resulting identification information in the Modify EPS bearer context request message.

Specifically, the C-SGN_A 95 may include information indicating the determined new user data transmission and/or reception method in the twenty-seventh identification information and/or the thirty-second identification information and/or the thirty-third identification information, based on the fifth determination.

The C-SGN_A 95 may include information indicating a type of the determined new RB in the twenty-eighth identification information, based on the fifth determination.

The C-SGN_A 95 may include information indicating a determined mode of the attach complete state for the C-SGN_A 95 and/or the UE_A 10 to enter after the change in the twenty-ninth identification information, based on the fifth determination.

The C-SGN_A 95 may change the user data transmission and/or reception method, or may change the mode of the attach complete state, based on the reception of the Bearer resource modification request message, and/or the transmission of the Modify EPS bearer context request message, and/or the fifth determination.

To be more specific, the C-SGN_A 95 may change the user data transmission and/or reception method from the method using the first transmission and/or reception procedure into the method using the second transmission and/or reception procedure, and/or change from the method using the second transmission and/or reception procedure into the method using the first transmission and/or reception procedure, or may enter the third mode from the first mode, and/or enter the first mode from the third mode, based on the reception of the Bearer resource modification request message, and/or the transmission of the Modify EPS bearer context request message, and/or the fifth determination.

The eNB_A 45 receives the Modify EPS bearer context request message, and transmits an RRC message including the Modify EPS bearer context request message to the UE_A 10 (S2506). Note that the RRC message may be an RRC connection reconfiguration request message. The RRC message may be a Direct Transfer message.

The UE_A 10 receives the RRC message including the Modify EPS bearer context request message. Furthermore, in a case that one or more kinds of identification information among the twenty-sixth to thirty-third identification information are included in the Modify EPS bearer context request message, the UE_A 10 acquires each piece of identification information.

The UE_A 10 may recognize and determine the user data transmission and/or reception method after the change and/or the attach complete state to enter, based on the information included in the Modify EPS bearer context request message.

For example, the UE_A 10 may recognize and determine whether the user data transmission and/or reception method after the change is the method using the first transmission and/or reception procedure, or the method using the second transmission and/or reception procedure, based on one or more kinds of identification information among the twenty-sixth to thirty-third identification information. In other words, the UE_A 10 may recognize and determine whether the attach complete state to enter is the first mode, or the third mode, based on one or more kinds of identification information among the twenty-sixth to thirty-third identification information. Hereinafter, the recognition and determination process described above is referred to as a sixth determination and described (S2508).

For example, the UE_A 10 may recognize the user data transmission and/or reception method after the change as the method using the first transmission and/or reception procedure, or may recognize the entered attach complete state as the first mode, in a case that the Modify EPS bearer context request message includes the thirtieth identification information, and/or the twenty-seventh identification information and/or the thirty-second identification information and/or the thirty-third identification information indicate the method using the first transmission and/or reception procedure, and/or the twenty-eighth identification information indicates the SRB, and/or the twenty-ninth identification information indicates the first mode, and/or the twenty-sixth identification information is the identification information identifying the SRB and/or the CRB.

Furthermore, the UE_A 10 may recognize the user data transmission and/or reception method after the change as the method using the second transmission and/or reception procedure, or may recognize the entered attach complete state as the third mode, in a case that the Modify EPS bearer context request message includes the thirtieth identification information, and/or the twenty-seventh identification information and/or the thirty-second identification information and/or the thirty-third identification information indicate the method using the second transmission and/or reception procedure, and/or the twenty-eighth identification information indicates the DRB, and/or the twenty-ninth identification information indicates the second mode, and/or the twenty-sixth identification information is the identification information identifying the DRB.

The conditions for recognizing the user data transmission and/or reception methods after the change, and/or the conditions for recognizing the modes of the entered attach complete state are not limited to those described above.

In order to respond to the received RRC message, the UE_A 10 transmits an RRC message to the eNB_A 45 (S2510). The RRC message may be an RRC connection reconfiguration complete message.

The eNB_A 45 receives the RRC connection reconfiguration message, and transmits a bearer configuration message to the C-SGN_A 95, based on the reception (S2512).

The UE_A 10 transmits an RRC message including a Modify EPS bearer context accept message to the eNB_A 45, based on the reception of the Modify EPS bearer context request message (S2514). Here, the Modify EPS bearer context accept message may be a response message to the Modify EPS bearer context request message.

Note that the RRC message to be transmitted with including the Modify EPS bearer context accept message may be a Direct Transfer message.

The UE_A 10 may change the user data transmission and/or reception method, or may change the mode of the attach complete state, based on the reception of the Modify EPS bearer context request message, and/or the transmission of the Modify EPS bearer context accept message, and/or the sixth determination.

To be more specific, the UE_A 10 and/or the eNB_A 45 and/or the C-SGN_A 95 may change the user data transmission and/or reception method from the method using the first transmission and/or reception procedure into the method using the second transmission and/or reception procedure, and/or change from the method using the second transmission and/or reception procedure into the method using the first transmission and/or reception procedure, or may change the mode of the attach complete state from the first mode into the third mode, and/or change from the third mode into the first mode, based on the transmission and/or reception of the Modify EPS bearer context request message, and/or the transmission of the Modify EPS bearer context accept message, and/or the sixth determination.

The UE_A 10 and/or the eNB_A 45 may newly establish a DRB, based on the reception of the Modify EPS bearer context request message, and/or the transmission of the Modify EPS bearer context accept message, and/or the sixth determination.

To be more specific, the UE_A 10 and/or the eNB_A 45 may establish the DRB in a case that the user data transmission and/or reception method after the change is the method using the second transmission and/or reception procedure, and/or the attach complete state after the entering is the third mode.

The UE_A 10 and/or the eNB_A 45 may identify the type of the RB established as the Default Bearer, based on the twenty-sixth identification information.

For example, the UE_A 10 and/or the eNB_A 45 may recognize that the SRB and/or the CRB are established as the Default Bearer in the case that the twenty-sixth identification information is the identification information identifying the SRB and/or the CRB.

The UE_A 10 and/or the eNB_A 45 may recognize that the DRB is established as the Default Bearer in the case that the twenty-sixth identification information is the identification information identifying the DRB.

The eNB_45 receives the RRC message including the Modify EPS bearer context accept message, and transmits the Modify EPS bearer context accept message to the C-SGN_A 95 (S2516).

The C-SGN_A 95 receives the Modify EPS bearer context accept message.

By the above-described steps, the UE_A 10 and/or the C-SGN_A 95 change the user data transmission and/or reception method, and complete the first transmission and/or reception method change procedure. On the completion of the first transmission and/or reception method change procedure, the UE_A 10 and/or the C-SGN_A 95 may change the mode of the attach complete state.

Note that the UE_A 10 can newly acquire the UE contexts illustrated in FIGS. 21(*b*) to 21(*d*) from the core network_A 90 by the first transmission and/or reception method change procedure and store the contexts.

To be more specific, the UE_A 10 can newly acquire the UE context for each bearer among the UE contexts illustrated in FIGS. 21B to 21D from the core network_A 90 by the first transmission and/or reception method change procedure and store the context.

Furthermore, the C-SGN_A 95 can newly acquire each of the contexts A to E illustrated in FIG. 19 from the UE_A 10, the eNB_A 45, or the HSS_A 50 by the first transmission and/or reception method change procedure and store the context.

To be more specific, the C-SGN_A 95 can newly acquire the EPS bearer context for each bearer among the contexts A to E illustrated in FIG. 19 from the UE_A 10, the eNB_A 45, or the HSS_A 50 by the first transmission and/or reception method change procedure and store the context.

Figure 26:
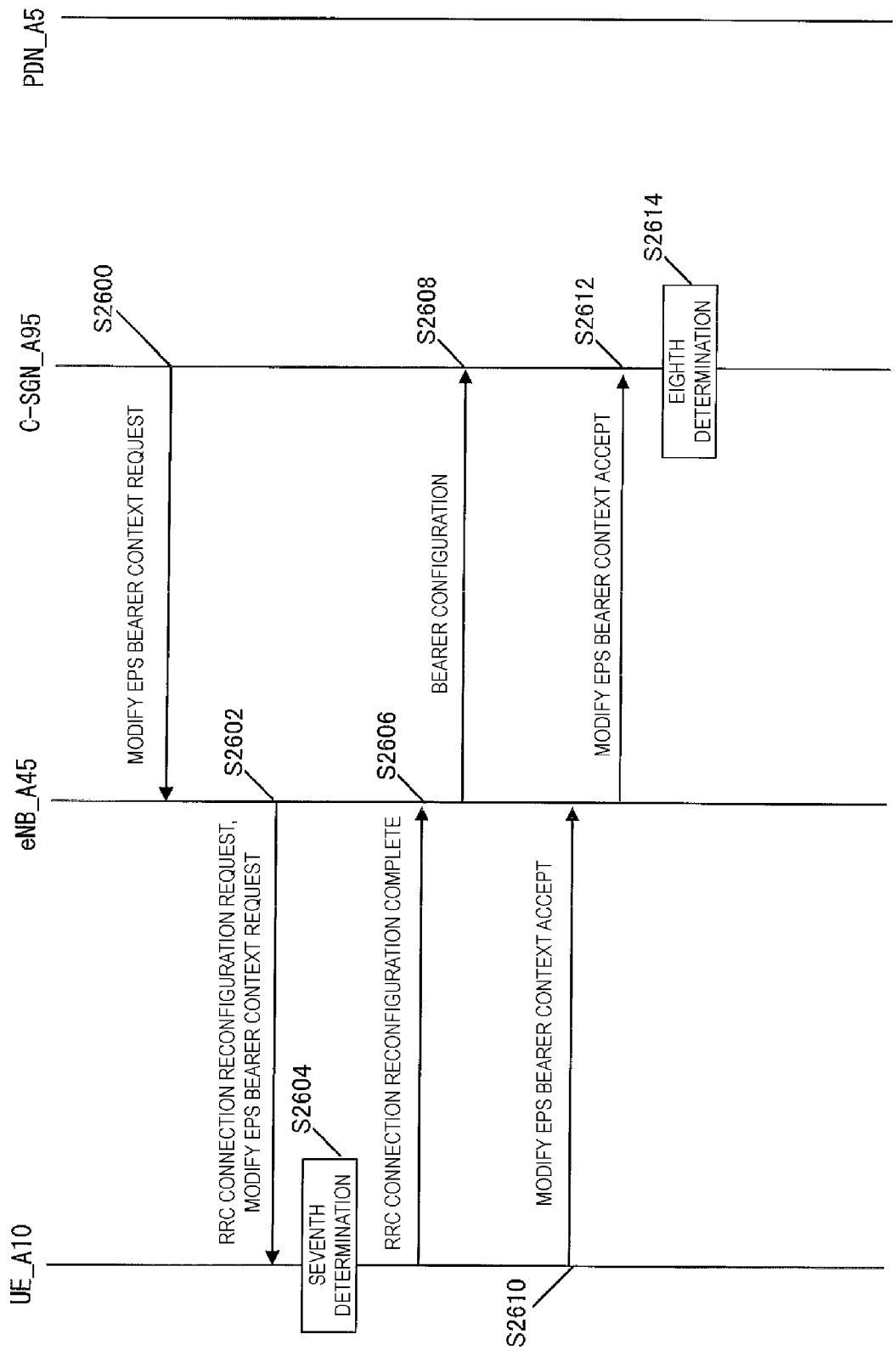
FIG. 26 is a diagram illustrating a second transmission and/or reception method change procedure.

1.3.3.2. Example of Second Transmission and/or Reception Method Change Procedure The example of the steps of a second transmission and/or reception method change procedure will be described below using FIG. 26.

First, the C-SGN_A 95 transmits a Modify EPS bearer context request message to the eNB_A 45 (S2600).

The C-SGN_A 95 may include at least one or more kinds of identification information among the seventeenth to twenty-third identification information in the Modify EPS bearer context request message.

The C-SGN_A 95 may transmit the Modify EPS bearer context request message including one or more kinds of identification information among the seventeenth to twenty-third identification information to request change of the user data transmission and/or reception method and/or a type of the user data transmission and/or reception method after the change.

The eNB_A 45 receives the Modify EPS bearer context request message, and transmits an RRC message including the Modify EPS bearer context request message to the UE_A 10 (S2602). Note that the RRC message may be an RRC connection reconfiguration request message. The RRC message may be a Direct Transfer message.

The UE_A 10 receives the RRC message including the Modify EPS bearer context request message. Furthermore, in a case that one or more kinds of identification information among the seventeenth to twenty-third identification information are included in the Modify EPS bearer context request message, the UE_A 10 acquires each piece of identification information.

The UE_A 10 may select and determine the user data transmission and/or reception method after the change and/or the attach complete state to enter, based on the information included in the Modify EPS bearer context request message and the identification information which the UE_A 10 has.

For example, the UE_A 10 may select and determine whether the user data transmission and/or reception method after the change is the method using the first transmission and/or reception procedure, or the method using the second transmission and/or reception procedure, based on one or more kinds of identification information among the first to twenty-third identification information. In other words, the UE_A 10 may select and determine whether the attach complete state to enter is the first mode, or the third mode, based on one or more kinds of identification information among the first to twenty-third identification information. Hereinafter, the selection and determination process described above is referred to as a seventh determination and described (S2604).

For example, the UE_A 10 may change the user data transmission and/or reception method into the method using the first transmission and/or reception procedure, or may enter the first mode, in a case that the UE_A 10 holds the second identification information and/or the eighth identification information and/or the tenth identification information, and/or the Modify EPS bearer context request message includes the twenty-first identification information, and/or the eighteenth identification information and/or the twenty-third identification information indicate the method using the first transmission and/or reception procedure, and/or the nineteenth identification information indicates the SRB, and/or the twentieth identification information indicates the first mode.

Furthermore, the UE_A 10 may change the user data transmission and/or reception method into the method using the second transmission and/or reception procedure, or may enter the third mode, in a case that the UE_A 10 holds the third identification information and/or the ninth identification information and/or the eleventh identification information, and/or the Modify EPS bearer context request message includes the twenty-first identification information, and/or the eighteenth identification information and/or the twenty-third identification information indicate the method using the second transmission and/or reception procedure, and/or the nineteenth identification information indicates the DRB, and/or the twentieth identification information indicates the third mode.

The conditions for changing the user data transmission and/or reception methods and/or the conditions for entering the modes of the attach complete state are not limited to those described above.

The UE_A 10 may identify the bearer for which the user data transmission and/or reception method is changed, by using the seventeenth identification information. Identification information of the bearer newly established by the transmission and/or reception method change procedure may be the same as the seventeenth identification information.

In order to respond to the received RRC message, the UE_A 10 transmits an RRC message to the eNB_A 45 (S2606). The RRC message may be an RRC connection reconfiguration complete message.

The eNB_A 45 receives the RRC connection reconfiguration message, and transmits a bearer configuration message to the C-SGN_A 95, based on the reception (S2608).

The UE_A 10 transmits an RRC message including a Modify EPS bearer context accept message to the eNB_A 45, based on the reception of the Modify EPS bearer context request message, and/or the seventh determination (S2610). Here, the Modify EPS bearer context accept message may be a response message to the Modify EPS bearer context request message.

Note that the RRC message to be transmitted with including the Modify EPS bearer context accept message may be a Direct Transfer message.

The UE_A 10 may include at least one or more kinds of identification information among the twenty-sixth to thirty-third identification information in the Modify EPS bearer context accept message.

The UE_A 10 may modify and/or newly create one or more kinds of identification information among the twenty-sixth to thirty-third identification information, based on the seventh determination, and include the resulting identification information in the Modify EPS bearer context accept message.

Specifically, the UE_A 10 may include information indicating the determined new user data transmission and/or reception method in the twenty-seventh identification information and/or the thirty-first identification information and/or the thirty-third identification information, based on the seventh determination in the massage.

The UE_A 10 may include information indicating a type of the determined new RB in the twenty-eighth identification information, based on the seventh determination.

The UE_A 10 may include information indicating a determined mode of the attach complete state for the UE_A 10 and/or the C-SGN_A 95 to enter after the change in the twenty-ninth identification information, based on the seventh determination.

The UE_A 10 may change the user data transmission and/or reception method, or may change the mode of the attach complete state, based on the reception of the Modify EPS bearer context request message, and/or the transmission of the Modify EPS bearer context accept message, and/or the seventh determination.

To be more specific, the UE_A 10 may change the user data transmission and/or reception method from the method using the first transmission and/or reception procedure into the method using the second transmission and/or reception procedure, and/or change from the method using the second transmission and/or reception procedure into the method using the first transmission and/or reception procedure, or may enter the third mode from the first mode, and/or enter the first mode from the third mode, based on the reception of the Modify EPS bearer context request message, and/or the transmission of the Modify EPS bearer context accept message, and/or the seventh determination.

The UE_A 10 and/or the eNB_A 45 may newly establish a DRB, based on the reception of the Modify EPS bearer context request message, and/or the transmission of the Modify EPS bearer context accept message, and/or the seventh determination.

To be more specific, the UE_A 10 and/or the eNB_A 45 may establish the DRB in a case that the user data transmission and/or reception method after the change is the method using the second transmission and/or reception procedure, and/or the attach complete state after the entering is the third mode.

The eNB_45 receives the RRC message including the Modify EPS bearer context accept message, and transmits the Modify EPS bearer context accept message to the C-SGN_A 95 (S2612).

The C-SGN_A 95 receives the Modify EPS bearer context accept message.

Furthermore, in a case that one or more kinds of identification information among the twenty-sixth to thirty-third identification information are included in the Modify EPS bearer context accept message, the UE_A 10 acquires each piece of identification information.

The C-SGN_A 95 may recognize and determine the user data transmission and/or reception method after the change and/or the attach complete state to enter, based on the information included in the Modify EPS bearer context accept message.

For example, the C-SGN_A 95 may recognize and determine whether the user data transmission and/or reception method after the change is the method using the first transmission and/or reception procedure, or the method using the second transmission and/or reception procedure, based on one or more kinds of identification information among the twenty-sixth to thirty-third identification information. In other words, the C-SGN_A 95 may recognize and determine whether the attach complete state to enter is the first mode, or the third mode, based on one or more kinds of identification information among the twenty-sixth to thirty-third identification information. Hereinafter, the recognition and determination process described above is referred to as an eighth determination and described (S2614).

For example, the C-SGN_A 95 may recognize the user data transmission and/or reception method after the change as the method using the first transmission and/or reception procedure, or may recognize the entered attach complete state as the first mode, in a case that the Modify EPS bearer context accept message includes the thirtieth identification information, and/or the twenty-seventh identification information and/or the thirty-first identification information and/or the thirty-third identification information indicate the method using the first transmission and/or reception procedure, and/or the twenty-eighth identification information indicates the SRB, and/or the twenty-ninth identification information indicates the first mode, and/or the twenty-sixth identification information is the identification information identifying the SRB and/or the CRB.

Furthermore, the C-SGN_A 95 may recognize the user data transmission and/or reception method after the change as the method using the second transmission and/or reception procedure, or may recognize the entered attach complete state as the third mode, in a case that the Modify EPS bearer context accept message includes the thirtieth identification information, and/or the twenty-seventh identification information and/or the thirty-first identification information and/or the thirty-third identification information indicate the method using the second transmission and/or reception procedure, and/or the twenty-eighth identification information indicates the DRB, and/or the twenty-ninth identification information indicates the second mode, and/or the twenty-sixth identification information is the identification information identifying the DRB.

The conditions for recognizing the user data transmission and/or reception methods after the change, and/or the conditions for recognizing the modes of the entered attach complete state are not limited to those described above.

The C-SGN_A 95 may change the user data transmission and/or reception method, or may change the mode of the attach complete state, based on the reception of the Modify EPS bearer context accept message, and/or the eighth determination.

To be more specific, the UE_A 10 and/or the eNB_A 45 and/or the C-SGN_A 95 may change the user data transmission and/or reception method from the method using the first transmission and/or reception procedure into the method using the second transmission and/or reception procedure, and/or change from the method using the second transmission and/or reception procedure into the method using the first transmission and/or reception procedure, or may change the mode of the attach complete state from the first mode into the third mode, and/or change from the third mode into the first mode, based on the transmission and/or reception of the Modify EPS bearer context accept message, and/or the eighth determination.

The UE_A 10 and/or the eNB_A 45 may identify the type of the RB established as the Default Bearer, based on the twenty-sixth identification information.

For example, the UE_A 10 and/or the eNB_A 45 may recognize that the SRB and/or the CRB are established as the Default Bearer in the case that the twenty-sixth identification information is the identification information identifying the SRB and/or the CRB.

The UE_A 10 and/or the eNB_A 45 may recognize that the DRB is established as the Default Bearer in the case that the twenty-sixth identification information is the identification information identifying the DRB.

By the above-described steps, the UE_A 10 and/or the C-SGN_A 95 change the user data transmission and/or reception method, and complete the second transmission and/or reception method change procedure. On the completion of the second transmission and/or reception method change procedure, the UE_A 10 and/or the C-SGN_A 95 may change the mode of the attach complete state.

Note that the UE_A 10 can newly acquire the UE contexts illustrated in FIGS. 21(b) to 21(d) from the core network_A 90 by the second transmission and/or reception method change procedure and store the contexts.

To be more specific, the UE_A 10 can newly acquire the UE context for each bearer among the UE contexts illustrated in FIGS. 21(b) to 21(d) from the core network_A 90 by the second transmission and/or reception method change procedure and store the context.

Furthermore, the C-SGN_A 95 can newly acquire each of the contexts A to E illustrated in FIG. 19 from the UE_A 10, the eNB_A 45, or the HSS_A 50 by the second transmission and/or reception method change procedure and store the context.

To be more specific, the C-SGN_A 95 can newly acquire the EPS bearer context for each bearer among the contexts A to E illustrated in FIG. 19 from the UE_A 10, the eNB_A 45, or the HSS_A 50 by the second transmission and/or reception method change procedure and store the context.

1.3.3.3. Example of Third Transmission and/or Reception Method Change Procedure

Figure 27:
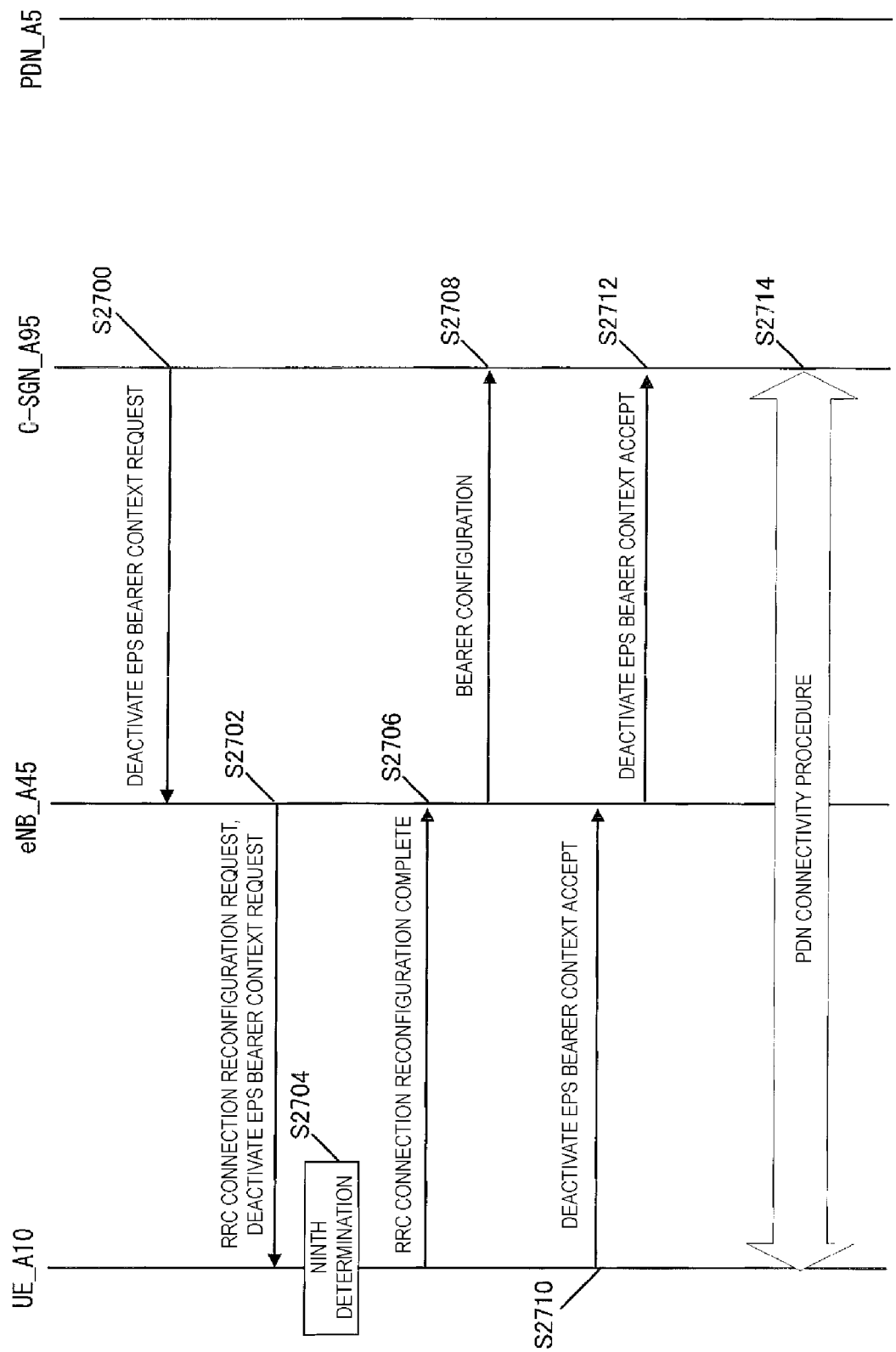
FIG. 27 is a diagram illustrating a third transmission and/or reception method change procedure.

The example of the steps of a third transmission and/or reception method change procedure will be described below using FIG. 27.

First, the C-SGN_A 95 transmits a Deactivate EPS bearer context request message to the eNB_A 45 (S2700).

The C-SGN_A 95 may include at least one or more kinds of identification information among the seventeenth to twenty-fifth identification information in the Deactivate EPS bearer context request message.

The C-SGN_A 95 may transmit the Deactivate EPS bearer context request message including one or more kinds of identification information among the seventeenth to twenty-fifth identification information to request change of the user data transmission and/or reception method and/or a type of the user data transmission and/or reception method after the change.

In other words, the C-SGN_A 95 may transmit the Deactivate EPS bearer context request message including one or more kinds of identification information among the seventeenth to twenty-fifth identification information to request re-establishment of the PDN connection and/or Default Bearer, and/or a type of the user data transmission and/or reception method after the re-establishment.

The eNB_A 45 receives the Deactivate EPS bearer context request message, and transmits an RRC message including the Deactivate EPS bearer context request message to the UE_A 10 (S2702). Note that the RRC message may be an RRC connection reconfiguration request message. The RRC message may be a Direct Transfer message.

The UE_A 10 receives the RRC message including the Deactivate EPS bearer context request message. Furthermore, in a case that one or more kinds of identification information among the seventeenth to twenty-fifth identification information are included in the Deactivate EPS bearer context request message, the UE_A 10 acquires each piece of identification information.

The UE_A 10 may select and determine whether the re-establishment of the PDN connection and/or Default Bearer is necessary, and/or the user data transmission and/or reception method after the re-establishment, and/or the attach complete state to enter, based on the information included in the Deactivate EPS bearer context request message and/or the identification information which the UE_A 10 has.

For example, the UE_A 10 may select and determine whether the re-establishment of the PDN connection and/or Default Bearer is necessary, and/or whether the user data transmission and/or reception method after the re-establishment is the method using the first transmission and/or reception procedure, or the method using the second transmission and/or reception procedure, based on one or more kinds of identification information among the first to twenty-fifth identification information. In other words, the UE_A 10 may select and determine whether the attach complete state to enter is the first mode and/or the second mode or the third mode and/or the fourth mode, based on one or more kinds of identification information among the first to twenty-fifth identification information. Hereinafter, the selection and determination process described above is referred to as a ninth determination and described (S2704).

For example, the UE_A 10 may establish, after disconnecting the established PDN connection and/or Default Bearer, the PDN connection and/or Default Bearer for transmitting and/or receiving the user data in the method using the first transmission and/or reception procedure, in a case that the UE_A 10 holds the second identification information and/or the eighth identification information and/or the tenth identification information, and/or the Deactivate EPS bearer context request message includes the twenty-first identification information and/or the twenty-fourth identification information and/or the twenty-fifth identification information, and/or the eighteenth identification information and/or the twenty-third identification information indicates the method using the first transmission and/or reception procedure, and/or the nineteenth identification information indicates the SRB, and/or the twentieth identification information indicates the first mode.

In other words, in this case, the UE_A 10 may disconnect the established PDN connection and/or Default Bearer to enter the second mode, and thereafter, may perform the PDN connectivity procedure to enter the first mode.

Furthermore, the UE_A 11 may establish, after disconnecting the established PDN connection and/or Default Bearer, the PDN connection and/or Default Bearer for transmitting and/or receiving the user data in the method using the second transmission and/or reception procedure, in a case that the UE_A 10 holds the third identification information and/or the ninth identification information and/or the eleventh identification information, and/or the Deactivate EPS bearer context request message includes the twenty-first identification information and/or the twenty-fourth identification information and/or the twenty-fifth identification information, and/or the eighteenth identification information and/or the twenty-third identification information indicates the method using the second transmission and/or reception procedure, and/or the nineteenth identification information indicates the DRB, and/or the twentieth identification information indicates the third mode.

In other words, in this case, the UE_A 10 may disconnect the established PDN connection and/or Default Bearer to enter the fourth mode, and thereafter, may perform the PDN connectivity procedure to enter the third mode.

The conditions for re-establishing the PDN connection and/or the Default Bearer, and/or the conditions for changing the user data transmission and/or reception methods, and/or the conditions for entering the modes of the attach complete state are not limited to those described above.

The UE_A 10 may identify the bearer for which the user data transmission and/or reception method is changed, by using the seventeenth identification information. In other words, the UE_A 10 may identify the bearer to disconnect and/or re-establish, by using the seventeenth identification information.

Identification information of the bearer established by the new PDN connectivity procedure may be the same as the seventeenth identification information.

In order to respond to the received RRC message, the UE_A 10 transmits an RRC message to the eNB_A 45 (S2706). The RRC message may be an RRC connection reconfiguration complete message.

The eNB_A 45 receives the RRC connection reconfiguration message, and transmits a bearer configuration message to the C-SGN_A 95 based on the reception (S2708).

The UE_A 10 transmits an RRC message including a Deactivate EPS bearer context accept message to the eNB_A 45, based on the reception of the Deactivate EPS bearer context request message, and/or the ninth determination (S2710). Here, the Deactivate EPS bearer context accept message may be a response message to the Deactivate EPS bearer context request message.

Note that the RRC message to be transmitted with including the Deactivate EPS bearer context accept message may be a Direct Transfer message.

The UE_A 10 may include at least the twenty-sixth identification information in the Deactivate EPS bearer context accept message.

The UE_A 10 may change the mode of the attach complete state, based on the reception of the Deactivate EPS bearer context request message, and/or the transmission of the Deactivate EPS bearer context accept message, and/or the ninth determination.

To be more specific, the UE_A 10 may enter the third mode from the first mode, and/or enter the first mode from the third mode, based on the reception of the Deactivate EPS bearer context request message, and/or the transmission of the Deactivate EPS bearer context accept message, and/or the ninth determination.

The eNB_45 receives the RRC message including the Deactivate EPS bearer context accept message, and transmits the Deactivate EPS bearer context accept message to the C-SGN_A 95 (S2712).

The C-SGN_A 95 receives the Deactivate EPS bearer context accept message.

Furthermore, in a case that the twenty-sixth identification information is included in the Deactivate EPS bearer context accept message, the UE_A 10 acquires the twenty-sixth identification information.

The C-SGN_A 95 may change the mode of the attach complete state, based on the reception of the Deactivate EPS bearer context accept message, and/or the ninth determination.

To be more specific, the C-SGN_A 95 may enter the fourth mode from the first mode, and/or enter the second mode from the third mode, based on the reception of the Deactivate EPS bearer context accept message, and/or the ninth determination.

The UE_A 10 may transmit the PDN connectivity request message to the C-SGN_A 95, based on the reception of the Deactivate EPS bearer context request message, and/or the transmission of the Deactivate EPS bearer context accept message, and/or the ninth determination. Note that the UE_A 10 may transmit the PDN connectivity request message to the eNB_A 45, and the transmitted PDN connectivity request message may be transferred to the C-SGN_A 95 via the eNB 45.

The UE_A 10 may transmit the PDN connectivity request message including one or more kinds of identification information among the first to fifth identification information, based on the ninth determination, to request a type of the PDN connection to establish, and/or a mode of the attach complete state to enter, and/or a type of the user data transmission and/or reception method.

As describe above, the UE_A 10 may perform a PDN connectivity procedure for re-establishing the PDN connection and/or the Default Bearer, based on the reception of the Deactivate EPS bearer context request message, and/or the transmission of the Deactivate EPS bearer context accept message, and/or the ninth determination (S2714).

The PDN connectivity procedure for re-establishing the PDN connection and/or the Default Bearer may be the same as the procedure described in the section 1.3.2., and therefore detailed description thereof will be omitted.

The UE_A 10 and/or the C-SGN_A 95 may change the user data transmission and/or reception method, or may change the mode of the attach complete state, based on the transmission and/or reception of the Deactivate EPS bearer context accept message, and/or the ninth determination, and/or the completion of the PDN connectivity procedure.

To be more specific, the UE_A 10 and/or the eNB_A 45 and/or the C-SGN_A 95 may change the user data transmission and/or reception method from the method using the first transmission and/or reception procedure into the method using the second transmission and/or reception procedure, and/or change from the method using the second transmission and/or reception procedure into the method using the first transmission and/or reception procedure, or may change the mode of the attach complete state from the first mode and/or the second mode and/or the fourth mode into the third mode, and/or change from the fourth mode and/or the third mode and/or the second mode into the first mode, based on the transmission and/or reception of the Deactivate EPS bearer context accept message, and/or the ninth determination, and/or the completion of the PDN connectivity procedure.

The UE_A 10 and/or the eNB_A 45 may identify the type of the RB established as the Default Bearer, based on the sixteenth identification information.

For example, the UE_A 10 and/or the eNB_A 45 may recognize that the SRB and/or the CRB are established as the Default Bearer in the case that the sixteenth identification information is the identification information identifying the SRB and/or the CRB.

The UE_A 10 and/or the eNB_A 45 may recognize that the DRB is established as the Default Bearer in the case that the sixteenth identification information is the identification information identifying the DRB.

By the above-described steps, the UE_A 10 and/or the C-SGN_A 95 change the user data transmission and/or reception method, and complete the third transmission and/or reception method change procedure. On the completion of the third transmission and/or reception method change procedure, the UE_A 10 and/or the C-SGN_A 95 may change the mode of the attach complete state.

Note that the UE_A 10 can newly acquire the UE contexts illustrated in FIGS. 21(b) to 21(d) from the core network_A 90 by the third transmission and/or reception method change procedure and store the contexts.

To be more specific, the UE_A 10 can newly acquire the UE context for each bearer among the UE contexts illustrated in FIGS. 21(b) to 21(d) from the core network_A 90 by the third transmission and/or reception method change procedure and store the context.

Furthermore, the C-SGN_A 95 can newly acquire each of the contexts A to E illustrated in FIG. 19 from the UE_A 10, the eNB_A 45, or the HSS_A 50 by the third transmission and/or reception method change procedure and store the context.

To be more specific, the C-SGN_A 95 can newly acquire the EPS bearer context for each bearer among the contexts A to E illustrated in FIG. 19 from the UE_A 10, the eNB_A 45, or the HSS_A 50 by the third transmission and/or reception method procedure and store the context.

1.3.3.4. Modification Example of Transmission and/or Reception Method Change Procedure Although the transmission and/or reception method change procedure is described in a case that the core network_A 90 in the transmission and/or reception method change procedure example described above is a core network configured by including the C-SGN_A 95 described using FIGS. 3A and 3B, the core network_A 90 may be a core network configured by including the PGW_A 30, the SGW_A 35, the MME_A 40, or the like as described using FIGS. 2A and 2B.

In this case, the NAS message such as the Bearer resource modification request message, the Modify EPS bearer context accept message, the Deactivate EPS bearer context accept message transmitted by the UE_A 10 described in this procedure is received by the MME 45, not by the C-SGN_A 95.

Accordingly, the reception and processes of the NAS message by the C-SGN_A 95 in the above description can be replaced with those performed by the MME_A 40.

Furthermore, the transmission and processes of the NAS message such as the Modify EPS bearer context request message, the Deactivate EPS bearer context request message by the C-SGN_A 95 in the above description can be replaced with those performed by the MME_A 40.

1.3.4. Example of UL User Data Transmission and/or Reception Procedure

Next, steps in which the UE_A 10 which connects to the network transmits UL user data will be described.

Hereinafter, transmission steps of the UL user data will be described.

The UE_A 10 transmits a first message to the eNB_A 45. The first message is a message for requesting at least transmission timing information and resource assignment information, and the UE_A 10 transmits the first message at least including a randomly selected preamble to the eNB_A 45.

Note that the first message is a control signal of a Physical layer, may be a Random Access Channel (RACH) Preamble message of Message 1. The first message may be transmitted using a Physical Random Access Channel (PRACH).

The eNB_A 45 receives the first message, and transmits a second message to the UE_A 10 as a response to the first message. The second message is transmitted with including at least the transmission timing information and the resource assignment information. To be more specific, the transmission timing information may be a Timing Advance, and the resource assignment information may be a UL Grant. The second message is a control signal in a Media Access Control (MAC) layer, and may be transmitted using a Medium Access Control Random Access Response (MAC RAR).

Note that the second message may be a RACH Response message of Message 2.

A communication procedure after the UE_A 10 receives the second message can branch into a first transmission and/or reception procedure example, a second transmission and/or reception procedure example, a third transmission and/or reception procedure example, which will be described later.

The UE_A 10 may branch the communication procedure into the first transmission and/or reception procedure example and/or the second transmission and/or reception procedure example and/or the third transmission and/or reception procedure example, based on the second and/or fourth determination.

1.3.4.1. Description of First Transmission and/or Reception Procedure Example

The first transmission and/or reception procedure example is a procedure in which the UE_A 10 transmits and/or receives the user data without establishing the DRB. In other words, the first transmission and/or reception procedure example is a procedure for transmitting the user data by use of a radio bearer for transmitting and/or receiving the control message.

In other words, the first transmission and/or reception procedure example is a procedure for the UE_A 10 and the C-SGN_A 95 to transmit and/or receive the user data by use of an EPS bearer including the SRB. Furthermore, in other words, the first transmission and/or reception procedure example is a procedure in which the UE_A 10 transmits and/or receives the user data by use of the SRB.

Figure 28:
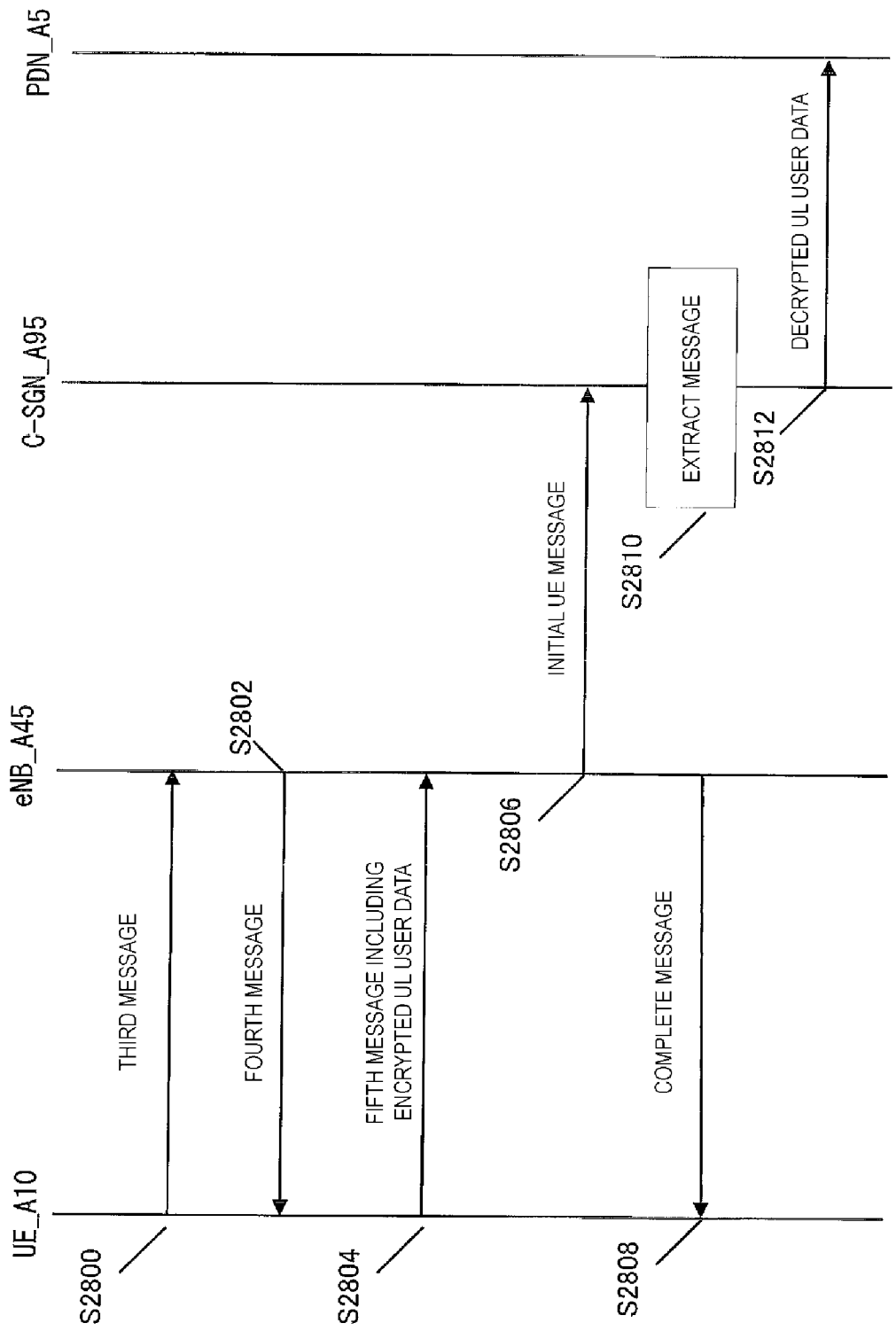
FIG. 28 is a diagram illustrating a first transmission and/or reception procedure.

Hereinafter, the first transmission and/or reception procedure example will be described in detail using FIG. 28.

The UE_A 10 transmits a third message to the eNB_A 45, based on the reception of the second message from the eNB_A 45 (S2800).

The eNB_A 45 receives the third message transmitted by the UE_A 10. The eNB_A 45 transmits a fourth message to the UE_A 10, based on the reception of the third message (S2802).

The UE_A 10 transmits the fourth message transmitted by the eNB_A 45. The UE_A 10 transmits a fifth message to the eNB_A 45, based on the reception of the fourth message (S2804).

The UE_A 10 may transmit the NAS message including the UL user data with being included in the third message and/or the fifth message. Note that the UE_A 10 may encrypt and transmit the UL user data or the NAS message including the UL user data.

The eNB_A 45 receives the NAS message including the UL user data, based on the reception of the third message and/or fifth message.

The eNB_A 45 may transmit an Initial UE message of an S1 Application Protocol (S1AP) to the C-SGN_A 95, based on the reception of the NAS message including the UL user data (S2806).

The eNB_A 45 may transmit the Initial UE message of the S1AP including at least the NAS message including the UL user data.

The eNB_A 45 may transmit a completion message to the UE_A 10, based on the reception of the third message and/or the fifth message, and/or the transmission of the Initial UE message of the S1AP (S2808).

The UE_A 10 receives the completion message transmitted by the eNB_A 45.

The C-SGN_A 95 receives the Initial UE message of the S1AP transmitted by the eNB_A 45, and/or the NAS message including the UL user data included in the Initial UE message of the S1AP.

The C-SGN_A 95 decodes the received NAS message, and/or extracts the user data included in the received NAS message, based on the reception of the NAS message including the UL user data included in the Initial UE message of the S1AP (S2810). The C-SGN_A 95 may decode the extracted user data, as needed.

The C-SGN_A 95 transmits the user data to the PDN_A 5, based on the extraction and/or decode of the user data included in the NAS message (S2812). The C-SGN_A 95 may decode the user data and then transmit the decoded user data to the PDN_A 5.

By the above-described procedures, the UE_A 10 can transmit a small data packet being the UL user data to the PDN_A 5 without establishing the DRB. Furthermore, after the completion of the first transmission and/or reception procedure example, the UE_A 10 can enter the idle state, or maintain the idle state.

In a case that a size of the user data to be transmitted and/or received is large, the UE_A 10 and/or the C-SGN_A 95 may not transmit and/or receive the user data by the first transmission and/or reception procedure, but may transmit the user data by use of the second transmission and/or reception procedure.

1.3.4.2. Description of Second Transmission and/or Reception Procedure Example

The second transmission and/or reception procedure example is a procedure in which the UE_A 10 transmits and/or receives the user data after establishing the DRB.

In other words, the second transmission and/or reception procedure example is a procedure for the UE_A 10 and the C-SGN_A 95 to transmit and/or receive the user data by use of an EPS bearer including the DRB. Furthermore, in other words, the second transmission and/or reception procedure example is a procedure in which the UE_A 10 transmits and/or receives the user data by use of the DRB.

Hereinafter, the second transmission and/or reception procedure example will be described in detail using FIG. 5.

The UE_A 10 transmits a third message to the eNB_A 45, based on the reception of the second message from the eNB_A 45 (S2900).

The UE_A 10 may transmit the third message including at least the NAS message and/or a Resume ID.

The NAS message may be a message for re-establishing the DRB.

The Resume ID may be identification information identifying the DRB to re-establish. And/or, the Resume ID may be identification information identifying a context corresponding to the DRB to re-establish which is held by the eNB_A 45. And/or, the Resume ID may be identification information indicating that a CIoT terminal in an active state is to be put in the idle state. And/or, the Resume ID may be identification information indicating that a CIoT terminal in the idle state is to be put in the active state.

For example, the eNB_A 45 may transmit the Resume ID to the UE_A 10 to enter the idle state from the active state. Moreover, the UE_A 10 may receive the Resume ID from the eNB_A 45 to enter the idle state from the active state.

The UE_A 10 may transmit the received Resume ID to the eNB_A 45 to enter the active state from the idle state. Moreover, the eNB_A 45 may receive the Resume ID from the UE_A 10 to enter the active state from the idle state.

By using the same Resume ID as the Resume ID transmitted and/or received for entering the idle state from the active state and the Resume ID transmitted and/or received for entering the active state from the idle state, the context used in the previous active state can be identified, and the UE_A 10 and the eNB_A 45 can return to the same communication state as in the previous active state to re-establish the DRB based on the identified context, or the like.

In this way, the UE_A 10 and the eNB_A 45 can transit between the active state and idle state, based on the Resume ID. The eNB_A 45 receives the third message transmitted by the UE_A 10. The eNB_A 45 receives the NAS message and/or the Resume ID, based on the reception of the third message.

The eNB_A 45 re-establishes the DRB identified by the Resume ID, based on the reception of the Resume ID included in the third message.

The eNB_A 45 transmits a fourth message to the UE_A 10, based on the reception of the third message and/or the re-establishment of the DRB identified by the Resume ID (S2902).

The eNB_A 45 may transmit the fourth message including at least the Resume ID for identifying the re-established DRB.

The eNB_A 45 makes the state of the eNB_A 45 enter the active mode, based on the reception of the third message, and/or the reception of the NAS message, and/or the re-establishment of the DRB identified by the Resume ID, and/or the transmission of the fourth message.

The eNB_A 45 transmits a UE context activation message of the S1 Application Protocol (S1AP) to the C-SGN_A 95, based on the reception of the third message, and/or the reception of the NAS message, and/or the re-establishment of the DRB identified by the Resume ID, and/or the transmission of the fourth message, and/or change of the state of the eNB_A 45 into the active mode (S2904). The eNB_A 45 may transmit the UE context activation message of the S1AP including the NAS message.

The C-SGN_A 95 receives the UE context activation message of the S1AP. The C-SGN_A 95 makes the state of the C-SGN_A 95 enter the active mode, based on the reception of the UE context activation message of the S1AP. The C-SGN_A 95 transmits a UE context activation response message of the S1AP to the eNB_A 45, based on the reception of the UE context activation message of the S1AP, and/or the reception of the NAS message, and/or change of the state of the C-SGN_A 95 into the active mode (S2906).

The UE_A 10 receives the fourth message transmitted by the eNB_A 45. The UE_A 10 makes the state of the UE_A 10 enter the active mode, based on the reception of the fourth message, and/or the reception of the Resume ID for identifying the re-established DRB included in the fourth message.

The UE_A 10 transmits the UL user data to the PDN_A 5 via the eNB_A 45 and/or the C-SGN_A 95, based on the reception of the fourth message, and/or the reception of the Resume ID for identifying the re-established DRB included in the fourth message, and/or change of the state of the UE_A 10 into the active mode (S2908) (S2910) (S2912).

The UE_A 10 continues to transmit the UL user data to the PDN_A 5 via the eNB_A 45 and/or the C-SGN_A 95 so long as the UL user data to be transmitted is present. Presence or absence of the data to be transmitted may be determined from a data residual amount of the buffer which accumulates the UL user data to be transmitted or the like.

By the above-described procedures, the UE_A 10 can transmit the UL user data. Furthermore, the UE_A 10 can also receive DownLink (DL) user data using the above-described procedures. Note that the DL user data can be transmitted from the PDN_A 5, and can be received via the C-SGN_A 95 and the eNB_A 45.

The eNB_A 45 transfers the UL user data received from the UE_A 10 to the C-SGN_A 95.

Figure 5:
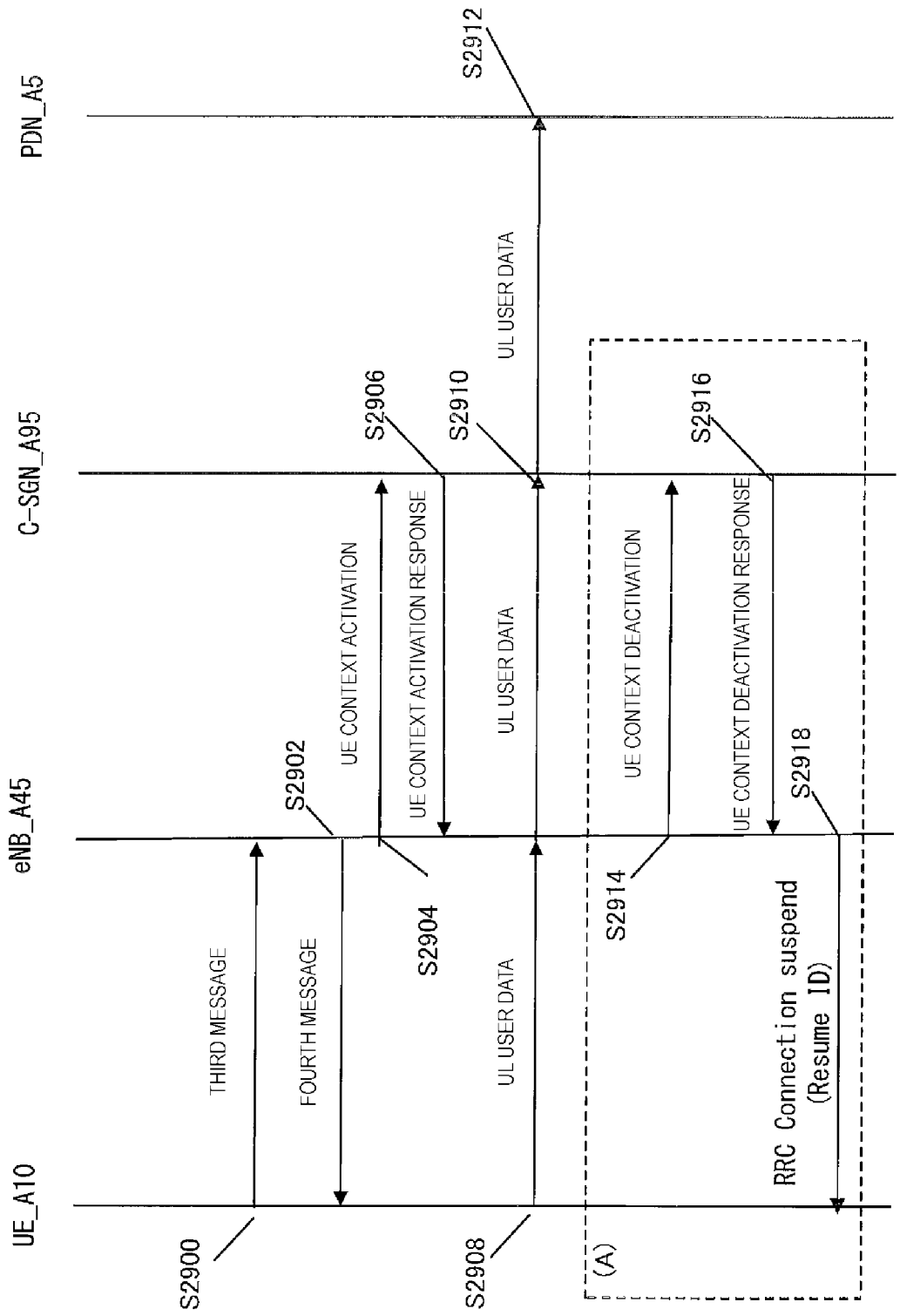
FIG. 5 is a diagram illustrating a second transmission and/or reception procedure.

In a case that the eNB_A 45 detects no reception of the UL user data for a certain time period, the eNB_A 45 starts a procedure for making the states of the UE_A 10 and/or the eNB_A 45 and/or the C-SGN_A 95 enter the idle mode as illustrated in (A) of FIG. 5. In other words, the eNB_A 45 dose not perform the procedure as illustrated in (A) of FIG. 5 so long as the eNB_A 45 continues to receive the UL user data.

The eNB_A 45 transmits a UE context deactivation message of the S1AP to the C-SGN_A 95, based on the detection of no reception of the UL user data for a certain time period (S2914).

The C-SGN_A 95 receives the UE context deactivation message of the S1AP. The C-SGN_A 95 makes the state of the C-SGN_A 95 enter the idle mode, based on the reception of the UE context deactivation message of the S1AP. The C-SGN_A 95 transmits the UE context deactivation response message of the S1AP to the eNB_A 45, based on the reception of the UE context deactivation message of the S1AP and/or change of the state of the C-SGN_A 95 into the idle mode (S2916).

The eNB_A 45 transmits an RRC Connection Suspend message to the UE_A 10, based on the transmission of the UE context deactivation message and/or the reception of the UE context deactivation response (S2918).

The eNB_A 45 may transmit the RRC Connection Suspend message including at least the Resume ID.

Here, the Resume ID may be identification information identifying the DRB to disconnect. To be more specific, the Resume ID may be identification information identifying the context corresponding to the DRB to disconnect which is held by the UE_A 10 and/or the eNB_A 45.

The eNB_A 45 disconnects the DRB identified by the Resume ID, based on the transmission of the RRC Connection Suspend message including the Resume ID. The eNB_A 45 performs the disconnection of the DRB identified by the Resume ID, but may continue to keep the context corresponding to the disconnected DRB without deleting the context.

The eNB_A 45 makes the state of the eNB_A 45 enter the idle mode, based on the disconnection of the DRB identified by the Resume ID.

The UE_A 10 receives the RRC Connection Suspend message transmitted by the eNB_A 45.

The UE_A 10 disconnects the DRB identified by the Resume ID, based on the reception of the RRC Connection Suspend message and/or the reception of Resume ID included in the RRC Connection Suspend message. The UE_A 10 performs the disconnection of the DRB identified by the Resume ID, but may continue to keep the context corresponding to the disconnected DRB without deleting the context.

The UE_A 10 makes the state of the UE_A 10 enter the idle mode, based on the disconnection of the DRB identified by the Resume ID.

By the above-described procedures, the UE_A 10 and/or the eNB_A 45 and/or the C-SGN_A 95 can disconnect the DRB to enter the idle mode while keeping the contexts of UE_A 10 and/or the eNB_A 45.

1.3.4.3. Description of Third Transmission and/or Reception Procedure Example

The third transmission and/or reception procedure example is a transmission and/or reception procedure of the related art.

The third transmission and/or reception procedure example is a procedure in which the UE_A 10 transmits and/or receives the user data after establishing the DRB.

The third transmission and/or reception procedure may be the same procedure as the second transmission and/or reception procedure. Therefore, detailed description of the procedure will be omitted here.

However, in the case of the third transmission and/or reception procedure, the UE_A 10 may transmit a fifth message including the NAS message without including the NAS message and/or Resume ID in the third message.

Furthermore, the message of the S1AP transmitted and/or received between the eNB_A 45 and the C-SGN_A 95 is not limited to the UE context activation message and/or the UE context activation response message and may be those transmitting and/or receiving the NAS message.

The UE_A 10 may transmit the UL user data, based on reception of a response message to the fifth message.

In the case of the third transmission and/or reception procedure, the UE_A 10 and/or the eNB_A 45 and/or the C-SGN_A 95 may create a new context to establish the DRB or enter the active state, without using the context used in the previous active state.

The UE_A 10 and/or the eNB_A 45 and/or the C-SGN_A 95 may transmit and/or receive the UE context deactivation message and/or RRC connection deactivation message not including the Resume ID.

The UE_A 10 and/or the eNB_A 45 and/or the C-SGN_A 95 may transmit and/or receive the UE context deactivation message and/or RRC connection deactivation message not including the Resume ID to enter the idle mode as in the related art.

1.3.4.4. Modification Example of UL User Data Transmission and/or Reception Procedure Although the attach procedure is described in a case that the core network_A 90 in the UL user data transmission and/or reception procedure example described above is a core network configured by including the C-SGN_A 95 described using FIGS. 3A and 3B, the core network_A 90 may be a core network configured by including the PGW_A 30, the SGW_A 35, the MME_A 40, or the like as described using FIGS. 2A and 2B.

In this case, the NAS message transmitted by the UE_A 10 described in this procedure is received by the MME 45, not by the C-SGN_A 95.

Accordingly, the reception and processes of the NAS message by the C-SGN_A 95 in the above description can be replaced with those performed by the MME_A 40.

Furthermore, the transmission and processes of the NAS message by the C-SGN_A 95 in the above description can be replaced with those performed by the MME_A 40.

2. Modification Example

A program running on each of the apparatuses according to the present invention may be a program that controls a Central Processing Unit (CPU) and the like to cause a computer to operate in such a manner as to implement functionalities according to the embodiment of the present invention. A program or information handled by the program is transitorily stored in a volatile memory such as a Random Access Memory (RAM), a non-volatile memory such as a flash memory, a Hard Disk Drive (HDD), or other storage device systems.

The program for implementing the functionalities according the embodiment of the present invention may be recorded on a computer-readable recording medium. The functionalities may be implemented by causing a computer system to read the program recorded on this recording medium for execution. Note that it is assumed that the "computer system" refers to a computer system built into each apparatus, and the computer system includes an operating system and hardware components such as a peripheral device. The "computer-readable recording medium" may include a semiconductor recording medium, an optical recording medium, a magnetic recording medium, a medium dynamically holding a program for a short time, or other computer-readable recording media.

The respective functional blocks or features of the apparatuses used in the above-described embodiment may be installed or performed by an electrical circuit, for example, an integrated circuit or multiple integrated circuits. The electrical circuit designed to perform the functionalities described in this specification may include a general-purpose processor, a digital signal processor (DSP), an application specific integrated circuit (ASIC), a field programmable gate array signal (FPGA), or other programmable logic devices, discrete gates or transistor logic, discrete hardware components, or combinations thereof. The general-purpose processor may be a microprocessor, or may be a processor of a known type, a controller, a micro-controller, or a state machine. The electrical circuit described above may include digital circuits, or analog circuits. Furthermore, in a case that with advances in semiconductor technology, a circuit integration technology with which the current integrated circuit is replaced appears, the present invention can also use a new integrated circuit based on the relevant technology.

Note that the invention of the present patent application is not limited to the above-described embodiments. Furthermore, an example of the apparatuses has described in the embodiment, but the present invention is not limited to such an apparatus and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST

1 Communication system
5 PDN_A
10 UE_A
20 UTRAN_A
22 eNB (UTRAN)_A
24 RNC_A
25 GERAN_A
26 BSS_A
30 PGW_A
35 SGW_A
40 MME_A
45 eNB_A
50 HSS_A
55 AAA_A
60 PCRF_A
65 ePDG_A
70 WLAN ANa
72 WLAN APa
74 TWAG_A
75 WLAN ANb
76 WLAN APb
80 LTE AN_A
90 Core network_A
95 C-SGN_A
100 CIOT AN_A

The invention claimed is:

1. A User Equipment (UE) comprising:
transmission and/or reception circuitry configured to:
perform communication by use of a User plane Cellular Internet of Things (CIoT) Evolved Packet System (EPS) Optimisation after completion of an attach procedure,
in a case of changing a communication method, transmit a first control message to a core network, and receive a second control message as a response to the first control message from the core network, and
perform communication by use of a Control plane CIoT EPS Optimisation after receiving the second control message; and
control circuitry, wherein
the transmission and/or reception circuitry, in the attach procedure, is configured to:
transmit an Attach Request message to the core network,
receive an Attach Accept message from the core network, and
transmit an Attach Complete message to the core network,
the Attach Request message includes UE capability information indicating support of the User plane CIoT EPS Optimisation and information indicating a request to use the User plane CIoT EPS Optimisation,
the Attach Accept message includes network capability information indicating support of the User plane CIoT EPS Optimisation,
the control circuitry receives the network capability information indicating the support of the User plane CIoT EPS Optimisation to interpret that use of the communication by use of the User plane CIoT EPS Optimisation is accepted,
the first control message includes information indicating a request to use the Control plane CIoT EPS Optimisation,
the second control message includes information indicating the Control plane CIoT EPS Optimisation,
the control circuitry receives the information indicating the Control plane CIoT EPS Optimisation to interpret that use of the communication by use of the Control plane CIoT EPS Optimisation is accepted,
the communication by use of the User plane CIoT EPS Optimisation is transport of user data using a communication path for transmitting and/or receiving the user data,
in a case where the control circuitry receives a message to suspend a Radio Resource Control (RRC) connection from a base station apparatus when the communication by use of the User plane CIoT EPS Optimisation is used, the control circuitry enters an idle mode while keeping a bearer context, and
the communication by use of the Control plane MT EPS Optimisation is transport of user data using, a communication path for transmitting and/or receiving a control message, and is performed through the core network.

2. A Mobility Management Entity (MME) comprising:
transmission and/or reception circuitry configured to:
perform communication by use of a User plane Cellular Internet of Things (CIoT) Evolved Packet System (EPS) Optimisation after completion of an attach procedure, and
in a case of receiving a first control message from a User Equipment (UE), transmit a second control message to the UE as a response to the first control message; and
control circuitry, wherein
the transmission and/or reception circuitry, in the attach procedure, is configured to:
receive an Attach Request message from the UE,
transmit an Attach Accept message to the UE, and
receive an Attach Complete message from the UE,
the Attach Request message includes UE capability information indicating support of the User plane CIoT EPS Optimisation and information indicating a request to use the User plane CIoT EPS Optimisation,
the Attach Accept message includes network capability information indicating support of the User plane CIoT EPS Optimisation,
the network capability information indicating the support of the User plane CIoT EPS Optimisation is used for the UE to interpret that use of the communication by use of the User plane CIoT EPS Optimisation is accepted,
the first control message includes information indicating a request to use a Control plane CIoT EPS Optimisation,
the second control message includes information indicating the Control CIoT EPS Optimisation,
the information indicating the Control plane CIoT EPS Optimisation is used for the UE to interpret that use of communication by use of the Control plane CIoT EPS Optimisation is accepted,
the communication by use of the Control plane CIoT EPS Optimisation is performed after transmitting the second control message,
the communication by use of the User plane CIoT EPS Optimisation is transport of user data using a communication path for transmitting and/or receiving the user data,
in a case that the control circuitry receives a message of an S1 Application Protocol (S1AP) from a base station apparatus when the communication by use of the User plane CIoT EPS Optimisation is used, the control circuitry enters an idle mode while keeping a UE context, and
the communication by use of the Control plane CIoT EPS Optimisation is transport of user data using a communication path for transmitting and/or receiving a control message, and is performed through a core network.

3. A communication method of a User Equipment (UE), the communication method comprising:
performing communication by use of a User plane Cellular Internet of Things (CIoT) Evolved Packet System (EPS) Optimisation after completion of an attach procedure;
in a case of changing a communication method, transmitting a first control message to a core network, and receiving a second control message as a response to the first control message from the core network; and
performing communication by use of a Control plane CIoT EPS Optimisation after receiving the second control message, wherein
in the attach procedure,
an Attach Request message is transmitted to the core network,
an Attach Accept message is received from the core network, and
an Attach Complete message is transmitted to the core network,
the Attach Request message includes UE capability information indicating support of the User plane CIoT EPS Optimisation and information indicating a request to use the User plane CIoT EPS Optimisation,
the Attach Accept message includes network capability information indicating support of the User plane CIoT EPS Optimisation,
by receiving the network capability information indicating the support of the User plane CIoT EPS Optimisation, interpreted is that use of the communication by use of the User plane CIoT EPS Optimisation is accepted,
the first control message includes information indicating a request to use the Control plane CIoT EPS Optimisation,
the second control message includes information indicating the Control plane CIoT EPS Optimisation,
by receiving the information indicating the Control plane CIoT EPS Optimisation, interpreted is that use of the communication by use of the Control plane CIoT EPS Optimisation is accepted,
the communication by use of the User plane CIoT EPS Optimisation is transport of user data using a communication path for transmitting and/or receiving the user data,
in a case that a message to suspend an Radio Resource Control (RRC) connection is received from a base station apparatus when the communication by use of the User plane CIoT EPS Optimisation is used, an idle mode is entered while a bearer context is kept, and
the communication by use of the Control plane CIoT EPS Optimisation is transport of user data using a communication path for transmitting and/or receiving a control message, and is performed through the core network.

4. A communication method of a Mobility Management Entity (MME), the communication method comprising:
performing communication by use of a User plane Cellular Internet of Things (CIoT) Evolved Packet System (EPS) Optimisation after completion of an attach procedure; and
in a case of receiving a first control message from a User Equipment (UE), transmitting a second control message to the UE as a response to the first control message, wherein
in the attach procedure,
an Attach Request message is received from the UE,
an Attach Accept message is transmitted to the UE, and
an Attach Complete message is received from the UE, wherein
the Attach Request message includes UE capability information indicating support of the User plane CIoT EPS Optimisation and information indicating a request to use the User plane CIoT EPS Optimisation, and
the Attach Accept message includes network capability information indicating support of the User plane CIoT EPS Optimisation, the network capability information indicating the support of the User plane CIoT EPS Optimisation is used for the UE to interpret that use of the communication by use of the User plane CIoT EPS Optimisation is accepted, the first control message includes information indicating a request to use a Control plane MT EPS Optimisation, the second control message includes information indicating the Control plane CIoT EPS Optimisation, the information indicating the Control plane CIoT EPS Optimisation is used for the UE to interpret that use of communication by use of the Control plane CIoT EPS Optimisation is accepted, the communication by use of the Control plane CIoT EPS Optimisation is performed after transmitting the second control message, the communication by use of the User plane CIoT EPS Optimisation is transport of user data using a communication path for transmitting and/or receiving the user data, in a case that a message of an S1 Application Protocol (S1AP) is received from a base station apparatus when the communication by use of the User plane CIoT EPS Optimisation is used, an idle mode is entered while a UE context is kept, and the communication by use of the Control plane CIoT EPS Optimisation is transport of user data using a communication path for transmitting and/or receiving a control message, and is performed through a core network.

* * * * *

UNITED STATES PATENT AND TRADEMARK OFFICE
CERTIFICATE OF CORRECTION

| | |
|---|---|
| PATENT NO. | : 10,567,995 B2 |
| APPLICATION NO. | : 16/070766 |
| DATED | : February 18, 2020 |
| INVENTOR(S) | : Yudai Kawasaki et al. |

Page 1 of 1

It is certified that error appears in the above-identified patent and that said Letters Patent is hereby corrected as shown below:

In the Claims

Claim 2, at Column 77, Line 36:
After Control, insert -- plane --

Signed and Sealed this
Fifth Day of May, 2020

Andrei Iancu
*Director of the United States Patent and Trademark Office*